US009851505B2

(12) United States Patent
Oka

(10) Patent No.: US 9,851,505 B2
(45) Date of Patent: Dec. 26, 2017

(54) SUBSTRATE-TYPE OPTICAL WAVEGUIDE ELEMENT

(71) Applicant: FUJIKURA LTD., Tokyo (JP)

(72) Inventor: Akira Oka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/447,693

(22) Filed: Mar. 2, 2017

(65) Prior Publication Data
US 2017/0176679 A1    Jun. 22, 2017

Related U.S. Application Data

(63) Continuation of application No. PCT/JP2015/077135, filed on Sep. 25, 2015.

(30) Foreign Application Priority Data

Sep. 30, 2014  (JP) ................................. 2014-202414

(51) Int. Cl.
*G02F 1/035* (2006.01)
*G02B 6/126* (2006.01)
(Continued)

(52) U.S. Cl.
CPC ............. *G02B 6/126* (2013.01); *G02B 6/125* (2013.01); *G02B 6/2773* (2013.01); *G02F 1/011* (2013.01); *H04J 14/06* (2013.01); *G02F 2203/07* (2013.01)

(58) Field of Classification Search
CPC ...... G02B 6/126; G02B 6/125; G02B 6/2773; H04J 14/06; G02F 1/011; G02F 2203/07
See application file for complete search history.

(56) References Cited

U.S. PATENT DOCUMENTS 5,165,001 A    11/1992  Takagi et al.
6,393,185 B1 *  5/2002  Deacon .............. G02B 6/12004
                                                    385/12
(Continued)

FOREIGN PATENT DOCUMENTS

| JP | 4-212108 A | 8/1992 |
| JP | 6-18735 A | 1/1994 |
| JP | 2000-121855 A | 4/2000 |
| JP | 2006-301501 A | 11/2006 |
| JP | 2014-41253 A | 3/2014 |

OTHER PUBLICATIONS

Dai et al., Mode conversion in tapered submicron silicon ridge optical waveguides, Optics Express, vol. 20, No. 12, Jun. 4, 2012, pp. 13425-13439 (15 pages).
(Continued)

*Primary Examiner* — Ellen Kim
(74) *Attorney, Agent, or Firm* — Westerman, Hattori, Daniels & Adrian

(57) ABSTRACT

Provided is a substrate-type optical waveguide element in which when (i) effective refractive indexes of a TE polarized wave and a TM polarized wave in the first core are $N_{TE}@WG1$ and $N_{TM}@WG1$, respectively, and (ii) effective refractive indexes of a TE polarized wave and a TM polarized wave in the second core are $N_{TE}@WG2$ and $N_{TM}@WG2$, respectively, a magnitude relation of the effective refractive indexes $N_{TM}@WG1$ and $N_{TM}@WG2$ at a start position of a parallel-core section is opposite to a magnitude relation of the effective refractive indexes $N_{TM}@WG1$ and $N_{TM}@WG2$ at an end position of the parallel-core section, and at least one of the cores includes (a) a main part having a quadrilateral cross section and (b) a protruding part protruding from one of side surfaces of the main part in a direction parallel to a boundary surface between a lower cladding and a upper cladding.

19 Claims, 38 Drawing Sheets

(51) Int. Cl.
*G02F 1/01* (2006.01)
*G02B 6/125* (2006.01)
*G02B 6/27* (2006.01)
*H04J 14/06* (2006.01)

(56) References Cited

U.S. PATENT DOCUMENTS

| | | | |
|---|---|---|---|
| 9,304,254 B2* | 4/2016 | Oka | G02B 6/0048 |
| 9,557,482 B2* | 1/2017 | Oka | G02B 6/105 |
| 2002/0118907 A1 | 8/2002 | Sugama et al. | |
| 2006/0072866 A1 | 4/2006 | Mizuno et al. | |
| 2007/0196050 A1 | 8/2007 | Ishida et al. | |
| 2008/0152277 A1 | 6/2008 | Little | |
| 2010/0046886 A1 | 2/2010 | Doerr | |
| 2010/0271614 A1 | 10/2010 | Albuquerque et al. | |
| 2010/0322559 A1* | 12/2010 | Ogawa | G02B 6/124 385/37 |
| 2013/0188971 A1 | 7/2013 | Painchaud | |

OTHER PUBLICATIONS

Dong et al., 112-Gb/s Monolithic PDM-QPSK Modulator in Silicon, ECOC 2012 Th.3.13.1 (2012) (3 pages).

Fukuda et al., Ultrasmall polarization splitter based on silicon wire waveguides, Optics Express, vol. 14, No. 25, Dec. 11, 2006, pp. 12401-12408 (8 pages).

Oka et al., Silicon Polarization Rotator using Partial-Rib Waveguide, 2013 Nen Proceedings of the Society Conference of IEICE 1, The Institute of Electronics, Information and Communication Engineers, Sep. 3, 2013, p. 134 (1 page, only abstract in Japanese).

Shani et al., Integrated Optic Adiabatic Devices on Silicon, IEEE Journal of Quantum Electronics, vol. 27, No. 3, Mar. 1991, pp. 556-566 (11 pages).

Snyder et al., Optical Waveguide Theory, Chapman & Hall, London (First edition 1983, Reprinted 1991), pp. 107-418 and pp. 553-585 (25 pages).

International Search Report dated Nov. 17, 2015, issued in counterpart International Application No. PCT/JP2015/077135 (2 pages).

Non-Final Office Action dated Mar. 21, 2017, issued in U.S. Appl. No. 15/447,907. (17 pages).

Oka et al., "Low-loss Sillicon Polarization Beam Combiner Using Adiabatic Process", 2015 Nen The Institute of Electronics, Information and Communication Engineers Sogo Taikai Koen Ronbunshu, Feb. 24, 2015, pp. 128.

International Search Report dated Nov. 17, 2015, issued in International Application No. PCT/JP2015/077134 (2 pages).

Related co-pending U.S. Appl. No. 15/447,907.

\* cited by examiner

SUBSTRATE-TYPE OPTICAL WAVEGUIDE ELEMENT

CROSS-REFERENCE TO RELATED APPLICATIONS

This application is a Continuation of PCT International Application No. PCT/JP2015/077135 filed in Japan on Sep. 25, 2015, which claims the benefit of Patent Application No. 2014-202414 filed in Japan on Sep. 30, 2014, the entire contents of which are hereby incorporated by reference.

TECHNICAL FIELD

The present invention relates to a substrate-type optical waveguide element in which two cores are formed between a lower cladding and an upper cladding.

BACKGROUND ART

Currently, the amount of information to be transmitted through optical communications keeps increasing. In order to match up to such an increase in amount of information, some measures are being taken. Such measures includes, for example, increasing a signaling rate and increasing the number of channels by use of wavelength-division multiplexing. Among such measures, there is a next-generation 100-Gbps digital coherent transmission technology. This technology employs polarization multiplexing in which different pieces of information are superimposed on two polarized waves whose electric fields are orthogonal to each other, so as to double the amount of information transmittable per unit of time. However, a modulation method employing such polarization multiplexing requires an optical modulator having a complex configuration. This results in problems such as increases in device size and device cost. In view of these problems, Non-Patent Literature 1 discloses an optical modulator employing a substrate-type optical waveguide with use of silicon as a core. Such a substrate-type optical waveguide has, for example, the following advantages: a production process is simple; the size of an optical element can be reduced by integration; and production costs can be reduced by use of a large-diameter wafer.

In the polarization multiplexing, a polarization beam combiner (PBC) is used. The PBC carries out multiplexing of a TE polarized wave and a TM polarized wave within the substrate-type optical waveguide. (a) of FIG. 36 is a block diagram illustrating a configuration of a PBC 101. The PBC 101 includes a first input port 102, a second input port 103, and an output port 104. The PBC 101 carries out multiplexing of a TM polarized wave introduced through the first input port 102 and a TE polarized wave introduced through the second input port 103, and outputs, through the output port 104, the TM polarized wave and the TE polarized wave which are thus multiplexed. Note that the length of each arrow illustrated in (a) of FIG. 36 indicates the power of each of the TE polarized wave and the TM polarized wave which enter into the PBC 101. In (b) and (c) of FIG. 36 which are referred to later, the length of each arrow similarly indicates the power of each polarized wave.

The TE polarized wave herein refers to a mode having an electric field whose main component is present along a horizontal direction (hereinafter, referred to as a width direction or x direction) parallel to a substrate in a plane orthogonal to a light traveling direction in the substrate-type optical waveguide. Meanwhile, the TM polarized wave herein refers to a mode having an electric field whose main component is present along a direction (hereinafter, referred to as a height direction or y direction) perpendicular to the substrate in the plane orthogonal to the light traveling direction in the substrate-type optical waveguide.

In terms of performance of PBCs, loss during polarization multiplexing and a polarization extinction ratio are important.

The loss of a TM polarized wave indicates a ratio of the power of the TM polarized wave at the output port 104 with respect to the power of the TM polarized wave introduced through the first input port 102. The loss of a TM polarized wave is defined by the following Formula (1).

[Math. 1]

$$\text{LOSS} = -10\text{Log}_{10} \frac{\text{POWER OF } TM \text{ POLARIZED WAVE AT OUTPUT PORT}}{\text{POWER OF } TM \text{ POLARIZED WAVE AT INPUT PORT}} \quad (1)$$

Meanwhile, the loss of a TE polarized wave indicates a ratio of the power of the TE polarized wave at the output port 104 with respect to the power of the TE polarized wave introduced through the second input port 103. The loss of a TE polarized wave is defined by the following Formula (2).

[Math. 2]

$$\text{LOSS} = -10\text{Log}_{10} \frac{\text{POWER OF } TE \text{ POLARIZED WAVE AT OUTPUT PORT}}{\text{POWER OF } TE \text{ POLARIZED WAVE AT INPUT PORT}} \quad (2)$$

In view of energy efficiency, the losses are each preferably a low loss.

On the other hand, the polarization extinction ratio (hereinafter, also referred to as "PER") indicates a ratio of the power of a TM polarized wave and the power of a TE polarized wave which are outputted through the output port 104 in a case where the TM polarized wave and the TE polarized wave are introduced through one (e.g., the second input port 103) of input ports of a PBC (see (b) of FIG. 36. The length of each arrow in (b) of FIG. 36 is indicative of the power of each polarized wave).

In a case where a TM polarized wave and a TE polarized wave of the same power are introduced through the first input port 102 which is for input of the TM polarized wave (see (b) of FIG. 36), the PER is defined by the following Formula (3).

[Math. 3]

$$PER = 10\text{Log}_{10} \frac{\text{POWER OF } TM \text{ POLARIZED WAVE AT OUTPUT PORT}}{\text{POWER OF } TE \text{ POLARIZED WAVE AT INPUT PORT}} \quad (3)$$

In a case where a TM polarized wave and a TE polarized wave of the same power are introduced through the first input port 102 for input of the TE polarized wave (see (c) of FIG. 36), the PER is defined by the following Formula (4).

[Math. 4]

$$PER = 10 \text{Log}_{10} \frac{\text{POWER OF } TE \text{ POLARIZED WAVE AT } OUTPU \text{ PORT}}{\text{POWER OF } TM \text{ POLARIZED WAVE AT OUTPUT PORT}} \quad (4)$$

As described above, the PER is indicative of a degree of suppression of the power of one of a TM polarized wave and a TE polarized wave in a case where the TM polarized wave and the TE polarized wave are introduced through one input port. The PER is important, for example, in the following point. A PCB, like a polarization multiplexing modulator disclosed in Non-Patent Literature 1, is connected to a subsequent stage of a polarization rotator (hereinafter, also referred to as "PR"). The PR is a device for converting a TE polarized wave into a TM polarized wave. However, the TE polarized wave is slightly mixed in the TM polarized wave that is to be outputted from the PR, due to insufficient conversion. The TE polarized wave thus mixed in the TM polarized wave causes, at the output port 104 of the PBC 101, crosstalk with a TE polarized wave (TE polarized wave illustrated in (a) of FIG. 36) that is to be multiplexed. This crosstalk results in deterioration of signal quality. Accordingly, it is preferable to make the PBC 101 suppress the occurrence of such crosstalk at the output port 104, by suppression of the power of the TE polarized wave which has been mixed in a PR output and introduced. In other words, the higher the PER is, the more the occurrence of crosstalk at the output port 104 can be suppressed. This consequently makes it possible to reduce deterioration of signal quality in polarization multiplexing.

It is preferable that the above-described two items of performance of PBCs be favorable in a wide wavelength band. This is for the following reason. In optical communications, wavelength multiplexing is widely used. Accordingly, many optical components including an optical modulator preferably operate in a wide wavelength band. The wide wavelength band means a band including, for example, C band (a wavelength range of 1530 nm to 1565 nm) and L band (a wavelength range of 1565 nm to 1625 nm). In a case where the PBC is utilized in such an optical component, it is preferable that the PBC also have a low loss and a high PER in a wide wavelength band.

Literatures on conventional technologies of PBCs include Non-Patent Literature 2 and Patent Literature 1.

Non-Patent Literature 2 relates to a polarization beam splitter. The polarization beam splitter can be obtained by causing a TE polarized wave and a TM polarized wave to enter through the output port 104 of the PBC 101 illustrated in (a) of FIG. 36 and then causing the TM polarized wave to exit through the first input port 102 and the TE polarized wave to exit through the second input port 103. As described above, the polarization beam splitter can achieve a function that is equivalent to the function of a PBC. Therefore, the polarization beam splitter is taken as a conventional art of PBCs. Non-Patent Literature 2 achieves polarization separation of TE0 and TM0 by a directional coupler in which two rectangular waveguides having congruent core shapes are provided adjacent to each other. Here, TE0 indicates a waveguide mode of a TE polarized wave which waveguide mode has a maximum effective refractive index among waveguide modes of the TE polarized wave, while TM0 indicates a waveguide mode of a TM polarized wave which waveguide mode has a maximum effective refractive index among waveguide modes of the TM polarized wave. FIG. 37 is a schematic view illustrating a configuration of a polarization beam splitter 201 disclosed in Non-Patent Literature 2. (a) of FIG. 37 is a cross-sectional view of a directional coupler of the polarization beam splitter 201, along a cross section orthogonal to a light traveling direction. (b) and (c) of FIG. 37 each are a top view of the polarization beam splitter 201. The polarization beam splitter 201 includes a lower cladding 204, an upper cladding 205, and cores 202 and 203 which are buried by the lower cladding 204 and the upper cladding 205.

The polarization beam splitter 201 allows for multiplexing or separation of polarized waves by utilizing the following phenomenon: in a directional coupler, a coupling length for TM0 is shorter than a coupling length for TE0. More specifically, the polarization beam splitter 201 allows for multiplexing ((c) of FIG. 37) or separation ((b) of FIG. 37) of polarized waves by utilizing the following phenomenon: TM0 completely transfers over to an adjacent waveguide of a directional coupler before TE0 completely transfers over to the adjacent waveguide.

Patent Literature 1 relates to a polarization sorter, and can perform an operation equivalent to that of PBCs. Thus, the polarization sorter is taken as a conventional art of PBCs. The polarization sorter disclosed in Patent Literature 1 carries out polarization separation by mode sorting (adiabatic sorting) which utilizes an adiabatic conversion.

As illustrated in FIGS. 2a to 2c of Patent Literature 1, the polarization sorter in accordance with Patent Literature 1 includes two waveguides 12 and 14. The waveguides 12 and 14 are provided adjacent to each other, and have respective cores whose heights are different from each other. Further, the polarization sorter includes a mode sorting section 46 in which one of the cores has a width changing continuously along a light traveling direction. The mode sorter carries out polarization separation by mode sorting in the mode sorting section 46. The mode sorting here means a polarization separation method which utilizes the following phenomenon: a magnitude relation of effective refractive indexes and polarization are preserved when the waveguides are arranged to continuously change along the light traveling direction.

For example, a magnitude relation of effective refractive index between a TE polarized wave (TE-1 illustrated in FIG. 6 of Patent Literature 1) at an input port 30 of a waveguide 12 and a TE polarized wave (TE-2 illustrated in FIG. 6 of Patent Literature 1) at an input port 36 of a waveguide 14 is opposite to that between a TE polarized wave at an output port 32 of waveguide 12 and a TE polarized wave at an output port 34 of waveguide 14. Meanwhile, a magnitude relation of effective refractive index between a TM polarized wave (TM-1 illustrated in FIG. 6 of Patent Literature 1) at the input port 30 of the waveguide 12 and a TM polarized wave at the input port 36 of the waveguide 14 (TM-2 illustrated in FIG. 6 of Patent Literature 1) is the same as that between a TM polarized wave at the output port 32 of the waveguide 12 and a TM polarized wave at the output port 34 of the waveguide 14.

When the above magnitude relation of effective refractive index is satisfied, the TE polarized wave having been introduced through the input port 30 of the waveguide 12 is outputted through the output port 34 of the waveguide 14 while the TM polarized wave having been introduced through the input port 30 of the waveguide 12 is outputted through the output port 32 of the waveguide 12. In this way, the polarization sorter of Patent Literature 1 carries out polarization separation of the TE polarized wave and the TM polarized wave which have been introduced through the input port 30 of the waveguide 12.

In order to satisfy the above-described magnitude relation of effective refractive index, in the polarization sorter, cross-sectional shapes of respective cores of the two adjacent waveguides 12 and 14 cannot be congruent all along an entire device length of the polarization sorter. Therefore, as illustrated in FIGS. 2a to 2c of Patent Literature 1, the waveguides 12 and 14 adjacent to each other have different heights, respectively.

CITATION LIST

Patent Literature

[Patent Literature 1] Specification of US Patent Application Publication No. 2008/0152277 (Publication Date: Jun. 26, 2008)

Non-Patent Literatures

[Non-patent Literature 1] Po Dong, et al., "112-Gb/s Monolithic PDM-QPSK Modulator in Silicon," ECOC 2012 Th. 3. B. 1 (2012).
[Non-patent Literature 2] Hiroshi Fukuda, et al., "Ultrasmall polarization splitter based on silicon wire waveguides," OPTICS EXPRESS, Vol. 14, No. 25, 12401 (2006).
[Non-patent Literature 3] Allan W. Snyder and John D. Love, "Optical Waveguide Theory," CHAPMAN & HALL, London (First edition 1983, Reprinted 1991).
[Non-patent Literature 4] Yosi Shani, et al., "Integrated Optical Adiabatic Devices on Silicon," IEEE JOURNAL OF QUANTUM ELECTRONICS, VOL. 27, NO. 3 (1991).
[Non-patent Literature 5] Daoxin Dai, et al., "Mode conversion in tapered submicron silicon," OPTICS EXPRESS, Vol. 20, No. 12 (2012).

SUMMARY OF INVENTION

Technical Problem

A structure of the directional coupler of Non-Patent Literature 2 can be fabricated by a simple production process. However, the structure has problems in that loss largely depends on a wavelength and that the structure is susceptible to production errors.

In Non-Patent Literature 2, the length L of a portion where the two waveguides are adjacent to each other needs to be arranged to correspond to a coupling length of the TM polarized wave. The coupling length here means a length necessary for light to completely transfer over to an adjacent waveguide. For example, suppose a case where at a certain wavelength (hereinafter, referred to as "first wavelength"), the coupling length is Lc and L=Lc. In this case, the TM polarized wave having the first wavelength is at zero loss in principle.

However, when the wavelength shifts from the first wavelength to a second wavelength, a degree of leakage of light from a core of a waveguide is changed. This results in a change of strength in coupling to an adjacent waveguide. As a result, the coupling length at the second wavelength changes from the coupling length at the first wavelength. Consequently, when L=Lc, the TM polarized wave having the second wavelength does not completely transfer over to the adjacent waveguide, or the TM polarized wave having transferred over to the adjacent waveguide transfers back to the waveguide. Therefore, loss of the TM polarized wave having the second wavelength occurs at an output port. In other words, Non-Patent Literature 2 has a problem in that when a change in wavelength occurs, loss of the TM polarized wave increases in amount.

Further, when the height or the width of a core of a waveguide varies due to a production error, a degree of confinement of light of a TM polarized wave in a core changes. As a result, the coupling length is changed. This consequently causes a problem that as in a case where the wavelength changes, loss of the TM polarized wave increases as compared to a case where no production error occurs.

Patent Literature 1 has a problem that a production process is complex and the complex production process leads to an increase in cost and/or a decrease in yield.

In regard to a structure of Patent Literature 1, the mode sorting section 46 needs to satisfy the following two conditions so that mode sorting will be carried out.

Condition 1: There is a cross section where respective effective refractive indexes of two polarized waves (e.g., TE-1 and TE-2 illustrated in FIG. 6 of Patent Literature 1) are the same, which two polarized waves have respective main components present along one direction and are guided in two adjacent waveguides, respectively.

Condition 2: Two polarized waves (e.g., TM-1 and TM-2 illustrated in FIG. 6 of Patent Literature 1), which have respective main components present along the other direction and are guided in the two adjacent waveguides, respectively, always have different effective refractive indexes, respectively.

In order to satisfy these conditions, the polarization sorter disclosed in Patent Literature 1 can employ any of the following two configurations: a configuration in which a height of one of two waveguides is made larger; and (2) a configuration in which a height of the other one of the two waveguides is made smaller. The former configuration gives rise to the problem that an increase in thickness of the polarization sorter is inevitable. Meanwhile, the latter configuration makes characteristics of the polarization sorter susceptible to production errors and thus gives rise to the problem that an accuracy required for a production process (hereinafter also referred to as "required accuracy of a production process") increases.

An embodiment of the present invention is attained in view of the above problems. An object of the present invention is to provide a substrate-type optical waveguide element which can suppress loss of a TM polarized wave to a low level in a wide wavelength range without the need for an increase in thickness and the need for an increase in required accuracy of a production process.

Solution to Problem

In order to solve the above problems, a substrate-type optical waveguide element in accordance with an aspect of the present invention includes: a lower cladding whose refractive index is $N_{cl1}$; a first core and a second core, refractive indexes of which are $N_{co}$ ($N_{co}>N_{cl1}$), the first core and the second core each being formed on the lower cladding; and an upper cladding whose refractive index is $N_{cl2}$ ($N_{co}>N_{cl2}$), the upper cladding being provided on the lower cladding so as to bury the first core and the second core, wherein: when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent, (A) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other, (B) the effective refractive indexes $N_{TE}@WG1$ and $N_{TM}@WG1$ satisfy a relation of $N_{TE}@WG1 > N_{TM}@WG1$ all along the parallel-core section, (C) the effective refractive indexes $N_{TE}@WG2$ and $N_{TM}@WG2$ satisfy a relation of $N_{TE}@WG2 > N_{TM}@WG2$ all along the parallel-core section, (D) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section, and (E) at least one of the first core and the second core includes (a) a main part having a quadrilateral cross section orthogonal to a light traveling direction and (b) a protruding part protruding from one of side surfaces of the main part in a direction parallel to a boundary surface between the lower cladding and the upper cladding, the protruding part having a quadrilateral cross section orthogonal to the light traveling direction.

Advantageous Effects of Invention

An embodiment of the present invention provides a substrate-type optical waveguide element which can suppress loss of a TM polarized wave to a low level in a wide wavelength range without the need for an increase in thickness and the need for an increase in required accuracy of a production process.

Figure 3:
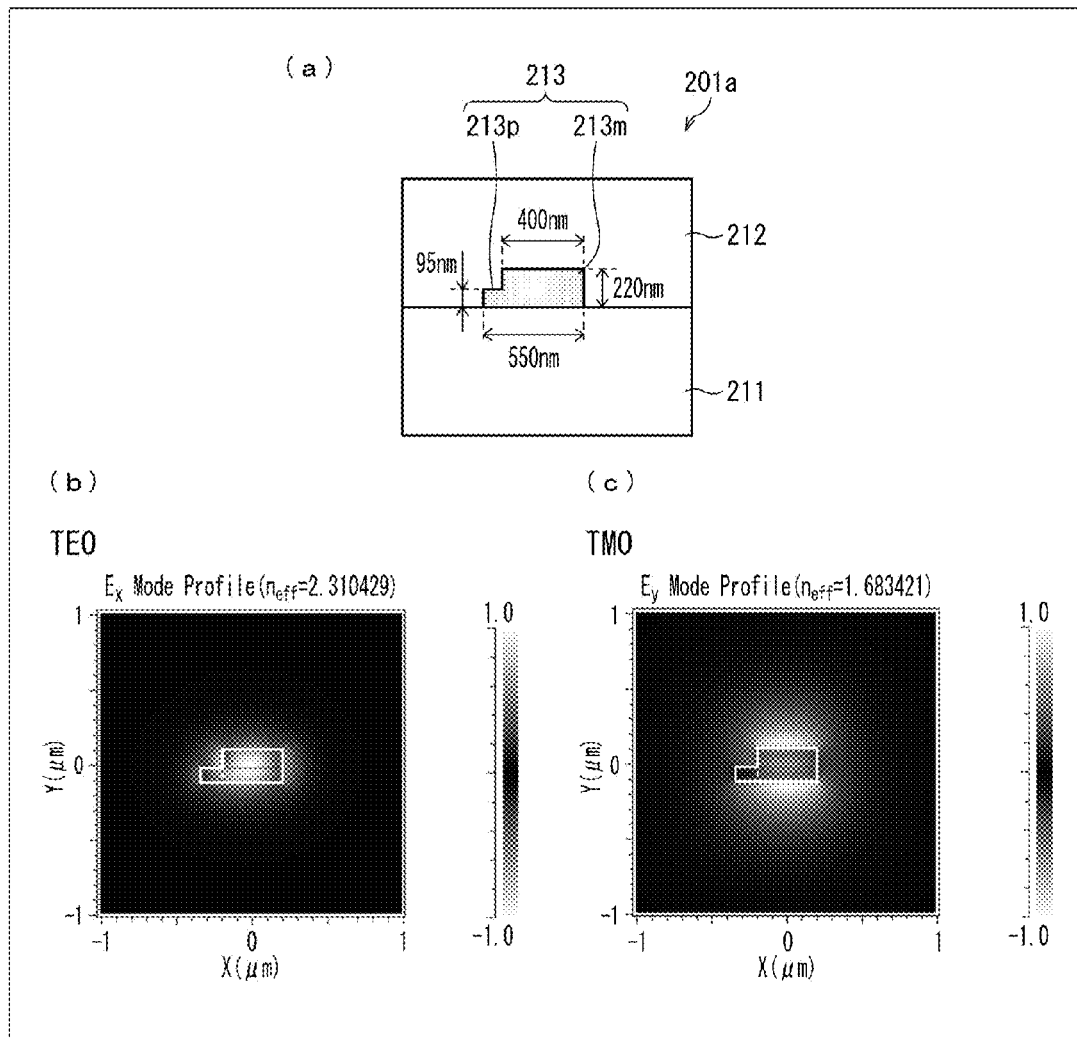

(a) of FIG. 3 is a cross-sectional view illustrating a configuration of a substrate-type optical waveguide element that includes an independent core provided in between claddings, (b) of FIG. 3 shows a result of calculation of an electric field distribution of Ex of TE0 in the core, and (c) of FIG. 3 shows a result of calculation of an electric field distribution of Ey of TM0 in the core.

Figure 4:
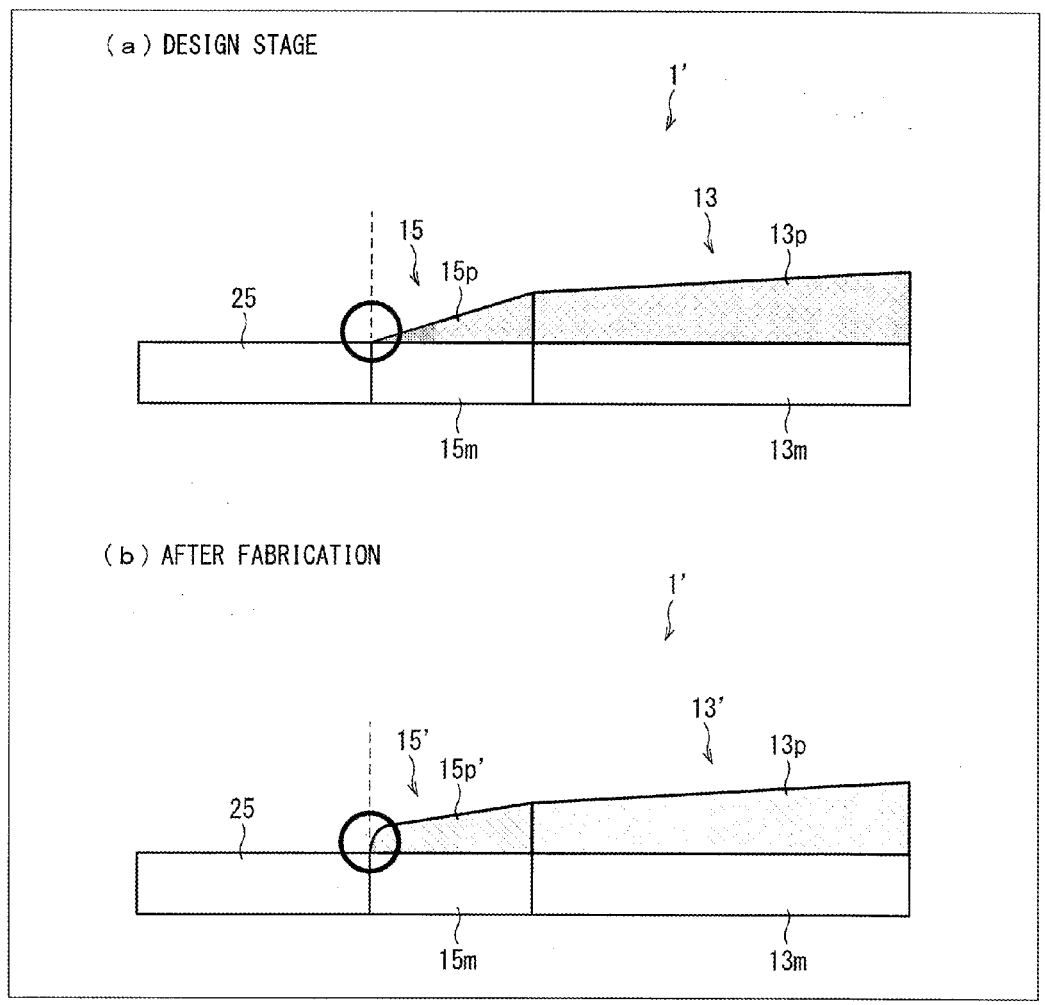

FIG. 4 is a top view illustrating a configuration of a connection section that connects a PBC in accordance with Embodiment 1 of the present invention and an optical wiring provided outside the PBC.

Figure 5:
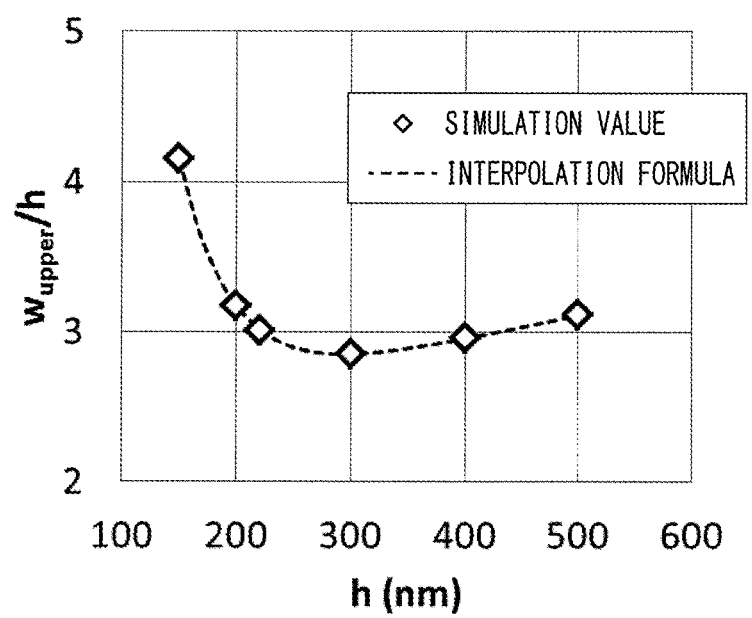

FIG. 5 is a graph showing a simulation result of $W_{upper}$ that is normalized by a height h obtained in a case where a height is varied in the PBC in accordance with Embodiment 1 of the present invention.

Figure 6:
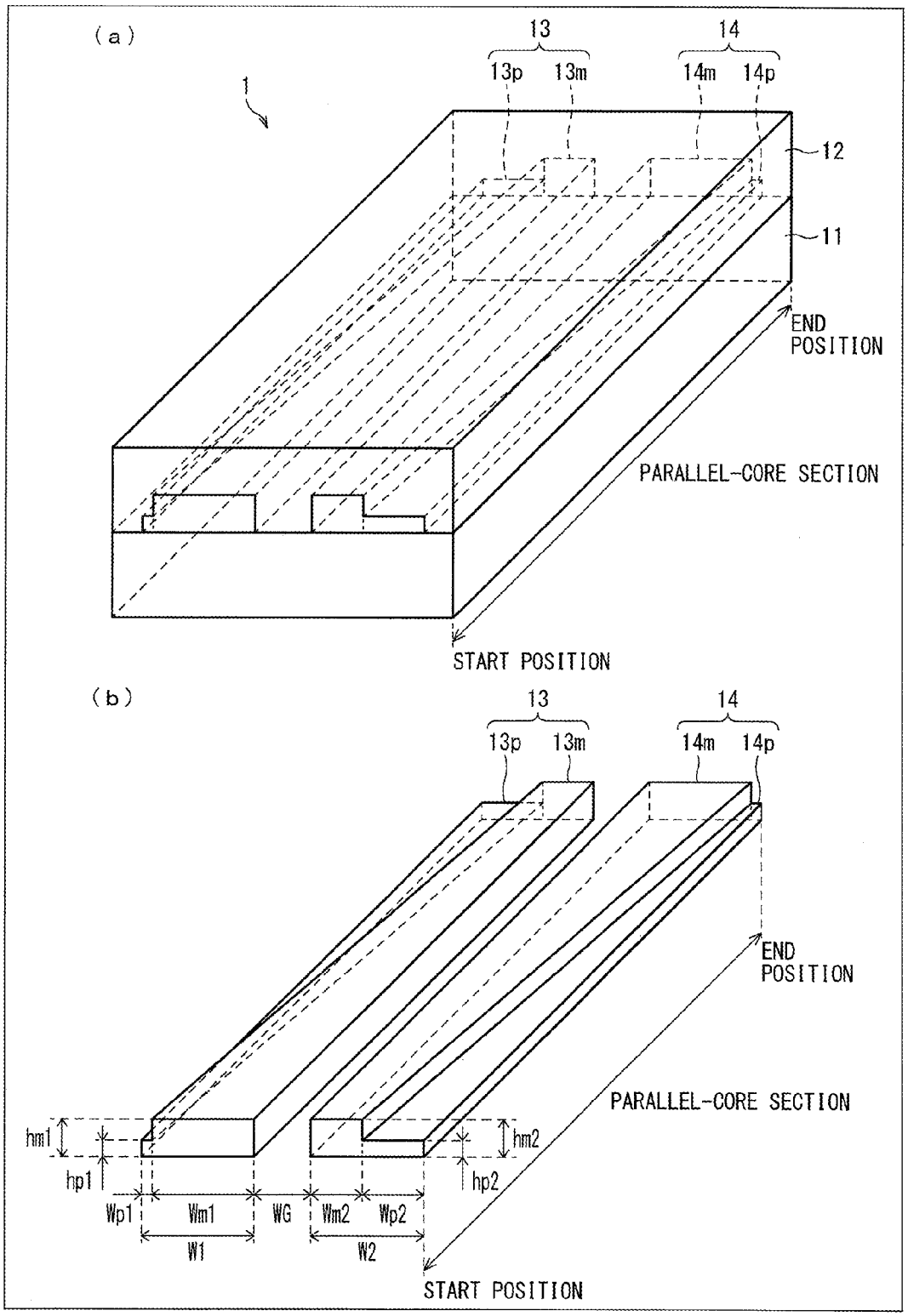

FIG. 6 is a perspective view illustrating a configuration of the PBC in accordance with Embodiment 1 of the present invention.

Figure 7:
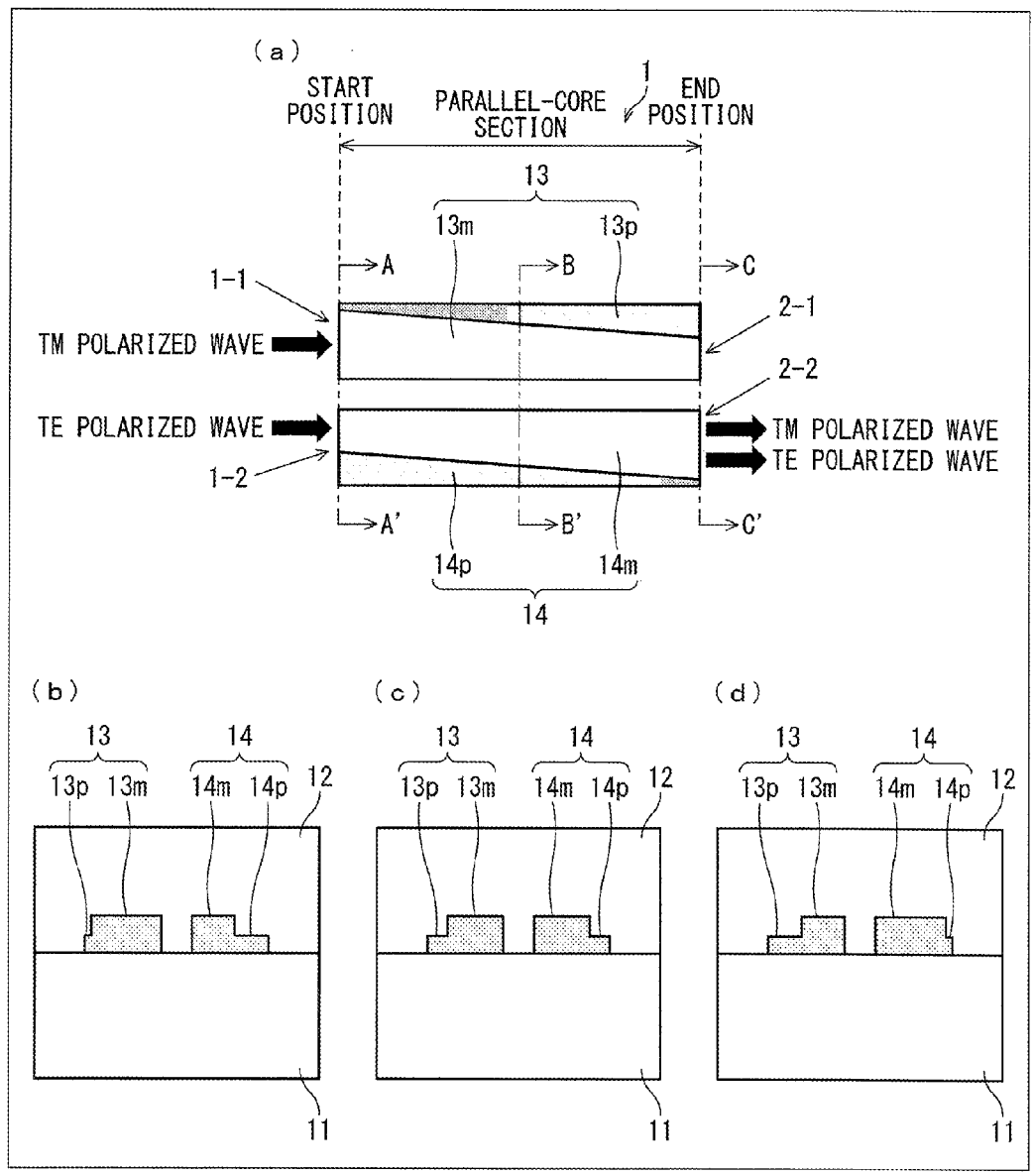

(a) of FIG. 7 is a top view illustrating a configuration of the PBC in accordance with Embodiment 1 of the present invention, and (b) to (d) of FIG. 7 are cross-sectional views illustrating the configuration of the PBC.

Figure 8:
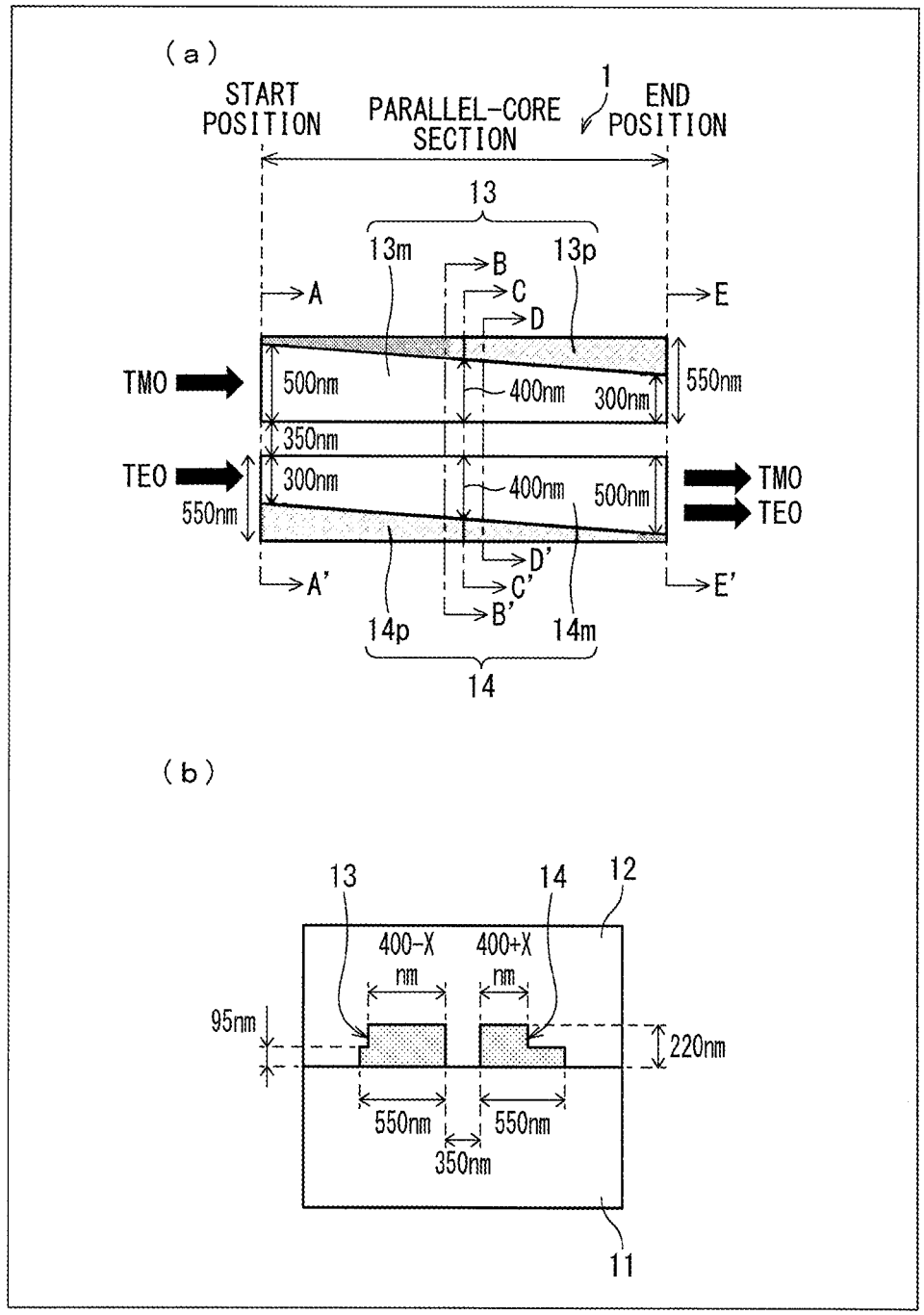

(a) of FIG. 8 is a top view illustrating a configuration of a PBC in accordance with Example 1, and (b) of FIG. 8 is a cross-sectional view illustrating the configuration of the PBC.

Figure 9:
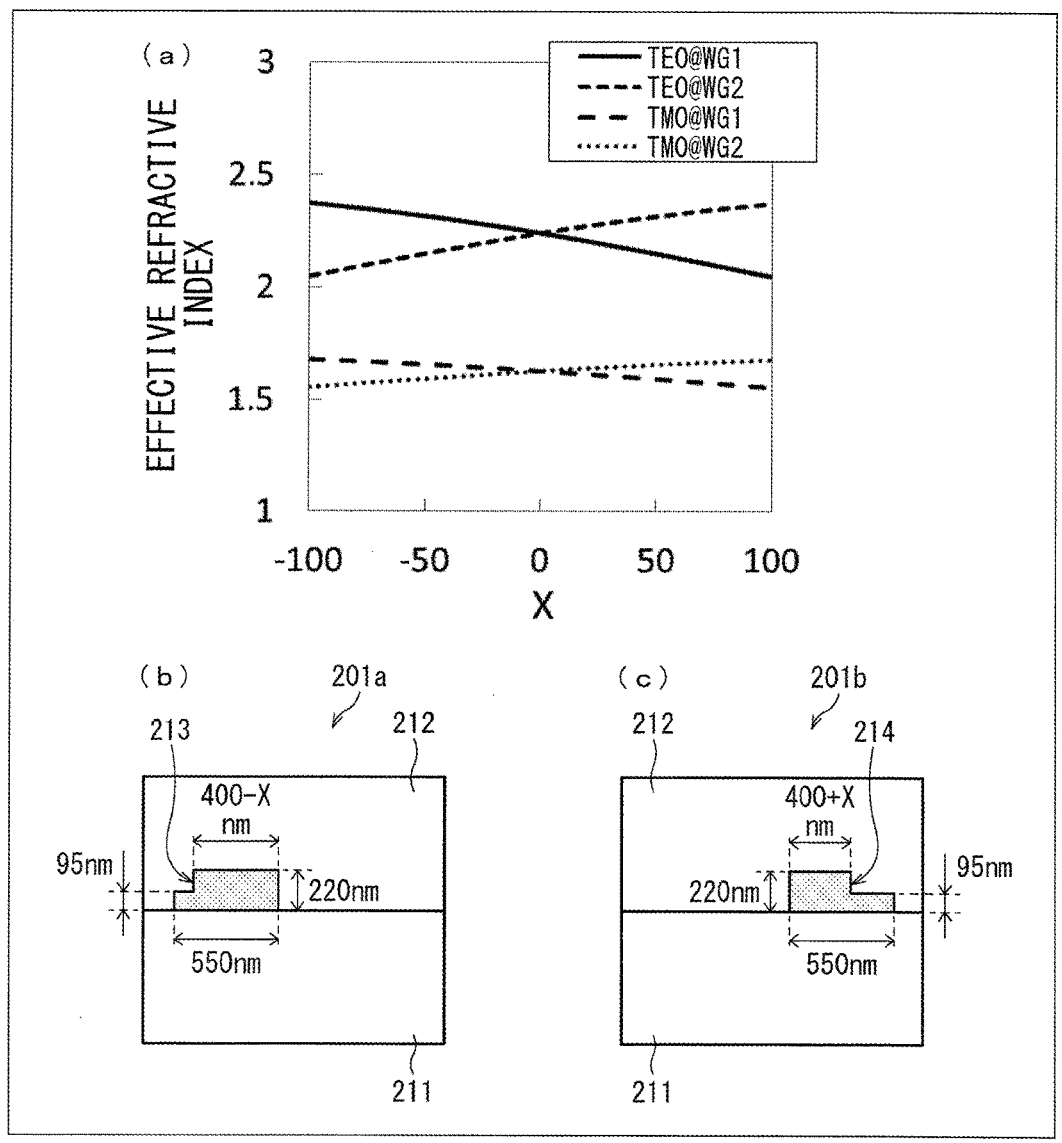

(a) of FIG. 9 is a graph showing a result of calculation of effective refractive indexes of an independent core which is buried in between the claddings, and (b) and (c) of FIG. 9 are cross-sectional views illustrating the configuration of a substrate-type optical waveguide element used for the calculation shown in (a) of FIG. 9.

Figure 10:
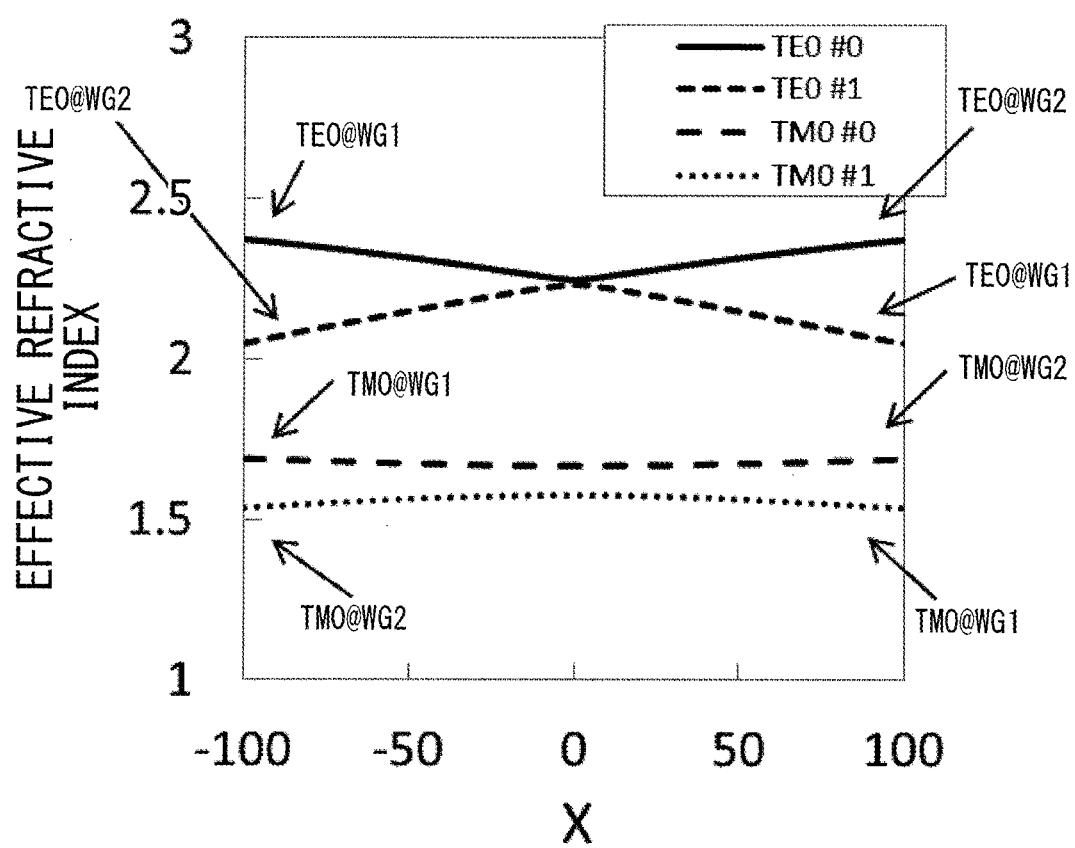

FIG. 10 is a graph showing a result of calculation of effective refractive indexes of TE0 and TM0 at a cross section of the PBC in accordance with Example 1.

Figure 11:
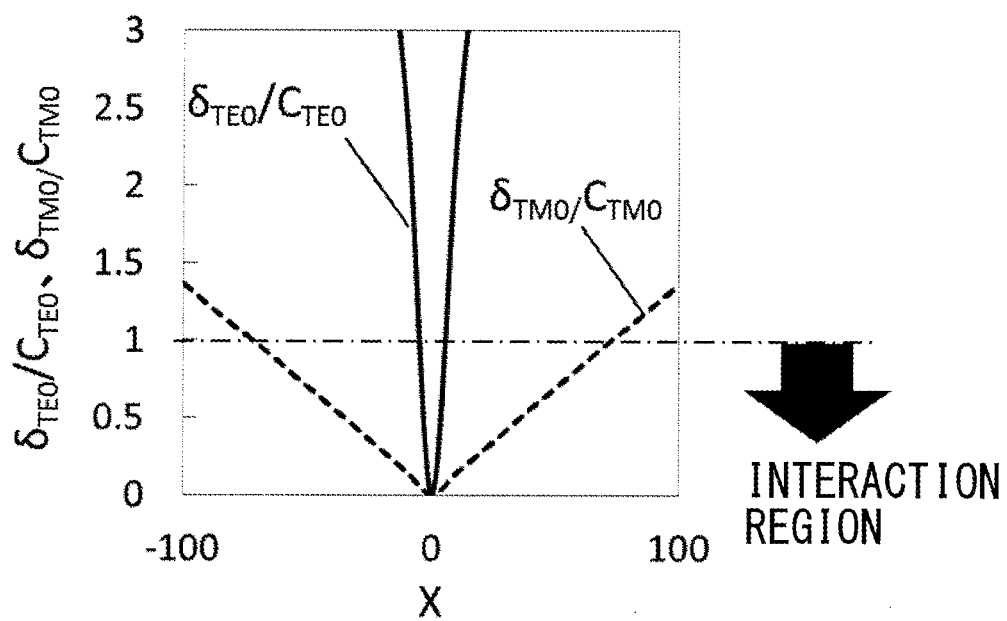

FIG. 11 is a graph showing a ratio ($\delta_{TE0}/C_{TE0}$) and a ratio ($\delta_{TM0}/C_{TM0}$) of TE0 and TM0 propagating through the PBC in accordance with Example 1.

Figure 12:
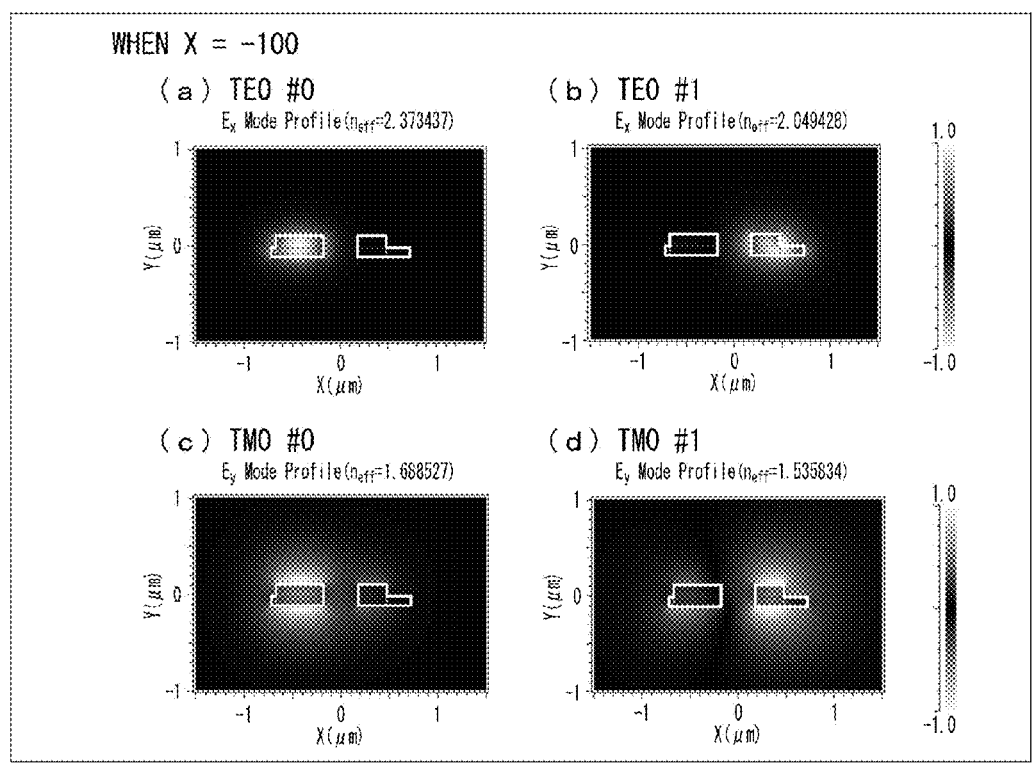

FIG. 12 is a graph showing a simulation result of respective electric field distributions of TE0 and TM0 at a cross section taken along line A-A' in the PBC illustrated in FIG. 8.

Figure 13:
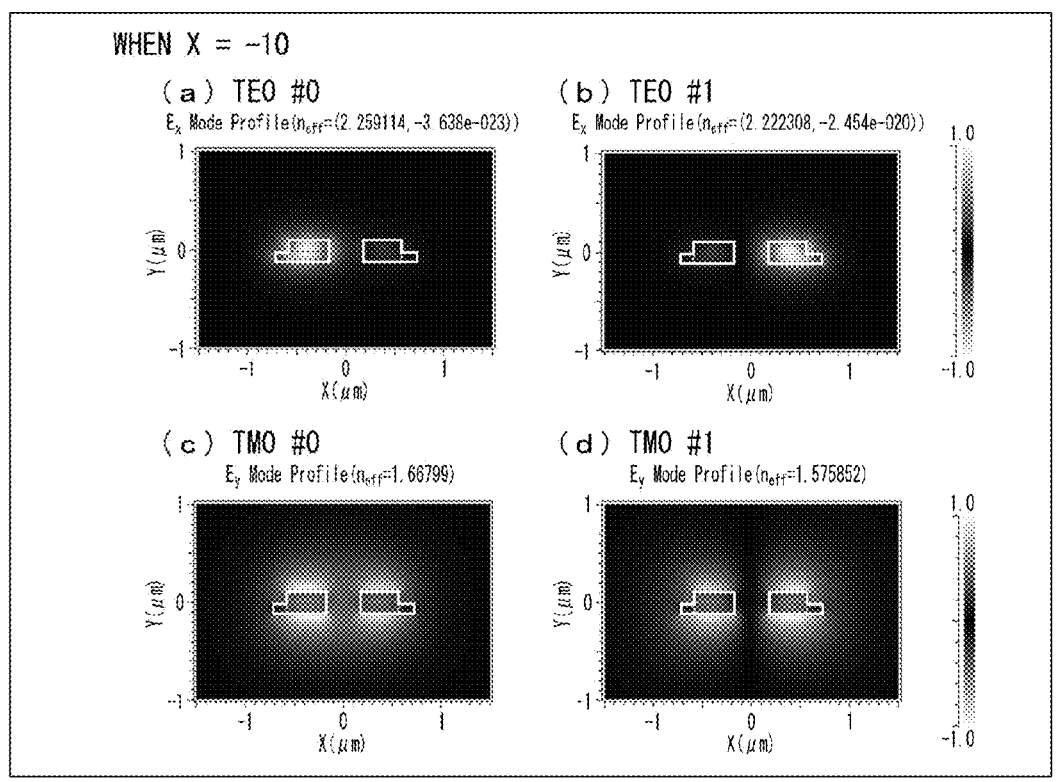

FIG. 13 is a graph showing a simulation result of respective electric field distributions of TE0 and TM0 at a cross section taken along line B-B' in the PBC illustrated in FIG. 8.

Figure 14:
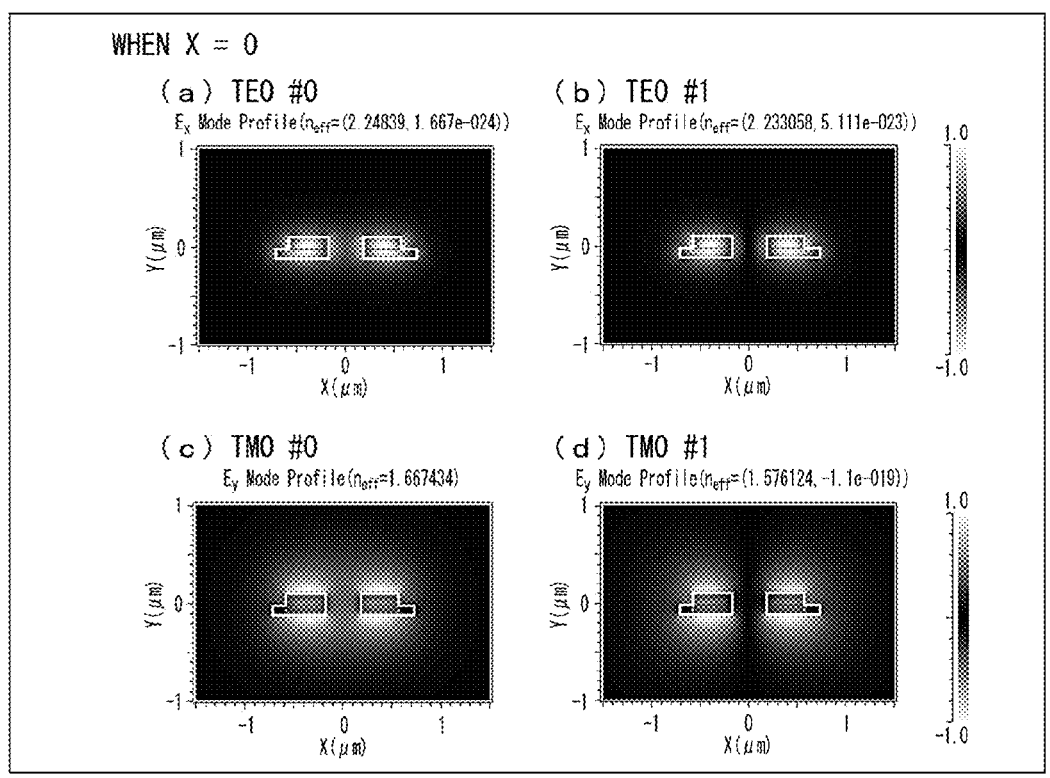

FIG. 14 is a graph showing a simulation result of respective electric field distributions of TE0 and TM0 at a cross section taken along line C-C' in the PBC illustrated in FIG. 8.

Figure 15:
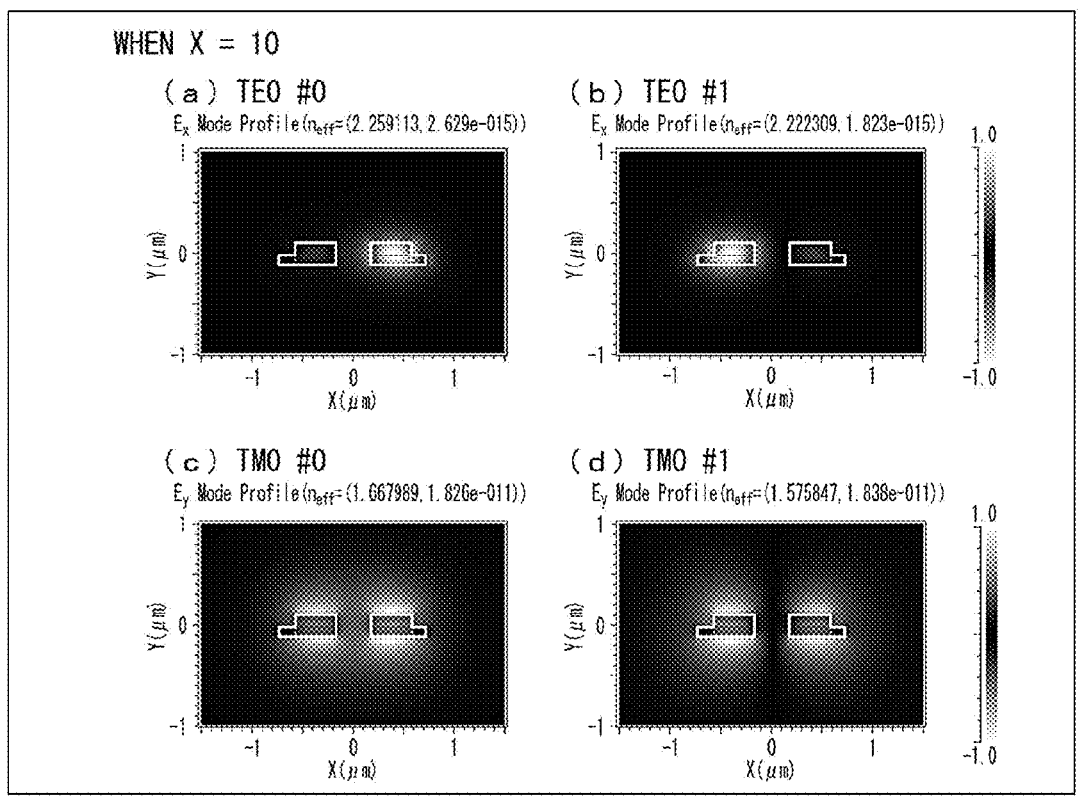

FIG. 15 is a graph showing a simulation result of respective electric field distributions of TE0 and TM0 at a cross section taken along line D-D' in the PBC illustrated in FIG. 8.

Figure 16:
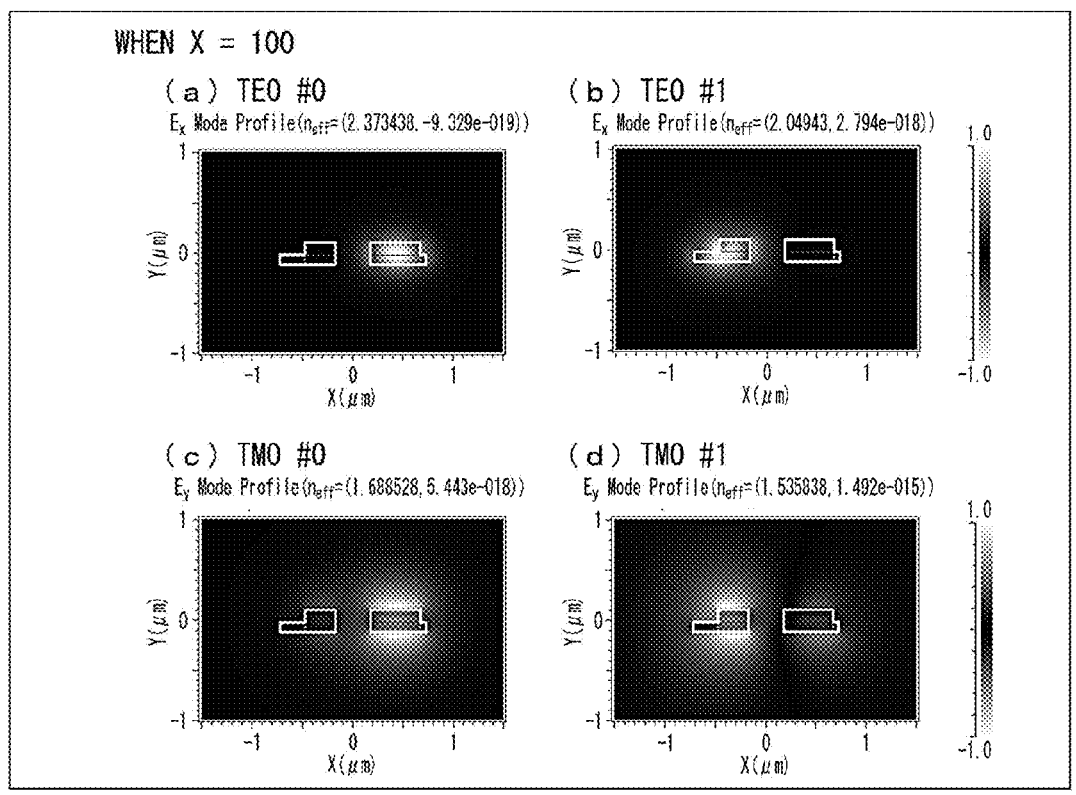

FIG. 16 is a graph showing a simulation result of respective electric field distributions of TE0 and TM0 at a cross section taken along line E-E' in the PBC illustrated in FIG. 8.

Figure 17:
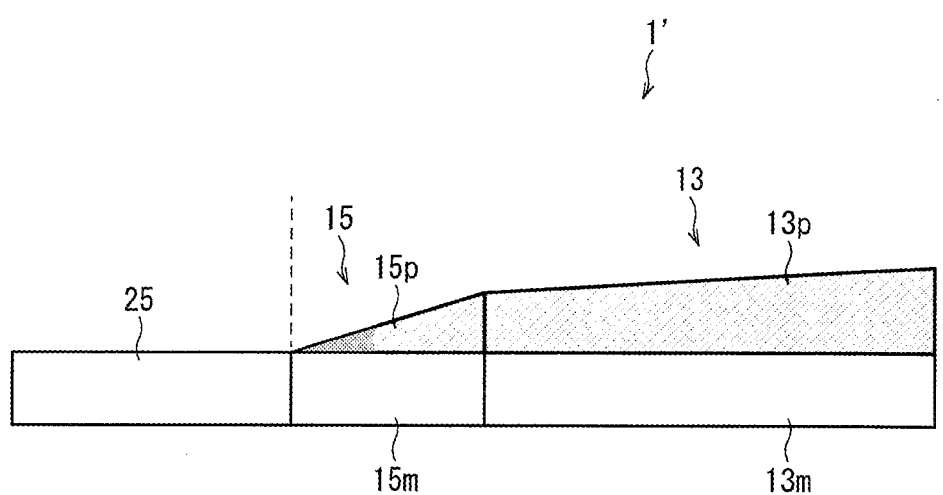

FIG. 17 is a top view illustrating a configuration of a connection section that connects a PBC in accordance with an embodiment of the present invention and an optical wiring provided outside the PBC.

Figure 18:
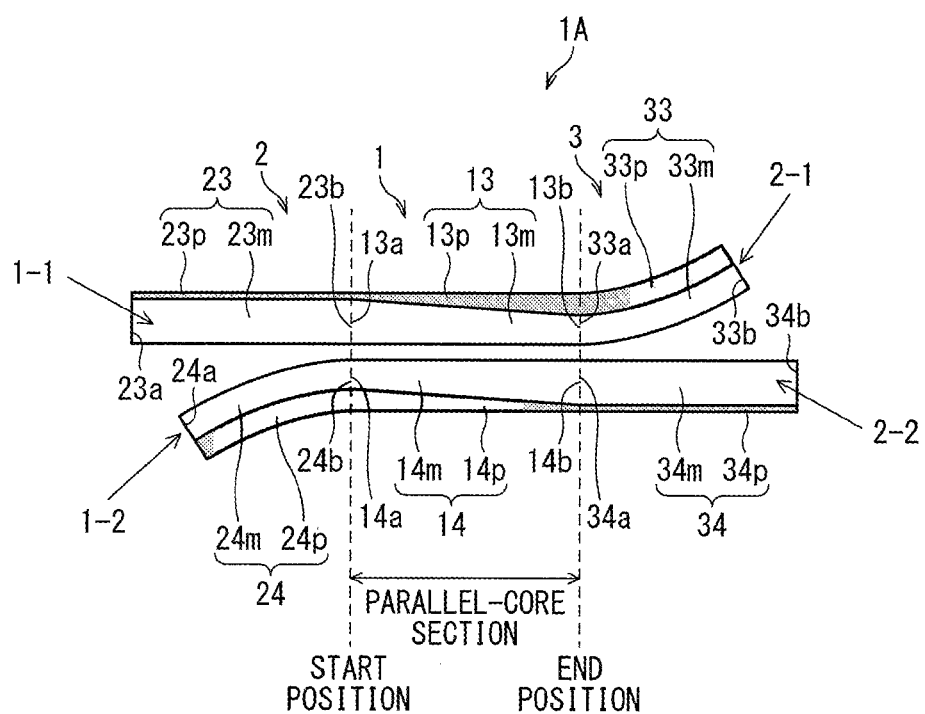

FIG. 18 is a top view illustrating a configuration of a PBC in accordance with Embodiment 2.

Figure 19:
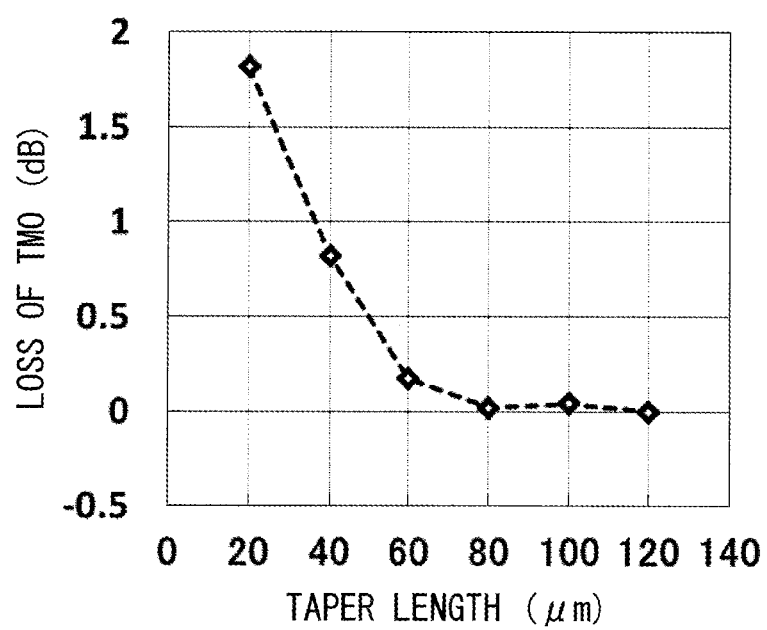

FIG. 19 is a graph showing a result of calculating, by a finite-difference time-domain method, a loss of TM0 which is outputted through an output port in a case where TM0 is introduced into an input port of the PBC in accordance with Embodiment 2.

Figure 20:
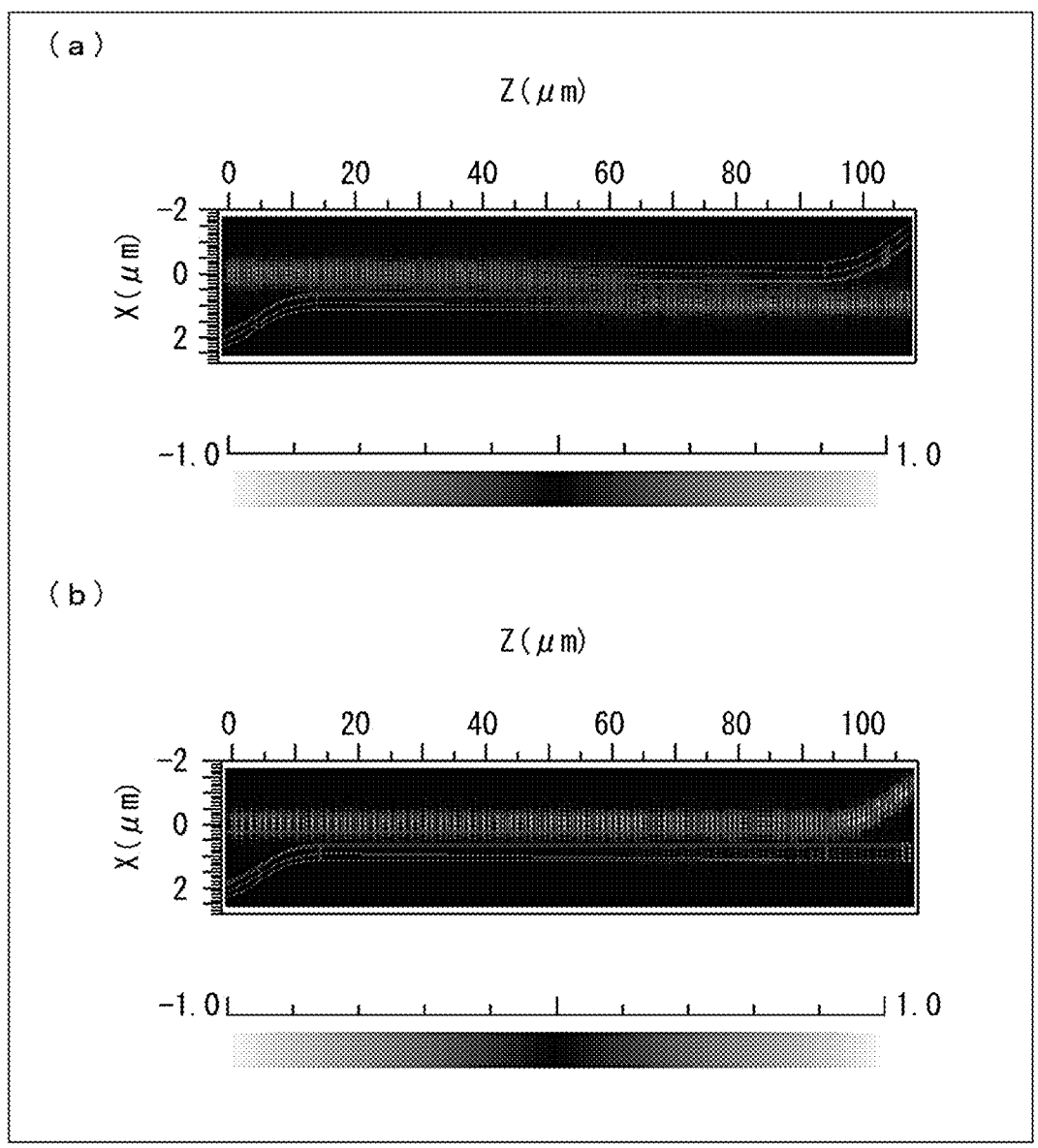

(a) of FIG. 20 is a graph showing a simulation result of an electric field distribution of an Ey component in a case where TM0 is introduced through the input port of the PBC illustrated in FIG. 18; and (b) of FIG. 20 is a graph showing a simulation result of an electric field distribution of an Ex component in a case where TE0 is introduced through the input port.

Figure 21:
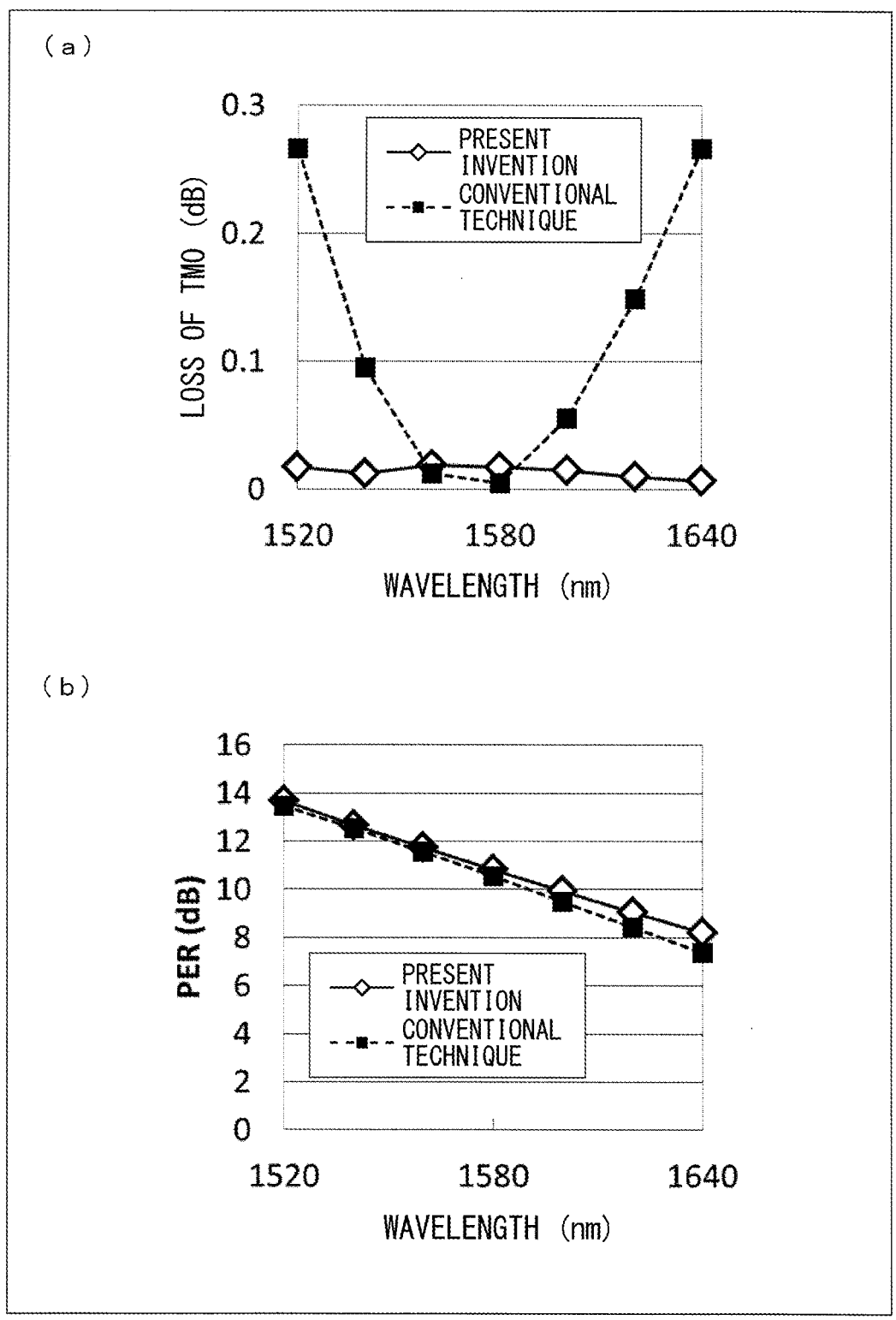
Figure 38:
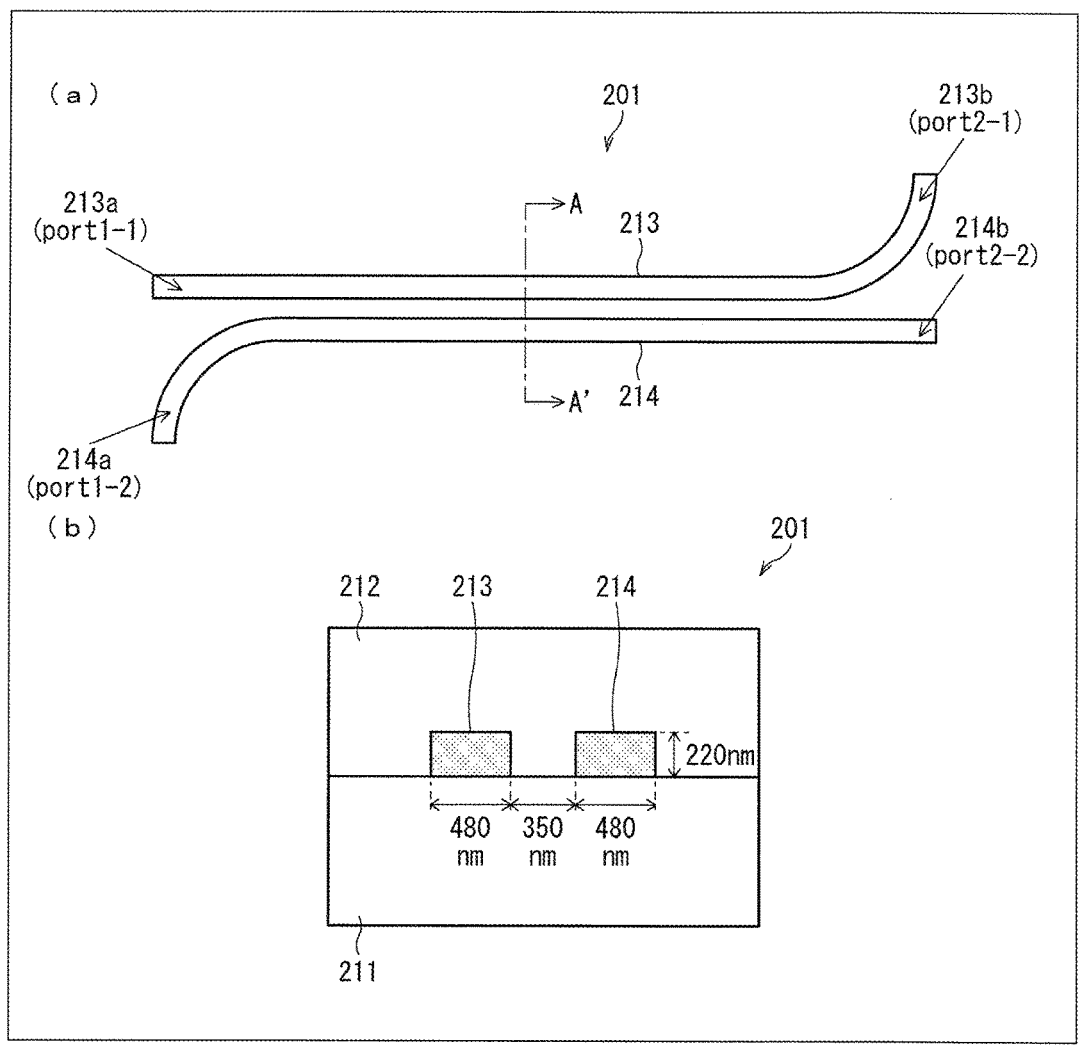

(a) of FIG. 21 is a graph showing a result of calculation of a loss of TM0 in a case where TM0 is introduced through an input port and outputted through an output port in each of the PBC illustrated in FIG. 18 and a PBC illustrated in FIG. 38, and (b) of FIG. 21 is a graph showing a result of calculation of a PER that is a loss ratio of polarized waves of TE0 and TM0 outputted through the output port in a case where TE0 and TM0 are introduced through the input port in each of the PBC illustrated in FIG. 18 and the PBC illustrated in FIG. 38.

Figure 22:
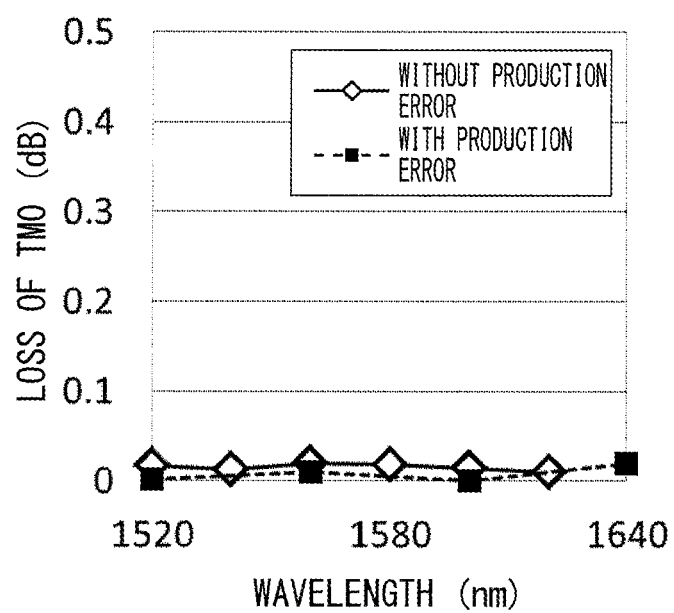

FIG. 22 is a graph showing a result of calculating, by FDTD, an influence of a production error on loss of TM0 in the PBC illustrated in FIG. 18.

Figure 23:
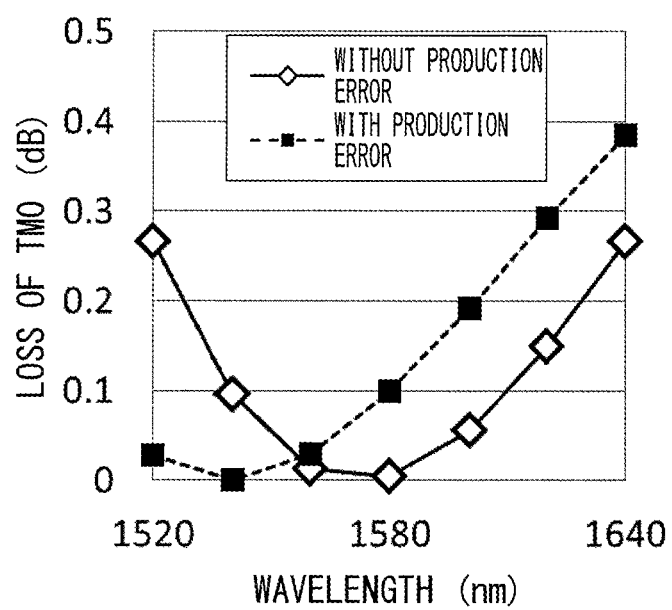

FIG. 23 is a graph showing a result of calculating, by FDTD, an influence of a production error on loss of TM0 in the PBC illustrated in FIG. 38.

Figure 24:
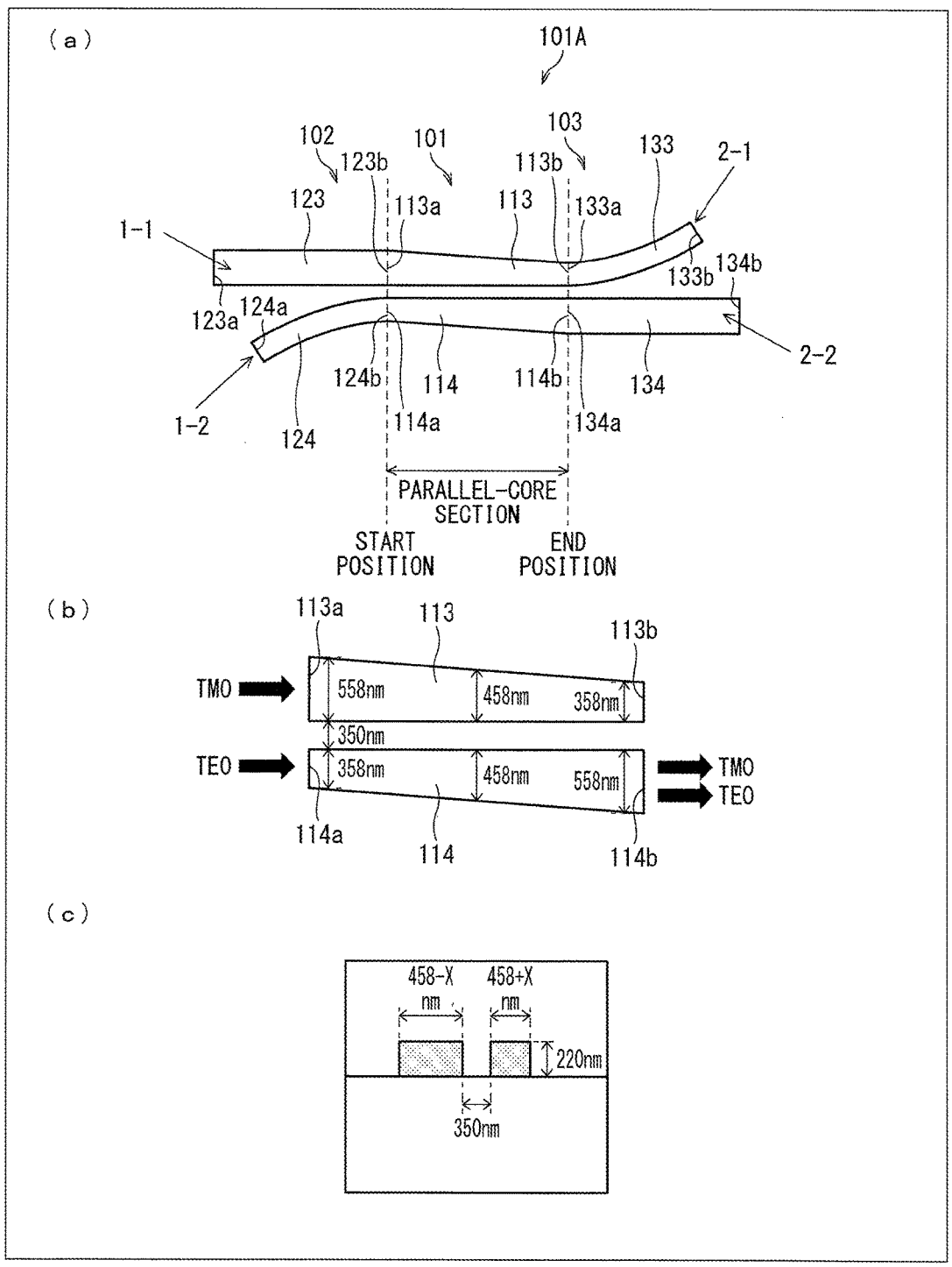

(a) of FIG. 24 is a top view illustrating a configuration of a PBC in accordance with Comparative Example, (b) of FIG. 24 is a top view illustrating a configuration of a parallel-core section of the PBC, and (c) of FIG. 24 is a cross-sectional view illustrating a configuration of the PBC.

Figure 25:
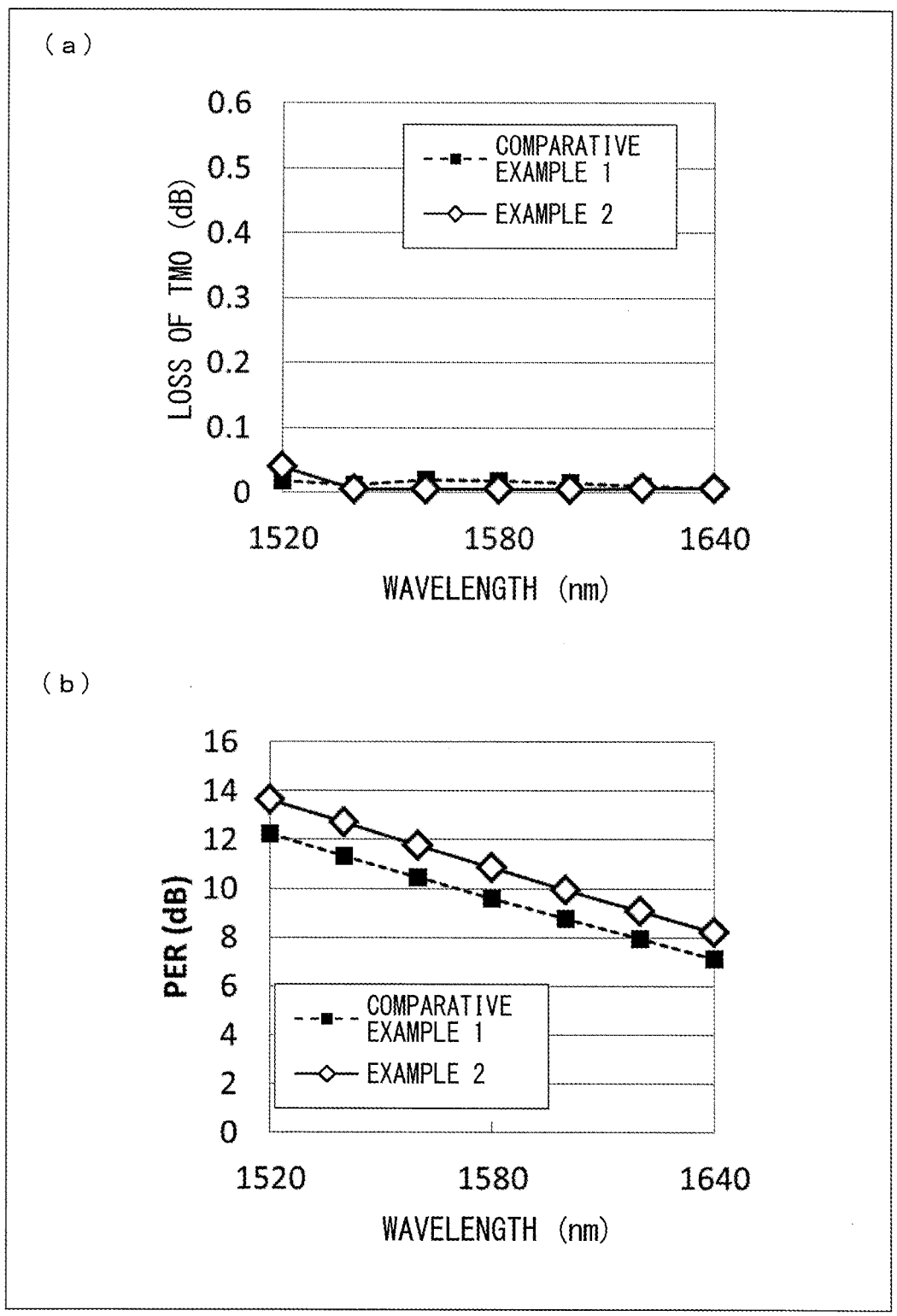

(a) of FIG. 25 shows a result of calculation of a loss of TM0 in a case where TM0 is introduced through an input port and outputted through an output port in each of the PBC in Example 2 of the present invention and the PBC in Comparative Example, and (b) of FIG. 25 shows a result of calculation of a PER that is a loss ratio of polarized waves of TE0 and TM0 outputted through the output port in a case where TE0 and TM0 are introduced through the input port in each of the PBC in Example 2 of the present invention and the PBC in Comparative Example.

Figure 26:
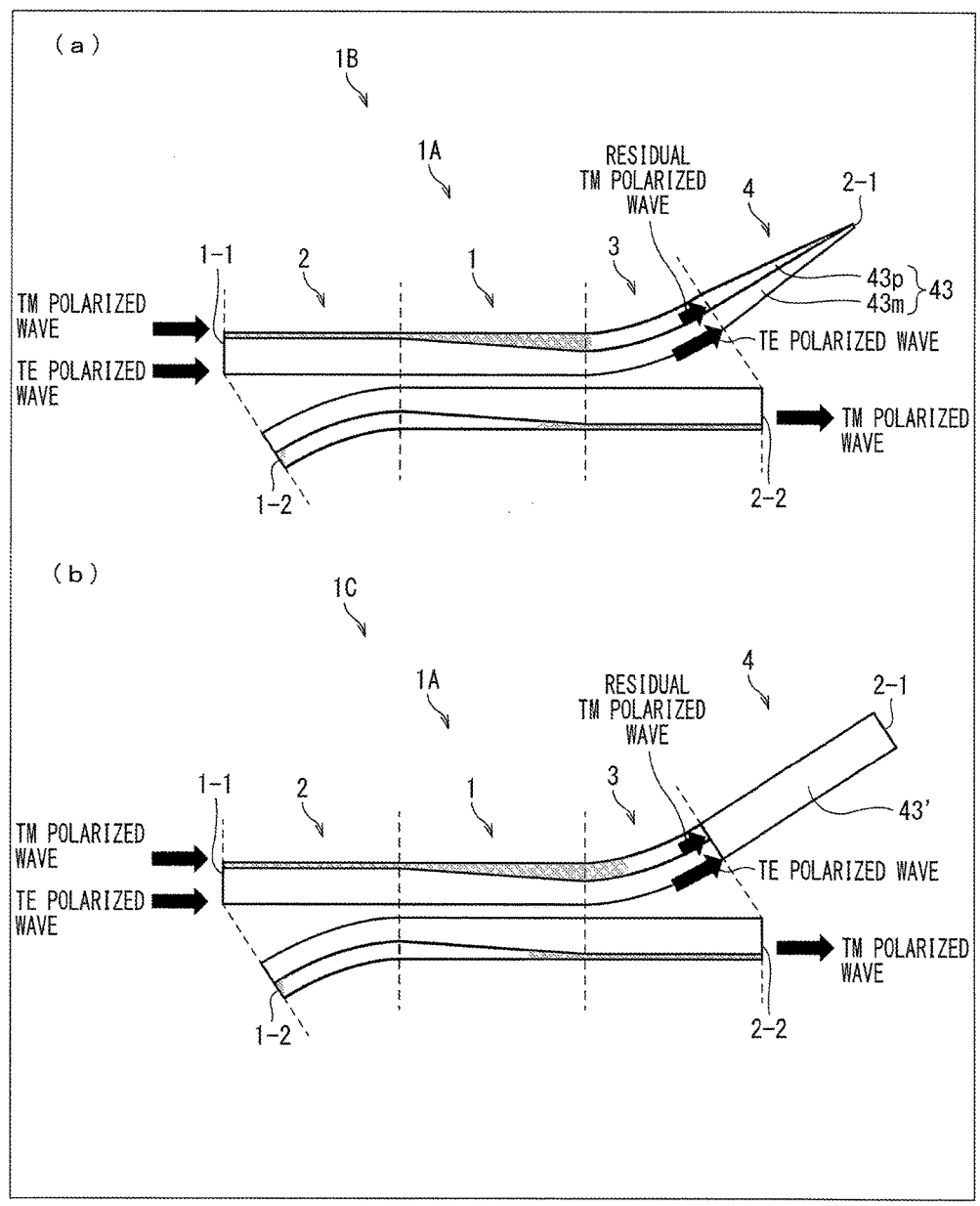

(a) of FIG. 26 is a top view illustrating a configuration of a PBC in accordance with Embodiment 3 of the present invention, and (b) of FIG. 26 is a top view illustrating a configuration of a PBC in accordance with a modification of Embodiment 3 of the present invention.

Figure 27:
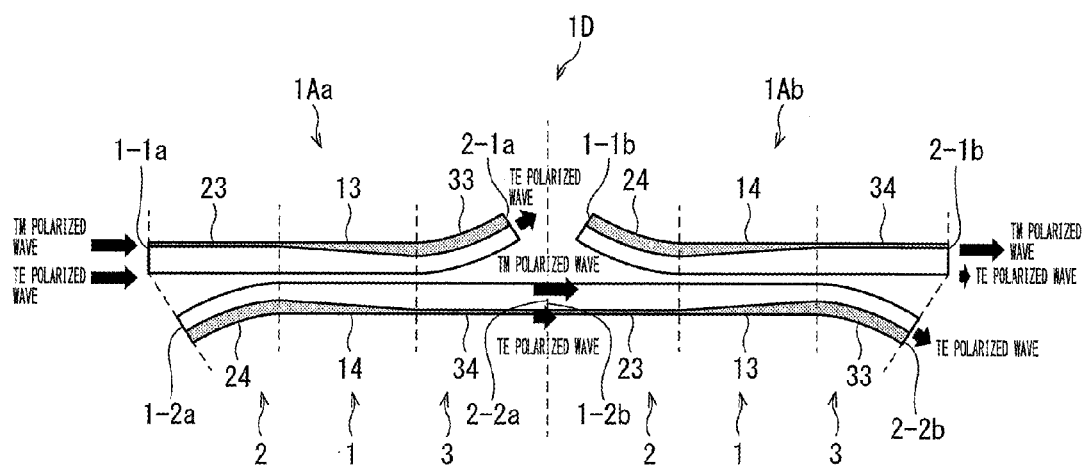

FIG. 27 is a top view illustrating a configuration of a polarizer in accordance with Embodiment 4 of the present invention.

Figure 28:
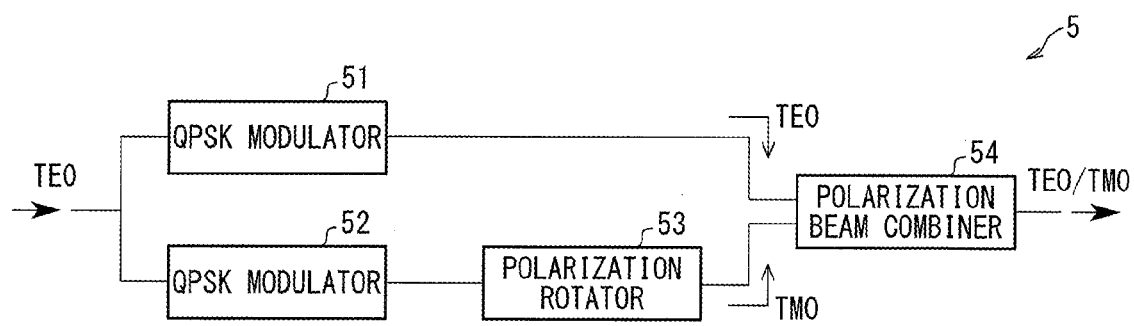

FIG. 28 is a block diagram illustrating a configuration of a modulator in accordance with Embodiment 5 of the present invention.

Figure 29:
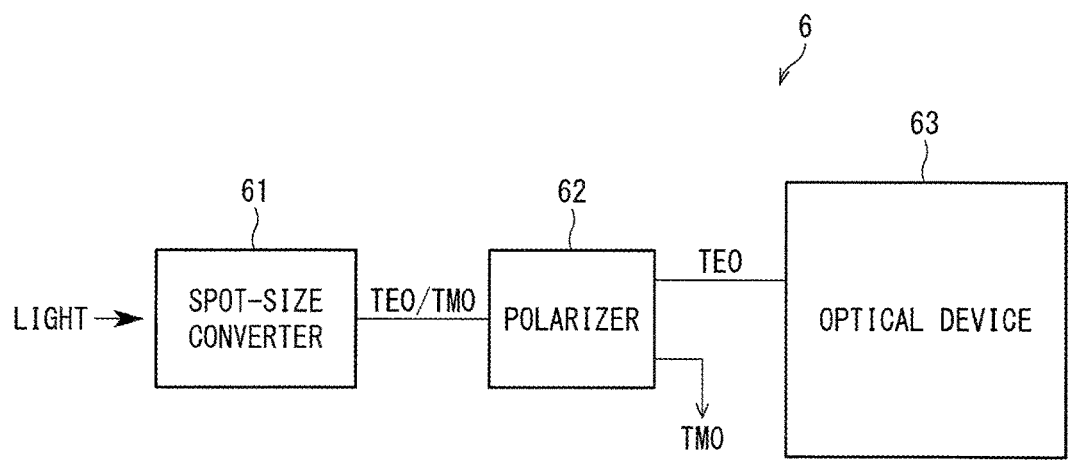

FIG. 29 is a block diagram illustrating a configuration of a substrate-type optical waveguide element in accordance with Embodiment 6 of the present invention.

Figure 30:
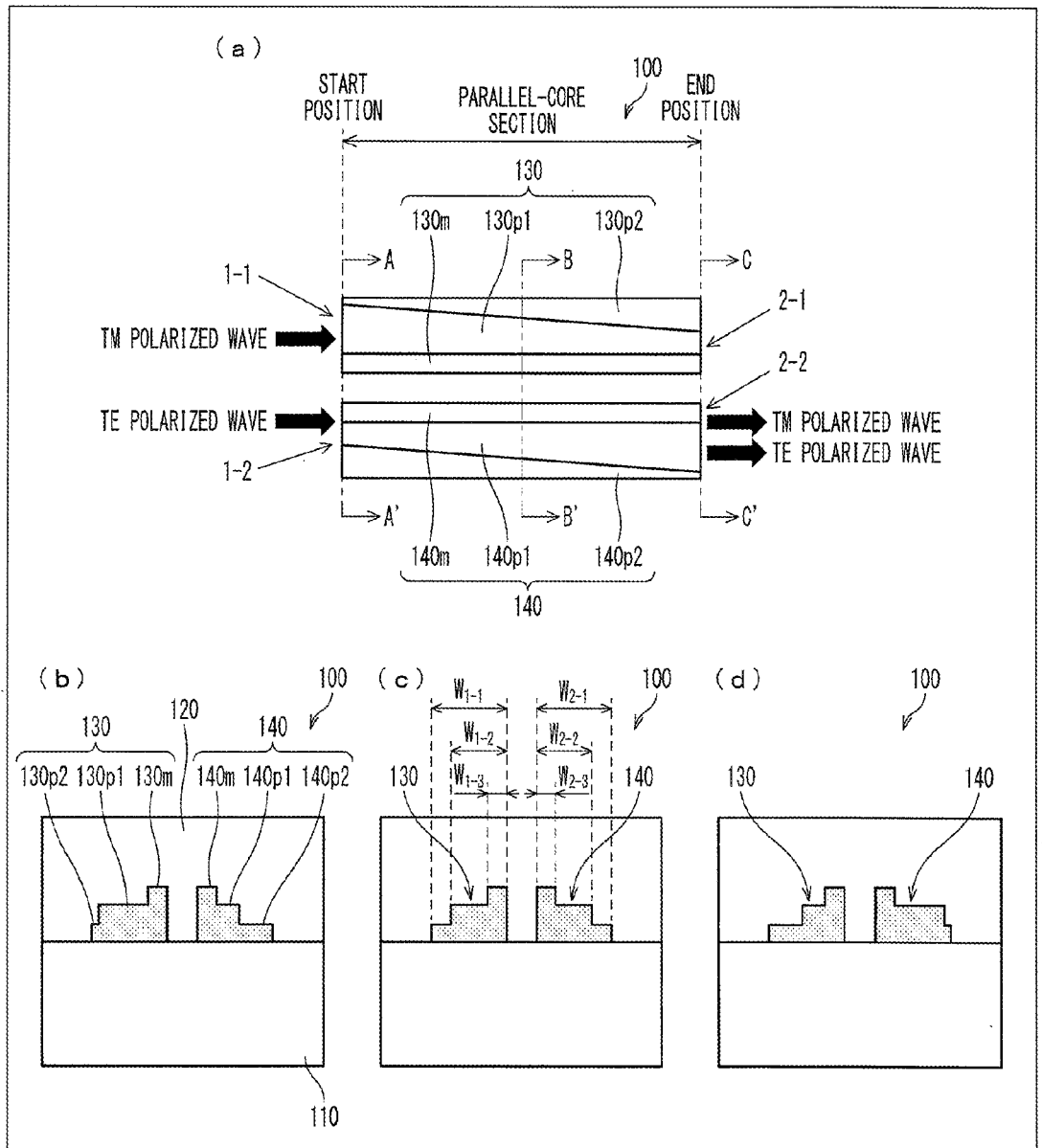

(a) of FIG. 30 is a top view illustrating a configuration of a PBC in accordance with Embodiment 7 of the present invention, (b) of FIG. 30 is a cross-sectional view of the PBC taken along line A-A' shown in (a) of FIG. 30, (c) of FIG. 30 is a cross-sectional view of the PBC taken along line B-B' shown in (a) of FIG. 30, and (d) of FIG. 30 is a cross-sectional view of the PBC taken along line C-C' shown in (a) of FIG. 30.

Figure 31:
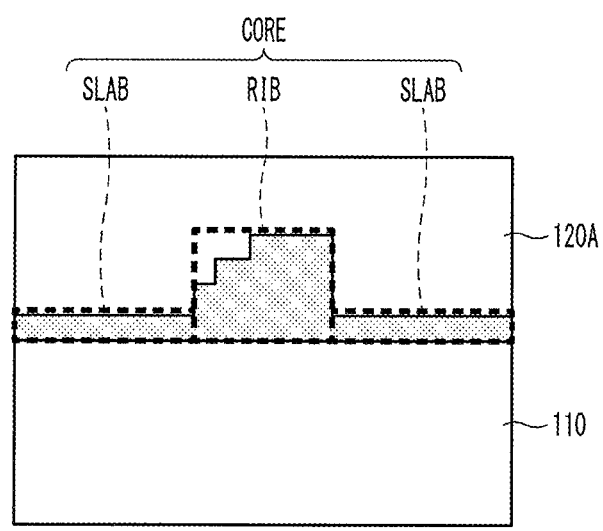

FIG. 31 is a cross-sectional view illustrating a configuration of a rib waveguide provided in a PBC in accordance with Embodiment 8 of the present invention.

Figure 32:
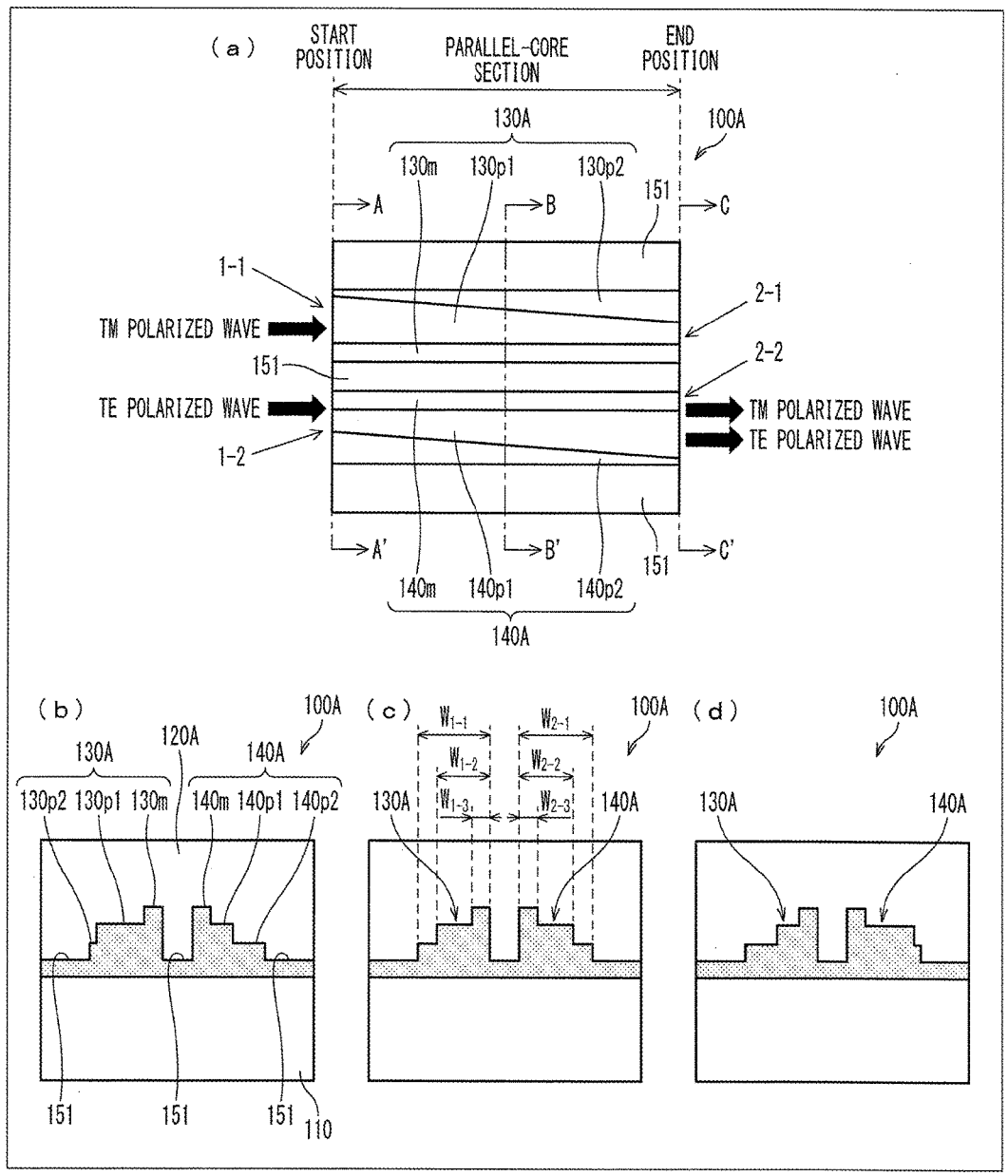

(a) of FIG. 32 is a top view illustrating a configuration of a PBC in accordance with Embodiment 8 of the present invention, (b) of FIG. 32 is a cross-sectional view of the PBC taken along line A-A' shown in (a) of FIG. 32, (c) of FIG. 32 is a cross-sectional view of the PBC taken along line B-B' shown in (a) of FIG. 32, and (d) of FIG. 32 is a cross-sectional view of the PBC taken along line C-C' shown in (a) of FIG. 32.

Figure 33:
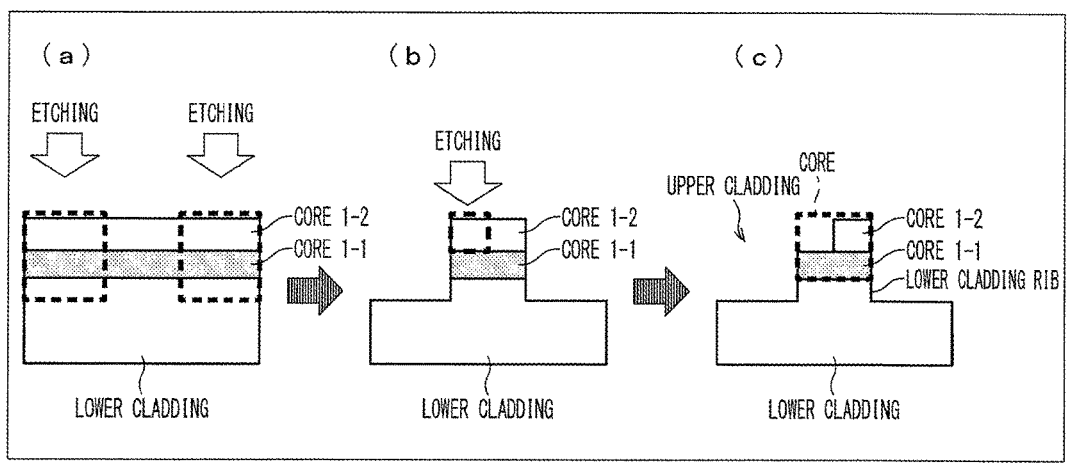

(a) and (b) of FIG. 33 are cross-sectional views illustrating a method for fabricating a ridge waveguide provided in a PBC in accordance with Embodiment 9 of the present invention, and (c) of FIG. 33 is a cross-sectional view illustrating a basic form of the ridge waveguide.

Figure 34:
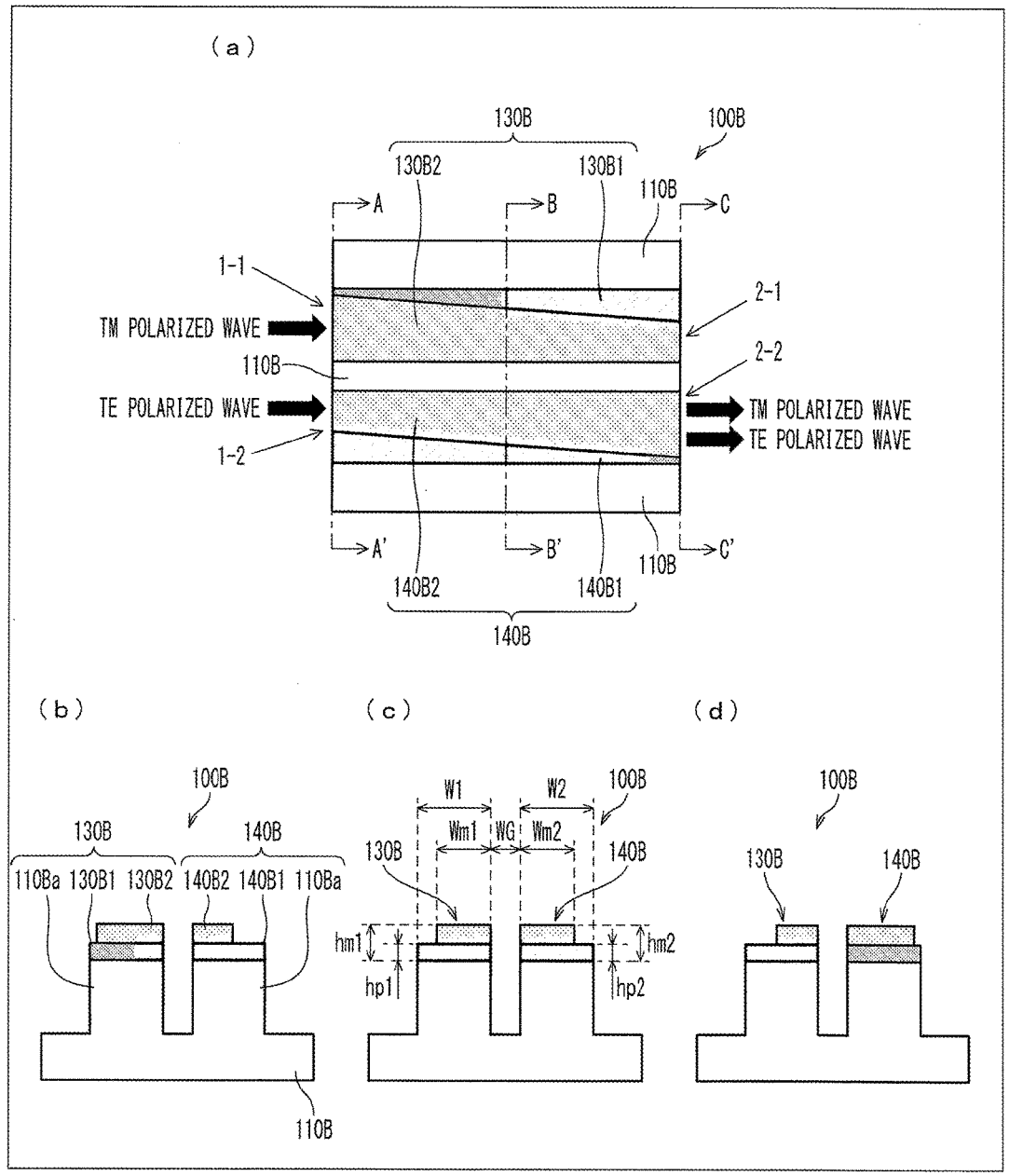

(a) of FIG. 34 is a top view illustrating a configuration of a PBC including the ridge waveguide in accordance with Embodiment 9, (b) of FIG. 34 is a cross-sectional view of the PBC taken along line A-A' shown in (a) of FIG. 34, (c) of FIG. 34 is a cross-sectional view of the PBC taken along line B-B' shown in (a) of FIG. 34, and (d) of FIG. 34 is a cross-sectional view of the PBC taken along line C-C' shown in (a) of FIG. 34.

Figure 35:
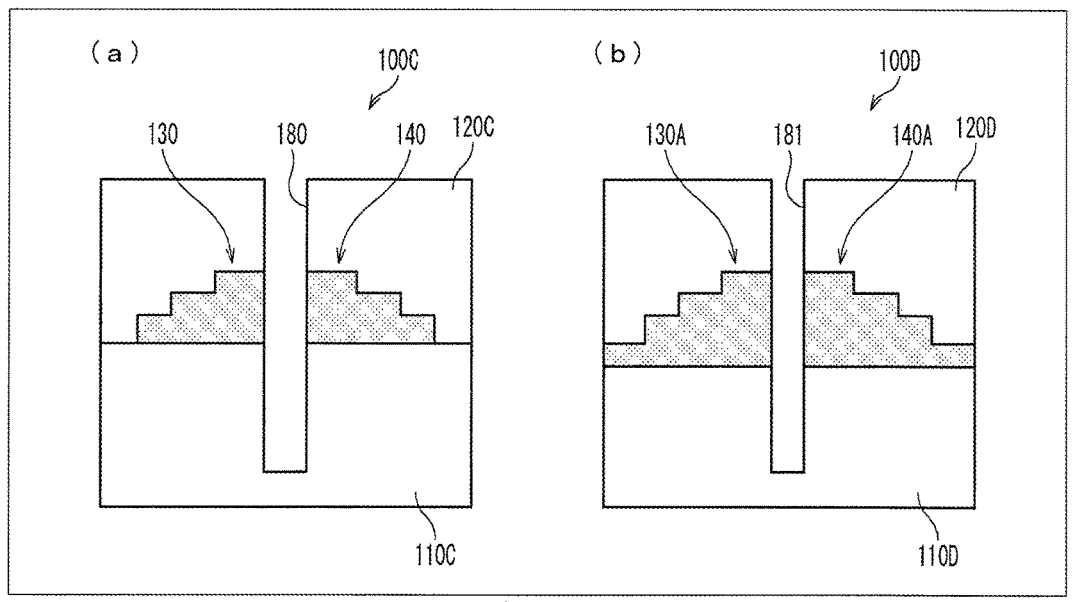

(a) of FIG. 35 is a cross-sectional view of a PBC as a modification, in a case where the PBC is cut at a position corresponding to the position of the line B-B' shown in (a) of FIG. 30, and (b) of FIG. 35 is a cross-sectional view of a PBC as another modification, in a case where the PBC is cut at a position corresponding to the position of the line B-B' shown in (a) of FIG. 32.

Figure 36:
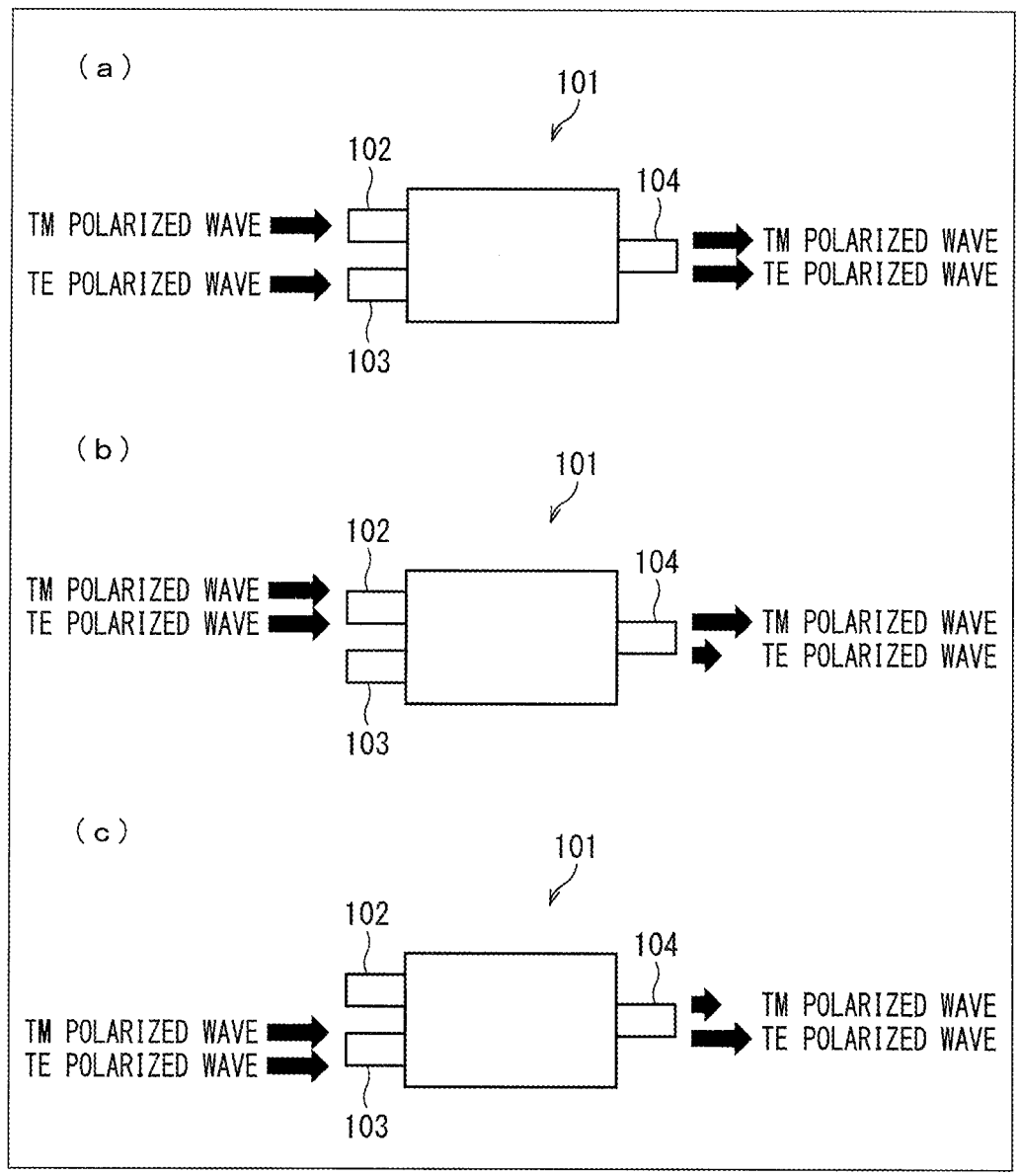

(a) of FIG. 36 is a block diagram illustrating a configuration of a general PBC; (b) of FIG. 36 is a conceptual diagram showing respective powers of a TE polarized wave and a TM polarized wave outputted through an output port, in a case where a TE polarized wave and a TM polarized wave of the same power are introduced into a PBC illustrated in (a) of FIG. 36 through a first input port of the PBC; and (c) of FIG. 36 is a conceptual diagram showing respective powers of a TE polarized wave and a TM polarized wave outputted through an output port, in a case where a TE polarized wave and a TM polarized wave of the same power are introduced into a PBC illustrated in (a) of FIG. 36 through a second input port of the PBC.

Figure 37:
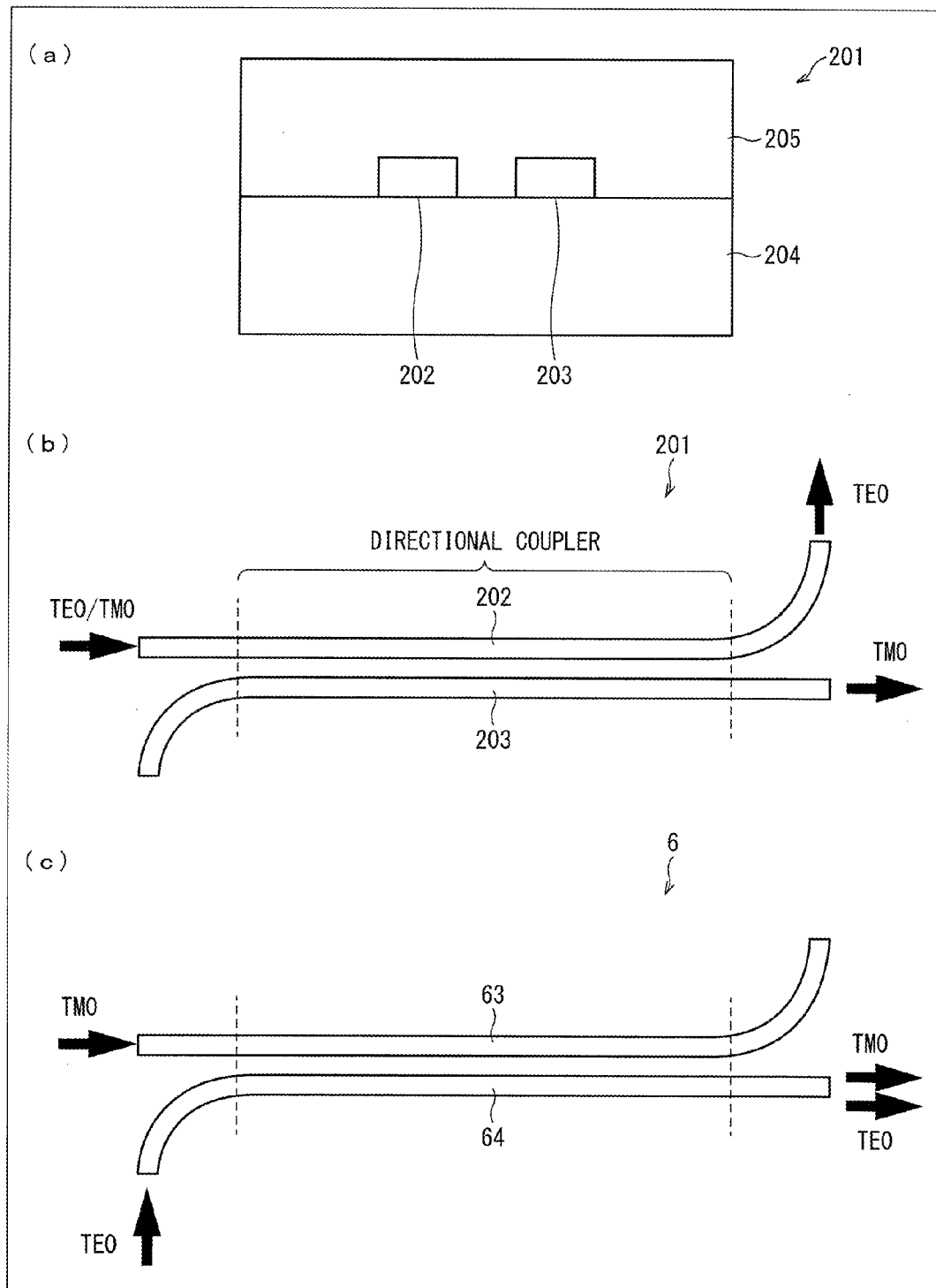

(a) of FIG. 37 is a schematic view illustrating a configuration of a polarization beam splitter disclosed in Non-Patent Literature 2. (a) of FIG. 37 is a cross-sectional view of a directional coupler of the polarization beam splitter, along a cross section orthogonal to a light traveling direction, and (b) and (c) of FIG. 37 are each a top view of a polarization beam splitter.

(a) of FIG. 38 is a top view illustrating a configuration of a PBC 201 in accordance with Comparative Example of the present invention; and (b) of FIG. 38 is a cross-sectional view of the PBC 201 taken along line A-A' shown in (a) of FIG. 38.

DESCRIPTION OF EMBODIMENTS (Basic Principle of PBC 1)

The following describes the effect yielded by a polarization beam combiner (Polarization Beam Combiner: PBC) 1 in accordance with Embodiment 1 and a basic principle that yields that effect, with reference to FIGS. 1 to 5. The PBC 1 is an aspect of a substrate-type optical waveguide element in accordance with an aspect of the present invention.

Figure 1:
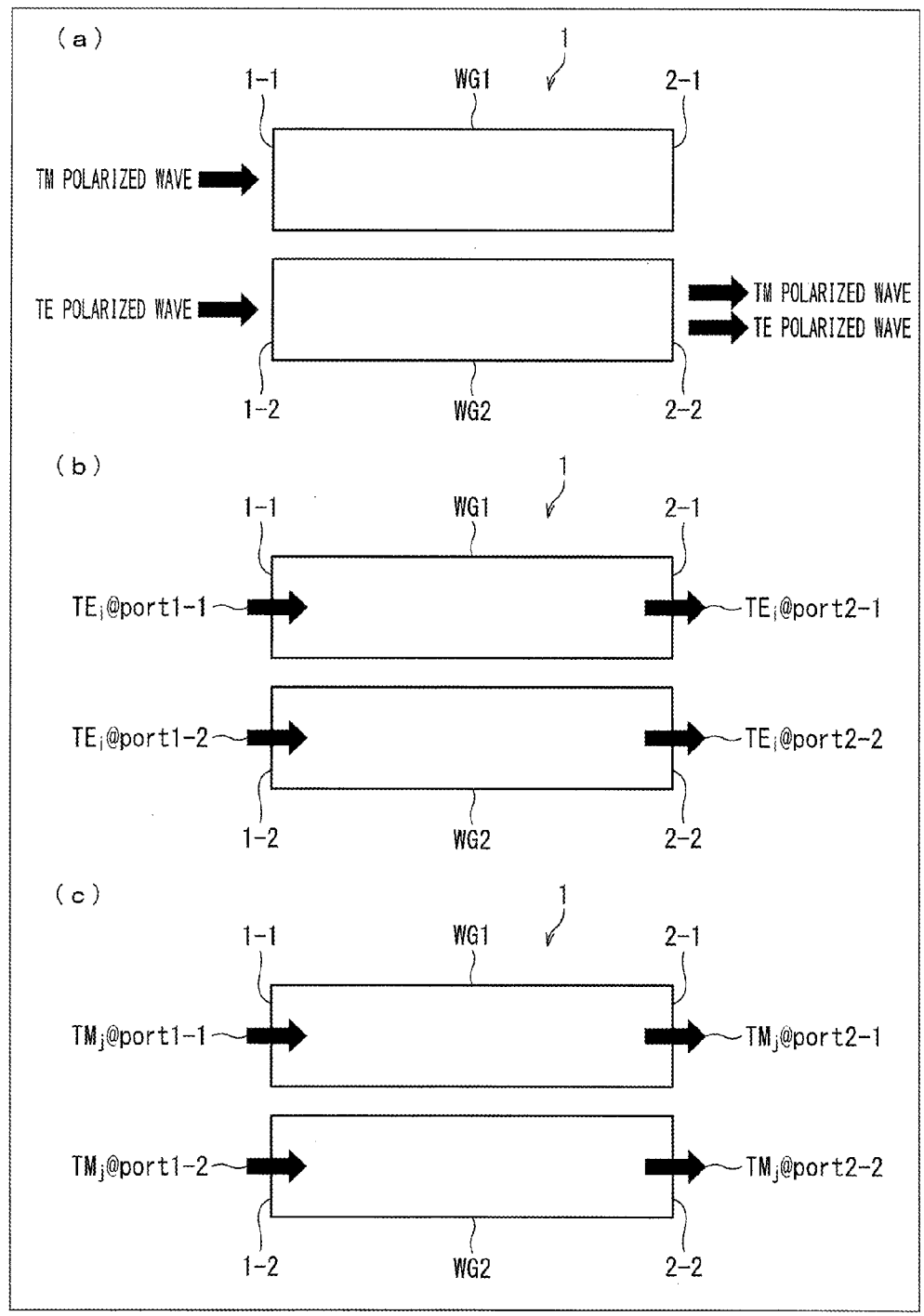
FIG. 1 is a block diagram illustrating an overview of a function of a PBC in accordance with Embodiment 1 of the present invention. (a) of FIG. 1 illustrates a state in which the PBC carries out multiplexing of a TM polarized wave and a TE polarized wave which have been introduced into the PBC; (b) of FIG. 1 defines respective names of waveguide modes of the TE polarized wave at two input ports and two output ports of the PBC; and (c) of FIG. 1 defines respective names of waveguide modes of the TM polarized wave at the two input ports and the two output ports of the PBC.

FIG. 1 is a block diagram illustrating an overview of a function of the PBC 1. (a) of FIG. 1 illustrates a state in which the PBC 1 carries out multiplexing of a TM polarized wave and a TE polarized wave which have been introduced into the PBC 1. (b) of FIG. 1 defines respective names of waveguide modes of the TE polarized wave at two input ports and two output ports of the PBC 1. (c) of FIG. 1 defines respective names of waveguide modes of the TM polarized wave at the two input ports and the two output ports of the PBC 1.

As will be described in detail later with reference to FIG. 6, the PBC 1 includes a lower cladding, a first core WG1, a second core WG2, and an upper cladding. The first core WG1 and the second core WG2 are so arranged as to extend in parallel to each other. Note that, in FIG. 1, WG1, which is a block formed by a first core, and WG2, which is a block formed by a second core, correspond to a first core 13 and a second core 14 in FIG. 6, respectively. Hereinafter, a section in which the first core WG1 and the second core WG2 are provided parallel to each other is referred to as a parallel-core section.

The PBC 1 in which the parallel-core section is provided can also be expressed as a tapered directional coupler. As will be described later, the PBC 1 is a PBC which suppresses a loss of a TM polarized wave in a wide wavelength range including a C band an L band, decreases a required accuracy of a production process, and has tolerance to a production error.

As illustrated in (a) of FIG. 1, the first core WG1 includes a port 1-1, into which light is introduced, and a port 2-1, from which light is outputted. Similarly, the second core WG2 includes a port 1-2 and a port 2-2. In other words, the ports 1-1 and 1-2 are start positions of the parallel-core section, while the ports 2-1 and 2-2 are end positions of the parallel-core section.

In a case where a TM polarized wave is inputted through the port 1-1, most of the TM polarized wave thus inputted transfers from the first core WG1 to the second core WG2 in the course of traveling the parallel-core section and is then outputted through the port 2-2. Meanwhile, in a case where a TE polarized wave is inputted through the port 1-2, most of the TE polarized wave thus inputted travels the second core WG2 and is then outputted through the port 2-2. Thus, the PBC 1 functions as a PBC by combining the TM polarized wave inputted through the port 1-1 with the TE polarized wave inputted through the port 1-2.

The names of a TE polarized wave at the ports 1-1 and 1-2 and the ports 2-1 and 2-2 are defined as in (b) of FIG. 1, and the names of a TM polarized wave at the ports 1-1 and 1-2 and the ports 2-1 and 2-2 are defined as in (c) of FIG. 1. In (b) and (c) of FIG. 1, i and j are each an integer of 0 or more. In this case, TEi means a waveguide mode having an (i+1)th highest effective refractive index among waveguide modes of the TE polarized wave in the first core WG1 or the second core WG2. Further, TMj means a waveguide mode having a (j+1)th highest effective refractive index among waveguide modes of the TM polarized wave in the first core WG1 or the second core WG2.

Figure 2:
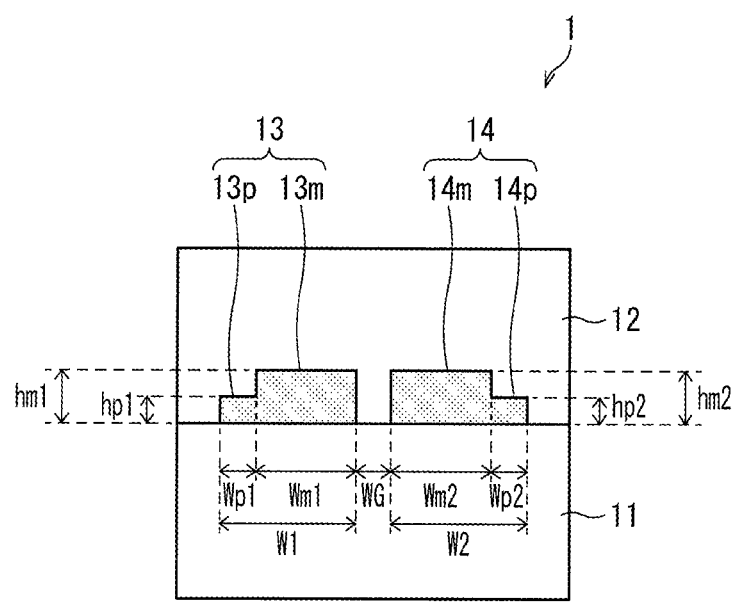
FIG. 2 is a cross-sectional view illustrating a configuration of the PBC in accordance with Embodiment 1 of the present invention.

FIG. 2 is a cross-sectional view illustrating a configuration of the PBC 1 and is a cross-sectional view of a cross section which is orthogonal to a direction in which light travels the parallel-core section. As illustrated in FIG. 2, the PBC 1 includes a lower cladding 11, a first core 13 and a second core 14 both of which are provided on the lower cladding 11, and an upper cladding 12 which is provided on the lower cladding 11 so as to bury the first core 13 and the second core 14. The first core 13 corresponds to the first core WG1 in FIG. 1, and the second core 14 corresponds to the second core WG2 in FIG. 1.

In the following description, a refractive index of the lower cladding 11 is $N_{c11}$, and a refractive index of the upper cladding 12 is $N_{c12}$. Here, $N_{c1}$ is a larger one of the refractive index $N_{c11}$ of the refractive index $N_{c11}$ and the refractive index $N_{c12}$ of the upper cladding 12. The following describes an example case where the lower cladding 11 and the upper cladding 12 are made of the same material, i.e., $N_{c1}=N_{c11}=N_{c12}$. Further, a refractive index of the first core 13 and a refractive index of the first core 14 are each $N_{co}$.

As illustrated in FIG. 2, the first core 13 includes a main part 13m having a quadrilateral cross section orthogonal to a light traveling direction and a protruding part 13p having a quadrilateral cross section orthogonal to the light traveling direction. Further, the second core 14 includes a main part 14m having a quadrilateral cross section orthogonal to the light traveling direction and a protruding part 14p having a quadrilateral cross section orthogonal to the light traveling direction. In other words, the first core 13 and the second core 14 are stepped cores each having a step-shaped cross section orthogonal to the light traveling direction.

The protruding part 13p is a protruding part that protrudes from a side surface of the main part 13m which side surface does not face the second core 14. A direction in which the protruding part 13p protrudes is a direction (i) parallel to a boundary surface between the lower cladding 11 and the upper cladding 12 and (ii) away from the second core 14. Further, the protruding part 14p is a protruding part that protrudes from a side surface of the main part 14m which side surface does not face the first core 13. A direction in which the protruding part 14p protrudes is a direction (i) parallel to the boundary surface between the lower cladding 11 and the upper cladding 12 and (ii) away from the first core 13. In other words, the protruding parts 13p and 14p protrude in directions away from each other.

In the following description, width and height of the main part 13m of the first core 13 are denoted as Wm1 and hm1, respectively, and width and height of the protruding part 13p of the first core 13 are denoted as Wp1 and hp1, respectively. Similarly, width and height of the main part 14m of the second core 14 are denoted as Wm2 and hm2, respectively, and width and height of the protruding part 14p of the second core 14 are denoted as Wp2 and hp2, respectively. Assuming that the width of the first core 13 is denoted as width W1, W1=Wm1+Wp1. Assuming that the width of the second core 14 is denoted as width W2, W2=Wm2+Wp2.

The following description assumes that the heights of the main part 13m and the main part 14m are denoted as an equal height h. That is, h=hm1=hm2. Note that the height h is also the height of the first core 13 and is also the height of the second core 14. The following description assumes that the heights of the protruding part 13p and the protruding part 14p are denoted as an equal height hp. That is, hp=hp1=hp2. The height h and the height hp satisfy hp<h.

Further, the following description assumes that a distance between the first core 13 and the second core 14 is a distance WG. In the present embodiment, the distance WG is constant throughout all areas of the parallel-core section from the start position to the end position. In other words, the first core 13 and the second core 14 are arranged in parallel to each other on the lower cladding 11.

(Features that the Present Invention and the Conventional Technique have in Common)

The first core 13 and second core 14 arranged as above have the following Features 1 to 4:

Feature 1: The height of the main part 13m is equal to the height of the main part 14m. Further, the height of the protruding part 13p is equal to the height of the protruding part 14p.

Feature 2: The first core 13 and the second core 14 are arranged so as to be separated from each other.

Feature 3: The first core 13 and the second core 14 are such that the cross section including the port 1-1 and the cross section including the port 1-2 satisfy Wm1≥Wm2 and W1>W2 or satisfy Wm1>Wm2 and W1≥W2, while the cross section including the port 2-1 and the cross section including the port 2-2 satisfy Wm1≤Wm2 and W1<W2 or satisfy Wm1<Wm2 and W1≤W2.

Feature 4: With respect to the waveguides of the first core 13 and the second core 14, the main part (13m and 14m) and the protruding part (13p and 14p) each are continuous as a function of distance from a start position of the parallel-core section.

Next, effects obtained by the above features are described.

The principle of tapered directional couplers disclosed in Non-Patent Literatures 3 and 4 is a basic principle of the PBC 1.

Non-Patent Literature 3 discloses a tapered directional coupler (in Non-Patent Literature 3, TAPERED COUPLERS) in which two optical fibers are provided so as to be adjacent to each other and each of the two optical fibers has a diameter that changes along a light traveling direction. Non-Patent Literature 4 discloses a tapered directional coupler (in Non-Patent Literature 4, ADIABATIC ASYMMETRIC DIRECTIONAL COUPLERS) in which two rectangular cores are provided so as to be adjacent to each other and each of the two rectangular cores has a width that changes along a light traveling direction. Non-Patent Literatures 3 and 4 mention use of tapered directional couplers for 100% transfer of light power from one of the cores to the other core adjacent to the one core.

The effects obtained by Features 1 to 4 will be described below.

Feature 1 enables the main part 13m and the main part 14m to be formed together during one process in forming the first core 13 and the second core 14, and enables the protruding part 13p and the protruding part 14p to be formed together during one and the same process in forming the first core 13 and the second core 14. For example, in a case where SOI (Silicon-On-Insulator) wafer is used to fabricate the PBC 1, the first core 13 and the second core 14 can be fabricated by performing two times of lithography and two times of etching on a silicon (Si) layer that is a topmost layer of the SOI wafer.

Feature 2 enables decrease of a required accuracy in lithography performed to fabricate the first core 13 and the second core 14. A high required accuracy in lithography tends to require a complicated production process for satisfying that required accuracy. Decrease of the required accuracy in lithography enables simplification of the production process.

With Feature 2, the first core 13 and the second core 14 are arranged so as to be separated from each other. This prevents the cores from contacting each other even when accuracy in lithography is low. In a case where a structure in which the first core 13 and the second core 14 contact each other is employed, it is necessary to perform lithography so that a distance between the first core 13 and the second core 14 gradually decreases. However, there is a limitation to the core distance which can be fabricated by using lithography, because diffraction of light occurs during exposure to light. Further, in a case where a smaller core distance is required, a difficulty level of the production process increases. Further, in a case where a smaller core distance is required, a difficulty level of the process increases. Therefore, the PBC 1 having Feature 2 can be provided by a simplified production process.

Features 3 and 4 can achieve a structure which produces low loss in a wide wavelength range and has tolerance to a production error.

Generally, the larger a cross sectional area of a core in cross section orthogonal to a light traveling direction (also referred to as core cross sectional area), the stronger confinement of light of TEi and TMj in the cores becomes. This consequently increases effective refractive indexes in the waveguide modes, i.e., TEi and TMj, due to influence of a core having a high refractive index. With Feature 3, the cross sectional area of the first core 13 is larger than the cross sectional area of the second core 14 in the cross section containing the port 1-1 and in the cross section containing the port 1-2. Therefore, in the case of TEi, TEi@port1-2<TEi@port1-1. In the case of TMj, TMj@port1-2<TMj@port1-1.

On the other hand, the cross sectional area of the second core 14 is larger than the cross sectional area of the first core 13 in the cross section containing the port 2-1 and in the cross section containing the port 2-2. Therefore, in the case of TEi, TEi@port2-2>TEi@port2-1. In the case of TMj, TMj@port2-2>TMj@port2-1.

Further, with Feature 4, a cross sectional shape of the first core 13 and a cross sectional shape of the second core 14 continuously change along the light traveling direction. Accordingly, an effective refractive index of TEi and an effective refractive index of TMj continuously change. As a result, the following four combinations of waveguide modes are coupled by a continuous effective refractive index curve.

Combination C1:TEi@port1-1 and TEi@port2-2
Combination C2:TEi@port1-2 and TEi@port2-1
Combination C3:TMj@port1-1 and TMj@port2-2
Combination C4:TMj@port1-2 and TMj@port2-1

The effective refractive index curve herein means a curve obtained by plotting effective refractive indexes of waveguide modes at each cross section of the waveguides including the first cores 13 and 14, respectively, at each coordinate, with respect to the light traveling direction. In general, waveguide modes on one effective refractive index curve make a core-shape change sufficiently gentle along the light traveling direction. In other words, it is possible to carry out a conversion of a waveguide mode with almost no energy loss by fixing respective widths of the main parts and respective widths of the protruding parts at the following ports: the port 1-1, the port 1-2, the port 2-1, and port 2-2, and setting a length of the parallel-core section, in which the first core 13 and the second core 14 are provided parallel to each other, to a sufficiently large length along the light traveling direction. Hereinafter, the length of the parallel-core section is also expressed as a taper length. Such a conversion between polarization modes is called an adiabatic conversion.

Therefore, in regard to Combinations C3 and C4, TMj can be transferred from the first core 13 over to the second core 14 or from the second core 14 over to the first core 13 at a low loss by making the taper length large, in light of Features 3 and 4.

The above principle will be discussed in more detail below with reference to Non-Patent Literature 3.

First, the following values are defined. Herein, λ represents a light wavelength.

$N_{TEi}$@WG1: an effective refractive index of TEi in a case where the first core 13 (WG1) alone is present by being buried by a lower cladding 211 and a upper cladding 212

$N_{TEi}$@WG2: an effective refractive index of TEi in a case where the second core 14 alone is present by being buried by the lower cladding 211 and the upper cladding 212

$N_{TEi}$@WG1 and $N_{TEi}$@WG2 are related to Mathematical Expression (19-14) of Non-Patent Literature 3 as below.

In regard to $$\overline{\beta_1}(z), \overline{\beta_2}(z),$$ [Math. 7]

$N_{TEi}$@WG1 and $N_{TEi}$@WG2 correspond respectively to:

$$\overline{\beta_1}(z)/(2\pi/\lambda), \overline{\beta_2}(z)/(2\pi/\lambda).$$ [Math. 8]

$N_{TMj}$@WG1: an effective refractive index of TMj in a case where the first core 13 (WG1) alone is present by being buried by the lower cladding 211 and the upper cladding 212

$N_{TMj}$@WG2: an effective refractive index of TMj in a case where the second core 14 alone is present by being buried by the lower cladding 211 and the upper cladding 212

$N_{TMj}$@WG1 and $N_{TMj}$@WG2 are related to Mathematical Expression (19-14) of Non-Patent Literature 3 as below.

In regard to $$\overline{\beta_1}(z), \overline{\beta_2}(z),$$ [Math. 9]

$N_{TMj}$@WG1 and $N_{TMj}$@WG2 respectively correspond to:

$$\overline{\beta_1}(z)/(2\pi/\lambda), \overline{\beta_2}(z)/(2\pi/\lambda).$$ [Math. 10]

$C_{TEi}$: strength of optical coupling between TEi of the first core 13 and TEi of the second core 14

$C_{TMj}$: strength of optical coupling between TMj of the first core 13 and TMj of the second core 14

$C_{TEi}$ and $C_{TMj}$ correspond to C(z) in Mathematical Expression (19-14) of Non-Patent Literature 3.

$$\delta_{TEi}=(\pi/\lambda)\times|N_{TEi}@WG1-N_{TEi}@WG2|$$

$$\delta_{TMj}=(\pi/\lambda)\times|N_{TMj}@WG1-N_{TMj}@WG2|$$

Note however that the above-described definitions of respective variables are based on local modes at a cross section orthogonal to the light traveling direction. $\delta_{TEi}$ is related to difference in phase velocity between TEi of the first core 13 and TEi of the second core 14, while $\delta_{TMj}$ is related to difference in phase velocity between TMj of the first core 13 and TMj of the second core 14. The closer the value of $\delta_{TEi}$ is with respect to 0, the more TEi of the first core 13 and TEi of the second core 14 match in phase. The closer the value of $\delta_{TMj}$ is with respect to 0, the more TMj of the first core 13 and TMj of the second core 14 match in phase. The following will discuss conditions under which TMj transfers over to the second core 14 from the first core 13.

When $C_{TMj} \ll \delta_{TMj}$, a degree of phase mismatch is dominant to strength of optical coupling. Accordingly, TMj of the first core 13 is locally present in the first core 13 while TMj of the second core 14 is locally present in the second core 14. In other words, TMj of the first core 13 and TMj of the second core 14 hardly interact with each other. As a result, an electric filed distribution is similar to that in a case where the first core 13 or the second core 14 is present independently in the claddings (211, 212).

On the other hand, when $C_{TMj} \gg \delta_{TMj}$, strength of optical coupling is dominant to a degree of phase matching. Accordingly, TMj of the first core 13 is present over both the first core 13 and the second core 14. Similarly, TMj of the second core 14 is also present over both the first core 13 and the second core 14. Such a waveguide mode is called a super mode. In other words, it can be said that TMj of the first core 13 and TMj of the second core 14 interact with each other.

With Feature 3, $\delta_{TMj}$ is large at the port 1-1, the port 1-2, the port 2-1, and the port 2-2. As a result, TMj is locally present in one of the cores. By gradually changing the core width of at least one of the main part and the protruding part along the light traveling direction, $\delta_{TMj}$ approaches 0. Accordingly, optical coupling is gradually performed. In a portion where $\delta_{TMj}=0$ (cross section orthogonal to the light traveling direction), an electric field of TMj is present in both the first core 13 and the second core 14 at power ratios equal to each other. TMj transfers between the first core 13 and the second core 14 via such optical coupling.

In view of the above, the PBC 1 having Features 1 to 4 can reduce loss of TMj in a wide wavelength range for the following reason.

As described above, a portion where TMj transfers between the first core 13 and the second core 14 in a tapered directional coupler is the portion where $\delta_{TMj}=0$ in the parallel-core section. Even when a change in wavelength occurs, designing the PBC 1 to always have Feature 3 leads to the parallel-core section containing a cross section where $N_{TMj}@WG1$ is identical to $N_{TMj}@WG2$ somewhere. Accordingly, the transfer of TMj between the first core 13 and the second core 14 occurs. In other words, the PBC 1 carries out a low-loss operation in a wide wavelength range.

The following is a reason why the PBC 1 is tolerant to production errors. Examples of the production error that may occur during the production of the PBC 1 include: (1) variations in width of the main part of the core and in width of the protruding part of the core from designed values; (2) variations in height of the main part and in height of the protruding part from designed values; (3) variations in refractive indexes of the cladding (11, 12) and the core (13, 14) from designed values; and (4) the core (13, 14) shaped in a quadrilateral having low symmetry (e.g., a trapezoid) rather than in a quadrilateral as designed (e.g., a rectangle).

Even in a case where production errors occur for any of the reasons (1) to (4), designing the PBC 1 so as to satisfy Feature 3 makes the width of the first core 13 and the width of the second core 14 identical to each other in any cross section included in the parallel-core section. That is, $N_{TMj}@WG1$ and $N_{TMj}@WG2$ are identical to each other. Thus, even when there occur production errors in the PBC 1, transfer of TMj between the first core 13 and the second core 14 is possible. Therefore, it can be said that the PBC 1 is tolerant to production errors.

Note that the protruding part (13p, 14p) is preferably formed in contact with a boundary surface between the lower cladding 11 and the upper cladding 12. The core (13, 14) including such a protruding part (13p, 14p) can be produced by performing two times of lithography and two times of etching on the silicon layer of the SOI wafer. In other words, it is possible to produce the PBC 1 by a simple production process.

Even in a case where the PBC 1 includes the protruding part (13p, 14p) is formed, not in contact with the boundary surface, such that a top surface of the protruding part (13p, 14p) and a top surface of the main part (13m, 14m) are in the same level, the PBC 1 can perform 100% transfer of light power from one of the cores over to the other core adjacent to the one core. Unfortunately, production of a core (13, 14) including such a protruding part (13p, 14p) requires a complicated production process in comparison with two times of lithography and two times of etching.

(Features Unique to PBC 1)

Next, the following description will discuss Features 5 and 6 possessed by the first core 13 and the second core 14.

Feature 5: At each cross section orthogonal to the light traveling direction in the parallel-core section, an effective refractive index $N_{TM}@WG1$ of TMj in the first core 13 is always smaller than an effective refractive index $N_{TE}@WG1$ of TEi in the first core 13, while an effective refractive index $N_{TM}@WG2$ of TMj in the second core 14 is always smaller than an effective refractive index $N_{TE}@WG2$ of TEi in the second core 14. That is, at each cross section orthogonal to the light traveling direction in the parallel-core section, the effective refractive indexes satisfy $N_{TM}@WG1 < N_{TE}@WG1$ and satisfy $N_{TM}@WG2 < N_{TE}@WG2$.

Feature 6: At any coordinates in the light traveling direction in the parallel-core section, a core width (e.g., W1) of at least one of the first core 13 and the second core 14 (e.g., the first core 13) is always different from a width (e.g., Wm1) of the main part, at each cross section orthogonal to the light traveling direction in the parallel-core section. Further, the protruding part of one of the cores protrudes in a direction away from the protruding part of the other one of the cores.

Alternatively, Feature 6 can translate into the following Feature 6':

Feature 6': At least one of the first core 13 and the second core 14 (e.g., the first core 13) includes (1) a main part (e.g., 13m) having a quadrilateral cross section orthogonal to the light traveling direction and (2) a protruding part (e.g., 13p) protruding from one of side surfaces of the main part (e.g., 13m) in a direction parallel to a boundary surface between the lower cladding 11 and the upper cladding 12, the protruding part having a quadrilateral cross section orthogonal to the light traveling direction.

The PBC 1 having Features 5 and 6 functions as a PBC. More specifically, as illustrated in (a) of FIG. 1, of light traveling the parallel-core section of the PBC 1, light power of TMj transfers from one of the cores over to the other one of the cores. On the other hand, very little light power of TEi transfers from one of the cores over to the other one of the cores, and most light power of TEi is outputted from the one core. Thus, the PBC 1 has the function of transferring only light power of TMj, of light traveling the parallel-core section, from one of the cores over to the other one of the cores. With use of this function, for example, when TMj is introduced through the port 1-1 into the first core WG1 while TEi is introduced through the port 1-2 into the second core WG2, TMj and TEi thus introduced are combined and then simultaneously outputted through the port 2-2. Therefore, it can be said that the PBC 1 functions as a PBC. Further, when TEi and TMj are simultaneously introduced through the port 2-2, TMj is outputted through the port 1-1, and TEi is outputted through the port 1-2. Therefore, it can also be said that the present invention functions as a polarization beam splitter.

The following states a reason why such effects are yielded.

With Feature 5, a degree of confinement of TEi in a core becomes higher than a degree of confinement of TMj in a core regardless of whether the core is the first core WG1 or the second core WG2. This is because a magnitude of the effective refractive index of each polarized wave corresponds to strength of confinement of each polarized wave in a core. In other words, light of TMj leaks out into a cladding more than light of TEi.

The PBC 1 having not only Feature 5 but also Feature 6 provides a higher degree of confinement of light of TEi in each of the cores (13 and 14) in comparison with the PBC 1 in which each of the cores (13 and 14) does not include a protruding part (13p or 14p). On the other hand, a degree of confinement of light of TMj in each of the cores (13 and 14) does not significantly change. This means that the PBC 1 having not only Feature 5 but also Feature 6 further increases the degree of confinement of TEi, which degree is higher than the degree of confinement of TMj. This further increases a difference between the degree of confinement of TEi in a core and the degree of confinement of TMj in a core.

The following states a reason why having Feature 6 further increases such a difference.

The electric field of TEi mainly has an electric field component (Ex) in a width direction (x direction) of each of the cores (13 and 14). Meanwhile, the electric field of TMj mainly has an electric field component (Ey) in a height direction (y direction) of each of the cores (13 and 14). Increased widths (Wm1 and Wm2) of the main parts (13m and 14m) of the cores (13 and 14), or increased widths (W1 and W2) of the cores (13 and 14) enhance confinement of TEi and TMj in each of the cores (13 and 14). Accordingly, an effective refractive index of TEi and an effective refractive index of TMj increases. An increase rate of the effective refractive index of TEi is larger than that of TMj. This can be explained by a boundary condition of an electric field between the core and the cladding. Based on Maxwell's equations, the boundary condition of electric fields at side surfaces (both lateral (right and left) surfaces) of the core is expressed by Formulae (1) and (2):

[Math. 11]

$$E_x^{cl}(\text{SIDE SURFACE}) = \left(\frac{N_{co}}{N_{cl}}\right)^2 E_x^{co}(\text{SIDE SURFACE}) \quad (1)$$

[Math. 12]

$$E_y^{cl}(\text{SIDE SURFACE}) = E_y^{co}(\text{SIDE SURFACE}) \quad (2)$$

where each parameter represents as follows:

$E_x^{cl}(\text{SIDE SURFACE})$ [Math. 13]

represents a cladding-side Ex at each of the lateral boundaries;

$E_x^{co}(\text{SIDE SURFACE})$ [Math. 14]

represents a core-side Ex at each of the lateral boundaries;

$E_y^{cl}(\text{SIDE SURFACE})$ [Math. 15]

represents a cladding-side Ey at each of the lateral boundaries;

$E_y^{co}(\text{SIDE SURFACE})$ [Math. 16]

represents a core-side Ey at each of the lateral boundaries;

$N_{co}$ [Math. 17]

represents a refractive index of each of the cores; and $N_{cl}$ [Math. 18]

represents a refractive index of each of the claddings.

Formula (1) is largely related to TEi, while Formula (2) is largely related to TMj. In Formula (1), $N_{co} > N_{cl}$. Accordingly, Ex is discontinuous at each core-side lateral boundary, and an electric field is more largely distributed on a cladding side, according to:

$E_x^{cl}(\text{SIDE SURFACE}) > E_x^{co}(\text{SIDE SURFACE}).$ [Math. 19]

Accordingly, when the core width increases, Ex largely distributed outside the core is then distributed inside the core. As a result, the electric field is largely confined in the core. Meanwhile, in Formula (2), Ey continuously changes at each core-side lateral boundary. Accordingly, Ey does not change as much Ex as a result of the change in the core width. Thus, when the waveguide width increases, TEi whose main electric field is Ex is confined in the core more than TMj whose main electric field is Ey.

In addition to the above description, Feature 6 provides the protruding part (13p and 14p) extending from the side surface of the main part (13m and 14m) of the core and being smaller in height than the main part (13m and 14m) of the core. This further increases a difference in degree of light confinement between TEi and TMj.

With Feature 6, at least one of the first core 13 and the second core 14 is a stepped core having a step-shaped cross section orthogonal to the light traveling direction. As discussed below, in the protruding part (13p and 14p), an electric field of TEi is confined more strongly than an electric field of TMj. Based on Maxwell equations, the boundary condition of electric fields at upper and lower surfaces (end surfaces in the height direction) of the cores is as follows:

[Math. 20]

$$E_x^{cl}\begin{pmatrix}\text{upper}\\\text{or}\\\text{lower}\\\text{surface}\end{pmatrix}=E_x^{co}\begin{pmatrix}\text{upper}\\\text{or}\\\text{lower}\\\text{surface}\end{pmatrix} \quad (3)$$

[Math. 21]

$$E_y^{cl}\begin{pmatrix}\text{upper}\\\text{or}\\\text{lower}\\\text{surface}\end{pmatrix}=\left(\frac{N_{co}}{N_{cl}}\right)^2 E_y^{co}\begin{pmatrix}\text{upper}\\\text{or}\\\text{lower}\\\text{surface}\end{pmatrix} \quad (4)$$

where each parameter represents as follows:

[Math. 22]

$$E_x^{cl}\begin{pmatrix}\text{upper}\\\text{or}\\\text{lower}\\\text{surface}\end{pmatrix}$$

represents cladding-side Ex at each of the upper and lower boundaries.

[Math. 23]

$$E_x^{co}\begin{pmatrix}\text{upper}\\\text{or}\\\text{lower}\\\text{surface}\end{pmatrix}$$

represents core-side Ex at each of the upper and lower boundaries.

[Math. 24]

$$E_y^{cl}\begin{pmatrix}\text{upper}\\\text{or}\\\text{lower}\\\text{surface}\end{pmatrix}$$

represents cladding-side Ey at each of the upper and lower boundaries.

[Math. 25]

$$E_y^{co}\begin{pmatrix}\text{upper}\\\text{or}\\\text{lower}\\\text{surface}\end{pmatrix}$$

represents core-side Ey at each of the upper and lower boundaries.

At each of the upper and lower boundaries of the cores, Ey is discontinuous whereas Ex is continuous, as opposed to the Ey and Ex at each of the lateral boundaries of the cores. Therefore, with a change in height of each core (13 and 14), the degree of confinement of an electric field of TMj changes more significantly than the degree of confinement of an electric field of TEi. When the height of each core (13 and 14) decreases, the degree of confinement of an electric field (TEi and TMj) into the core becomes low. Therefore, the core having the protruding part (13p and 14p) smaller in height than the main part (13m and 14m) obtains the effect that the degree of confinement of TMj into the core is low, whereas the degree of confinement of TEi into the core is high.

Results of calculation of an electric field distribution of Ex of TE0 in the stepped core and an electric field distribution of Ey of TM0 in the stepped core are shown in (b) and (c) of FIG. 3, respectively. (a) of FIG. 3 is a cross-sectional view illustrating a configuration of a substrate-type waveguide element 201a used for calculation of these electric field distributions. The substrate-type waveguide element 201a includes a lower cladding 211, a core 213 which is provided on the lower cladding 211, and an upper cladding 212 which is provided on the lower cladding 211 so as to bury the core 213. The PBC 1 includes the first core 13 and the second core 14, whereas the substrate-type waveguide element 201a includes a single core 213 alone. The core 213 is configured similarly to the first core 13 of the PBC 1. More specifically, the core 213 includes a main part 213m and a protruding part 213p each having a quadrilateral cross section.

Wavelengths of TE0 and TM0 propagating through the core 213 was 1580 nm. Comparison between electric field intensities shown in (b) and (c) of FIG. 3 shows that Ex of TE0 is largely distributed in the protruding part 213p, whereas Ey of TM0 is not distributed much in the protruding part 213p.

In the PBC 1, the protruding part (13p or 14p) of one core (13 or 14) is provided on a side where the other core (14 or 13) is not present. In other words, the protruding parts (13p or 14p) protrude in directions away from each other. Thus, the protruding part (13p or 14p) yields the effect of suppressing leakage of an electric field of TEi into the other core (14 or 13), but not inhibiting the leakage of an electric field of TMj into the other core (14 or 13).

As described above, light of TMj leaks into the other core (14 or 13) more than light of TEi. At this time, TMj provides stronger optical coupling that occurs between the cores 13 and 14, in comparison with TEi. Accordingly, the following Formula (5) is always established.

[Math. 26]

$$C_{TMj} > C_{TEi} \quad (5)$$

The above relation is relevant to a taper length required for transfer of TEi and TMj between the cores 13 and 14 by an adiabatic change. One evaluation index of this taper length is Zb expressed by Mathematical Expression (19-3) of Non-Patent Literature 3. The larger the value of Zb becomes, the longer the taper length needs to be. Zb depends on a difference between propagation constants of respective two waveguide modes of polarized waves having respective main components present along one direction, which waveguide modes are propagating through the cores 13 and 14 (difference in effective refractive index/($2\pi/\lambda$)). Therefore, Zb of TEi and Zb of TMj can be expressed by the following Formulae (6) and (7), respectively.

[Math. 27]

$$Zb(TEi) = 2\pi/\sqrt{C_{TEi}^2 + \delta_{TEi}^2} \quad (6)$$

[Math. 28]

$$Zb(TMj) = 2\pi/\sqrt{C_{TMj}^2 + \delta_{TMj}^2} \quad (7)$$

According to Formula (6), Zb(TEi) takes the largest value when $\delta_{TEi}=0$. According to Formula (7), Zb(TMj) takes the largest value when $\delta_{TMj}=0$. Therefore, a maximum value of Zb(TEi) is expressed by Formula (8), while a maximum value of Zb(TMj) is expressed by Formula (9).

[Math. 29]

$$Zb(TEi) = 2\pi/C_{TEi} \quad (8)$$

[Math. 30]

$$Zb(TMj) = 2\pi/C_{TMj} \quad (9)$$

According to Formulae (8) and (9), when the optical coupling is stronger between the cores 13 and 14, an adiabatic transfer between waveguides occurs at a short taper length. With Features 5 and 6 possessed by the PBC1, the relation of Formula (5) is established, so that Zb(TMj) is shorter than Zb(TEi). In other words, setting the taper length to coincide with a length of a parallel-core section required for an adiabatic transfer of TMj between the cores 13 and 14 allows the PBC 1 to achieve the function of transferring TMj at a low loss from one of the cores over to the other one of the cores, while hardly transferring TEi from one of the cores over to the other one of the cores.

Further, with Feature 6, the PBC 1 obtains the following effect. A strong transfer of TEi between the cores occurs in an area where $C_{TE} \gg \delta_{TEi}$, and a strong transfer of TMj occurs between the cores in an area where $C_{TMj} \gg \delta_{TMj}$. When an adiabatic conversion is to be carried out in the area (referred to as an interaction region) where a transfer of TEi or TMj between the cores occurs, a particularly longer taper length is required as compared to a case where an adiabatic conversion is to be carried out in other area. This is clear from Formulae (6) and (7). Zb(TEi) is large when $C_T \gg \delta_{TEi}$ and Zb(TMj) is large when $C_{TMj} \gg \delta_{TMj}$.

The PBC 1 shifts TEi or TMj from a waveguide mode locally present in one of the cores to a waveguide mode locally present in the other one of the cores, by changing the core widths. When the core (13 and 14) including the protruding part (13*p* and 14*p*) is changed in at least one of the following widths: (a) the width (W1 and W2) of the core (13 and 14); and (b) the width (Wm1 and Wm2) of the main part (13*m* and 14*m*), an amount of change in effective refractive index of TEi is larger than an amount of change in effective refractive index of TMj. Accordingly, $\delta_{TEi}$ changes more sharply than $\delta_{TMj}$ in response to a change in core width. As a result, a ratio of the interaction region in a whole parallel-core section is larger for TMj than TEi. Consequently, at an equal taper length, light power of TMj transfers between the cores more gently than that of TEi. This allows the PBC 1 to selectively transfer only TMj from one of the cores over to the other one of the cores.

As described above, the PBC 1 having Features 5 and 6 makes it possible to selectively transfer only TMj from one of the cores over to the other one of the cores. In other words, the PBC 1 achieves the function of a PBC.

(Comparison with Conventional Techniques)

The following description will compare the PBC 1 with the conventional techniques disclosed in Non-Patent Literature 2 and Patent Literature 1. The problems with the technique disclosed in Non-Patent Literature 2 are, in a case where a use in a wide wavelength range is assumed, a high loss of a TM polarized wave and a low tolerance (high susceptibility) to production errors. With respect to the problems, as described regarding Features 3 to 4, the PBC 1 enables (i) transfer of TMj from one of the cores over to the other one of the cores by an adiabatic change and (ii) transfer of TMj between the cores at a low loss even when the wavelengths are varied in a wide wavelength range, and even when the structure of the core in the parallel-core section is changed due to production errors. Before the PBC 1 satisfying the aforementioned Features is designed, it is preferable to estimate (1) an assumed wavelength range adopted for the use of the PBC 1 and (2) a magnitude of production errors that can occur in a production process used for producing the PBC 1. The PBC 1 satisfying the aforementioned Features has a lower loss in a wide wavelength range and a higher tolerance to production errors, in comparison with the structure disclosed in Non-Patent Literature 2.

The problems with the technique disclosed in Patent Literature 1 are a high required accuracy of a production process and a low tolerance to production errors. With respect to the problems, the PBC 1 has an advantage over the technique disclosed in Patent Literature 1 in the following points.

The PBC 1, similarly to the technique disclosed in Patent Literature 1, uses a core including two parts (the main part and the protruding part) different in height. In other words, the core (13 and 14) is a stepped core. In the PBC 1, the protruding part (13*p* and 14*p*) plays a supporting role with respect to the main part (13*m* and 14*m*). In the PBC 1, a main electric field of light guided through the core (13 and 14) is distributed in the main part (13*m* and 14*m*). Therefore, in a case where the core (13 and 14) is connected with a core formed by an optical wiring which is provided outside the PBC 1, even when a structurally discontinuous portion occurs on a connection section between the cores due to a restriction on accuracy of a production process, only a low loss can occur in that connection section (see FIG. 4).

Further, the protruding part (13*p* and 14*p*) is used to let an electric field of TEi escape outside the main part (13*m* and 14*m*) so that optical coupling of TEi between the cores is weakened. As such, even when the protruding part (13*p* and 14*p*) the main part (13*m* and 14*m*) are affected by independent production errors, an impact of the production errors on these parts is small. Therefore, it can be said that a required accuracy of a production process of the PBC 1 may be low, and that the PBC 1 has a higher tolerance to production errors, in comparison with the technique disclosed in Patent Literature 1.

(More Preferable Condition 1)

The PBC 1 is preferably such that a relative refractive index difference between the refractive index $N_{co}$ of the core (13 and 14) and the refractive index $N_{cl}$ of the cladding (11 and 12) is 0.25 or higher.

With this configuration, it is possible to have a larger difference in degree of leakage of light between TEi and TMj. As a result, it is possible to separate TEi and TMj more strongly. In other words, it is possible to increase PER. The following will state a reason for it.

The relative refractive index difference is defined by the following Formula (10):

[Math. 31]

$$\text{RELATIVE REFRACTIVE INDEX DIFFERENCE} = \frac{1}{2}\left[1 - \left(\frac{N_{cl}}{N_{co}}\right)^2\right] \quad (10)$$

In Formula (10), $N_{co}$ represents a refractive index of a core, and $N_{cl}$ represents a refractive index of a cladding. In a case where the lower cladding 11 and the upper cladding 12 are made of different materials, respectively, and the refractive index $N_{c11}$ of the lower cladding 11 and the refractive index $N_{c12}$ of the upper cladding 12 are different from each other, a larger one of these refractive indexes is $N_{c1}$. In a case where each of the claddings is made of three different materials, $N_{c1}$ is a refractive index of a material having the largest refractive index. An increase in relative refractive index difference increases $$\left(\frac{N_{co}}{N_{cl}}\right)^2 \qquad \text{[Math. 32]}$$

in Formulae (1) and (4). This increases the difference in degree of leakage of light between TEi and TMj, correspondingly. The square of the refractive index difference is 2 or more. That is, when $$\left(\frac{N_{co}}{N_{cl}}\right)^2 \geq 2, \qquad \text{[Math. 33]}$$

an amount of change in effective refractive index of TEi is two or more times as large as that of TMj when the core width is changed. As a result, in this case, there are two or more times difference between a degree of separation of TEi and a degree of separation of TMj. Accordingly, it is sufficient that the square of the refractive index difference is 2 or more. Further, in this case, the relative refractive index difference is 0.25 or more. Therefore, it is a preferable condition of the present invention that the relative refractive index difference is 25% or more.

(More Preferable Condition 2)

The PBC 1 is preferably such that (1) each of the cores (13 and 14) is made of silicon (Si), (2) the lower cladding 11 is made of silica ($SiO_2$), and (3) the upper cladding 12 is formed by an air or made of silica or silicon nitride ($Si_3N_4$).

The PBC 1 having such a configuration can be easily produced by processing an SOI wafer by a CMOS process. The lower cladding 11 can be formed by using a BOX (Buried Oxide) layer of an SOI wafer. Each of the cores (13 and 14) can be formed by etching a silicon layer that is a topmost layer of the SOI wafer. The upper cladding 12 can be formed by depositing a desired material after formation of the cores (13 and 14). In a case where an upper cladding 12 formed by an air is employed, the material deposited after formation of the cores (13 and 14) is unnecessary. Particularly, in a case where silica is used as the upper cladding 12, it is possible to have a small stress at a boundary between the lower cladding 11 and the upper cladding 12 since the lower cladding 11 and the upper cladding 12 are made of the same material. This makes it possible to increase a yield in the process of production of the PBC 1.

Further, the above configuration makes it possible to obtain the PBC 1 having a large relative refractive index difference. More specifically, in a case where the upper cladding 12 is formed by air or made of silica, the relative refractive index difference of the PBC 1 is approximately 41%. In a case where the upper cladding 12 is made of silicon nitride, the relative refractive index difference of the PBC 1 is approximately 32%. Consequently, the PBC 1 enables more strong separation of TEi and TMj. This allows the PBC 1 to achieve an increase in PER.

(More Preferable Condition 3)

As described above, the PBC 1 is preferably such that (1) each of the cores (13 and 14) is made of silicon, and (2) both the lower cladding 11 and the upper cladding 12 are made of silica. Here, as illustrated in FIG. 2, the width of the core 13 is defined as W1, the width of the main part 13m of the core 13 is defined as Wm1, the width of the protruding part 13p of the core 13 is defined as Wp1, the width of the core 14 is defined as W2, the width of the main part 14m of the core 14 is defined as Wm2, and the width of the protruding part 14p of the core 14 is defined as Wp2. That is, W1=Wm1+Wp1, and W2=Wm2+Wp2. Further, a height hm1 of the main part 13m and a height hm2 of the main part 14m are equal to each other, and the heights hm1 and hm2 are represented by "h". In this case, the PBC 1 preferably satisfies the following relationship:

$$h < W1, W2, Wm1, Wm2 < W_{upper} \qquad \text{[Math. 34]}$$

where $W_{upper}$ is expressed by the following Formula (11):

[Math. 35]

$$W_{upper} = \{0.868224 \times [\log_e(h)]^4 - 21.265613 \times [\log_e(h)]^3 + 195.780964 \times [\log_e(h)]^2 - 802.242303 \times \log_e(h) + 1236.45521\} \times h \qquad (11)$$

where e is Napier's constant.

By satisfying the above relationship, the PBC 1 can suppress excess loss of TM0 which excess loss can occur in a case where polarization multiplexing and polarization separation of TE0 and TM0 are carried out.

In a case where TE0 and TM0 are to be subjected to the polarization multiplexing or polarization separation, the widths (Wm1 and Wm2) of the main parts (13m and 14m) are preferably larger than the height h so that Feature 5 will be satisfied. This is because in a case where the widths (Wp1 and Wp2) of the protruding parts (13p and 14p) are small, and the widths (W1 and W2)=h, the shape of the core becomes a square shape. In this case, respective electric field distributions exhibited by TE0 and TM0 are identical in pattern to each other when one of the electric field distributions of TE0 and TM0 is rotated by 90 degrees with respect to the other one of the electric field distributions.

A maximum value $W_{upper}$ of the core width is determined as follows. When a core, like the core of the PBC 1, is so shaped as to have a vertically asymmetric refractive index distribution with respect to a height direction, such a shape leads to an increase in loss of TM0 for the following reason. In a case where, as disclosed in Non-Patent Literature 5, a core has an asymmetric refractive index distribution with respect to a height direction and is shaped such that respective effective refractive indexes of TM0 and TE1 approach, respective waveguide modes of TM0 and TE1 interact with each other.

This results in conversion of part of TM0 propagating the parallel-core section into TE1, and consequently causes excess loss of TM0. In order to prevent such an undesired excess loss, it is preferable to avoid TE1 and TM0 from interacting with each other.

In order to prevent such excess loss, a core shape by which TM0 and TE1 interact with each other, i.e., a core shape that can lead to excess loss of TM0, is revealed below. A case where the above-described interaction can occur is as follows. In a situation where each of the cores (13 and 14) has a core shape close to a shape of a square, when the width (Wm1 and Wm2) of the main part (13m and 14m) and the width (W1 and W2) of the core (13 and 14) are increased by different amounts with respect to such a core width that effective refractive indexes of TE1 and TM0 intersect with each other, the above-described interaction tends to occur. This is because the increases by different amounts cause a refractive index distribution to always have a vertical asymmetry. Thus, such a core width can be set to $W_{upper}$.

FIG. 5 is a graph showing a simulation result of $W_{upper}$ normalized by varying values of the height h. The wavelength of light propagating through a core is set to 1550 nm. In FIG. 5, dots show the simulation result, and a dotted line shows a curve obtained by interpolating the simulation result. According to this curve, $W_{upper}$ can be defined by the above Formula (11).

As described above, the PBC 1 can suppress excess loss of TM0 in a case where polarization multiplexing and polarization separation of TE0 and TM0 are carried out. The degrees of confinement of TE0 and TM0 in cores are highest since respective effective refractive indexes of TE0 and TM0 are each the highest effective refractive index in each polarized wave. This results in lower loss in a curved waveguide. On this account, TE0 and TM0 are polarization modes commonly used in a case where polarization multiplexing and polarization separation are carried out. Therefore, the more preferable condition 3 which enables suppression of excess loss of TM0 is practically useful.

[Other Usage]

The PBC 1 can allow only TMj to transfer between the cores 13 and 14 at a low loss. Accordingly, it is possible to use the PBC 1 as a polarizer employing a substrate-type optical waveguide which extracts a polarized wave of TMj or TEi.

In a case where the PBC 1 is used as a polarizer for TMj, the port 1-1 illustrated in FIG. 1 is used as an input port while the port 2-2 illustrated in FIG. 1 is used as an output port. Then, when TEi and TMj are introduced into the PBC1 through the port 1-1, the PBC 1 allows only TMj to be transferred from the first core WG1 (13) to the second core WG2 (14), so that only TMj is outputted through the port 2-2. That is, the PBC 1 can extract only TMj from the introduced TEi and TMj and then output the extracted TMj.

Meanwhile, in a case where the PBC 1 is used as a polarizer for TEi, for example, the port 1-1 illustrated in FIG. 1 is used as an input port while the port 2-1 illustrated in FIG. 1 is used as an output port. Then, when TEi and TMj are introduced into the PBC1 through the port 1-1, TMj is outputted through the port 2-2, as described above. Thus, outputted through the port 2-1 is only a portion of TEi which portion has not been transferred from the first core WG1 (13) to the second core WG2 (14) in the parallel-core section. That is, the PBC 1 can extract only TEi from the introduced TEi and TMj and then output the extracted TEi.

In either of the above cases, the PBC 1 is capable of operating at a low loss in a wide wavelength range. With the PBC 1 used as a polarizer, it is possible to provide a polarizer having a low loss and a high PER in a wide wavelength range.

Further, with PBCs 1 connected in series in a multistage arrangement, it is possible to further improve the polarization extinction ratio.

Embodiment 1

The following description will discuss a PBC 1 in accordance with Embodiment 1, with reference to FIGS. 6 and 7. The PBC 1 is an embodiment of a PBC having the Features 1 to 6 described earlier and yields the effects corresponding to the Features 1 to 6.

FIG. 6 is a perspective view illustrating a configuration of a PBC 1. (a) of FIG. 6 illustrates the PBC 1 including a lower cladding 11, an upper cladding 12, a first core 13, and a second core 14. As illustrated in (a) of FIG. 6, the PBC 1 is such that the core 13 and the core 14 are buried by the lower cladding 11 and the upper cladding 12. (b) of FIG. 6 illustrates only the cores 13 and 14. As illustrated in (b) of FIG. 6, the cores (13 and 14) are stepped cores including respective main parts (13m and 14m) and respective protruding parts (13p and 14p).

(a) of FIG. 7 is a top view illustrating a configuration of a PBC 1 in accordance with the present Example. (b) of FIG. 7 is a cross-sectional view of the PBC 1, taken along line A-A' illustrated in (a) of FIG. 7. (c) of FIG. 7 is a cross-sectional view of the PBC 1, taken along line B-B' illustrated in (a) of FIG. 7. (d) of FIG. 7 is a cross-sectional view of the PBC 1, taken along line C-C' illustrated in (a) of FIG. 7.

In the PBC 1, a width W1 of the core 13, a width Wm1 of the main part 13m, a width Wp1 of the protruding part 13p, a height hm1 of the main part 13m, a height hp1 of the protruding part 13p, a width W2 of the core 14, a width Wm2 of the main part 14m, a width Wp2 of the protruding part 14p, a height hm2 of the main part 14m, and a height hp2 of the protruding part 14p are defined as illustrated in (b) of FIG. 6. In the PBC 1, both the height hm1 and the height hm2 are equal to each other and are represented by "h". Note that since the heights of the main parts (13m and 14m) are also the heights of the cores (13 and 14), h=hm. Further, the height hp1 and the height hp2 are equal to each other and represented by "hp". Further, the cores 13 and 14 are arranged so as to be separated from each other, and a distance, WG, between the cores 13 and 14 is constant throughout the parallel-core section. In other words, the cores 13 and 14 are preferably arranged parallel to each other.

In the PBC 1, the width Wm1, width Wm2, width Wp1, width Wp2, and distance WG each are continuous as a function of distance from a start position of the parallel-core section. Therefore, it can be said that the width W1 and the width w2 each are continuous as a function of distance from the start position of the parallel-core section. The PBC 1 configured as above has an advantage in that the PBC 1 is easily designed.

As described above, the distance WG needs only to be continuous as a function of distance from the start position of the parallel-core section, but the distance WG is not necessarily constant. For example, the distance WG may be expressed by a straight line or may be expressed by a curved line, as a function of distance from the start position of the parallel-core section. Particularly, it is preferable that the interaction region in the parallel-core section has a longer taper length as compared to the other regions. In order to provide a taper length having a long interaction region, the PBC 1 is preferably such that core widths (W1 and W2) decrease from the input ports (ports 1-1 and 1-2) to the interaction region, and from the output ports (ports 2-1 and 2-2) to the interaction region. This configuration achieves a strong optical coupling of TMj in the interaction region and consequently achieves a short coupling length of TMj.

Further, in the PBC 1, the core widths (W1 and W2) are not necessarily linear as a function of distance from the start position of the parallel-core section. In the functions expressing the core widths (W1 and W2), it is preferable that a gradient in the interaction region is gentler than that in the vicinity of the input and output ports. With this configuration, it is possible to make the taper length relatively longer in the interaction region.

Example 1

The following description will discuss a PBC 1 in accordance with Example corresponding to Embodiment 1, with reference to FIG. 8. (a) of FIG. 8 is a top view illustrating a configuration of the PBC 1 in accordance with the present Example, and (b) of FIG. 8 is a cross-sectional view of a cross section orthogonal to a light traveling direction, in the PBC 1 illustrated in (a) of FIG. 8. The PBC 1 is intended to carry out polarization multiplexing and polarization separation of TE0 and TM0.

Respective dimensions of the sections of the PBC 1 are as illustrated in (a) and (b) of FIG. 8. When the letter X illustrated in (b) of FIG. 8 is changed in a range of −100 to 100, the width Wm1 of the main part 13m and the width Wm2 of the main part 14m each linearly change as a function of distance from a start position of the parallel-core section. The lower cladding 11 is formed by a BOX layer of an SOI wafer. That is, the lower cladding 11 is made of silica. The cores 13 and 14 were formed by etching a silicon layer that is a topmost layer of the SOI wafer. After formation of the cores 13 and 14, the upper cladding 12 was formed by depositing silica on the lower cladding 11 so that the cores 13 and 14 would be buried.

With regard to the PBC 1 in accordance with the present Example, effective refractive indexes of TE0 and TM0 at a cross section orthogonal to a light traveling direction were calculated. The result of the calculation is shown in FIG. 10. TE0@WG1 and TM0@WG1 illustrated in FIG. 10 correspond to effective refractive indexes of TE0 and TM0 in the first core 13, respectively, and TE0@WG2 and TM0@WG2 correspond to effective refractive indexes of TE0 and TM0 in the second core 14, respectively. Here, each wavelength of TE0 and TM0 was 1550 nm.

Further, with regard to a substrate-type optical waveguide element 201a (see (b) of FIG. 9) in which only a first core 213 is buried by claddings (211 and 212), and a substrate-type optical waveguide element 201b (see (c) of FIG. 9) in which only a second core 214 is buried by claddings (211 and 212), both of which are Reference Examples of the PBC 1, effective refractive indexes of TE0 and TM0 at a cross section orthogonal to the light traveling direction were calculated. The result is shown in (a) of FIG. 9. TE0@WG1 and TM0@WG1 illustrated in (a) of FIG. 9 indicate effective refractive indexes of TE0 and TM0 in the first core 213, respectively, and TE0@WG2 and TM0@WG2 indicate effective refractive indexes of TE0 and TM0 in the second core 214, respectively. Here, each wavelength of TE0 and TM0 was 1550 nm.

It was found from (a) of FIG. 9 that while the widths of the core 213 and the core 214 change by 200 nm, the effective refractive index of TE0 changes by 0.33, and the effective refractive index of TM0 changes by 0.12. In other words, in response to changes in width of the cores (213 and 214) by 200 nm, the effective refractive index of TE0 changes more than the effective refractive index of TM0. This is because the present Example has Feature 5, i.e., a protruding part. Note that in (a) of FIG. 9, the absolute value of a difference between effective refractive indexes of TE0 corresponds to $\delta_{TE0}/(\pi/\lambda)$, while the absolute value of a difference between effective refractive indexes of TM0 corresponds to $\delta_{TM0}/(\pi/\lambda)$. Accordingly, $\delta_{TE0}$ and $\delta_{TM0}$ can be calculated from the result shown in (a) of FIG. 9.

Next, with regard to the PBC 1 in accordance with the present Example, a result of calculation of effective refractive indexes of TE0 and TM0 at a cross section orthogonal to the light traveling direction will be discussed with reference to FIG. 10. In FIG. 10, a graph drawn by using the same type of curved line is continuous. In (a) of FIG. 9, curves of effective refractive indexes intersect with each other at a point. However, in FIG. 10, such an intersection is split since interaction of the polarization mode of the core 13 and the polarization mode of the core 14 occurs due to the cores 13 and 14 adjacent to each other. As a result, TE0 of the core 13 and TE0 of the core 14 are coupled to each other on one curve, while TM0 of the core 13 and TM0 of the core 14 are coupled to each other. In this case, the absolute value of the difference between the effective refractive indexes of TE0 is equivalent to:

$$\sqrt{C_{TE0}^2 + \delta_{TE0}^2}/(\pi/\lambda). \quad [\text{Math. 36}]$$

Meanwhile, the absolute value of a difference between the effective refractive indexes of TM0 is equivalent to:

$$\sqrt{C_{TM0}^2 + \delta_{TM0}^2}/(\pi/\lambda). \quad [\text{Math. 37}]$$

$C_{TE0}$ and $C_{TM0}$ can be calculated, respectively, by using $\delta_{TE0}$ and $\delta_{TM0}$ obtained from (a) of FIG. 9. At X=0 (for symmetry of the PBC 1 in accordance with the present Example, $\delta_{TE0}=0$ and $\delta_{TM0}=0$), $C_{TE0}$ was 0.03 rad/μm while $C_{TM0}$ was 0.18 rad/μm. From this result, it can be said that optical coupling of TM0 is much stronger than that of TE0. This is the effect obtained by satisfying Features 5 and 6.

When this result was used to calculate:

$$Zb(TE0) \quad [\text{Math. 38}]$$

in Formula (8); and $$Zb(TM0) \quad [\text{Math. 39}]$$

in Formula (9), Zb(TE0) was 214 μm, and Zb(TM0) was 36 μm. It is therefore clear that a length necessary for transfer of TM0 over to an adjacent waveguide by an adiabatic conversion can be much shorter than a length necessary for transfer of TM0.

Further, a ratio of $C_{TE0}$ and $\delta_{TE0}$ ($\delta_{TE0}/C_{TE0}$) and a ratio of $C_{TM0}$ and $\delta_{TM0}$ ($\delta_{TM0}/C_{TM0}$) were calculated with respect to X. FIG. 11 shows a result of the calculation. The smaller the ratio is, the stronger the interaction between TE0 of the core 13 and TE0 of the core 14 becomes. The following description assumes that the interaction region is a region in which the ratio ($\delta_{TE0}/C_{TE0}$) regarding TE0 is 1 or less. The same is applied to the ratio ($\delta_{TM0}/C_{TM0}$) regarding TM0, and the interaction region is a region in which the ratio is 1 or less. Referring to FIG. 11, it is clear that at X=0, the interaction is the strongest since both $\delta_{TE0}$ and $\delta_{TM0}$ are 0. When X is close to 0 (X≈0), both $\delta_{TE0}$ and $\delta_{TM0}$ increase due to a change in core width. This consequently results in weaker interaction. Here, as described earlier in (More preferable condition 1), the relative refractive index difference is 0.25 or more, and as such, an amount of increase in effective refractive index of TE0 is greater than an amount of increase in effective refractive index of TM0 when the core width is changed. Accordingly, as compared to the ratio $\delta_{TM0}/C_{TM0}$, the ratio $\delta_{TE0}/C_{TE0}$ increases more sharply. As a result, it is clear that the interaction region (−10<X<10) of TE0 with respect to a whole device is smaller than the interaction region (−90<X<90) of TM0 (see FIG. 11). Consequently, TE0 has a sharper change in electric field distribution as compared to TM0. It is therefore clear that an adiabatic conversion of TE0 hardly occurs, whereas an adiabatic conversion of TM0 can be efficiently carried out.

The above result was examined in detail by carrying out simulations of electric field distributions of TE0 and TM0 at cross sections taken along line A-A', line B-B', line C-C', line D-D', and line E-E' which are shown in FIG. 8. Results of the simulations are shown in FIGS. 12 to 16. FIG. 12 shows the electric field distribution at the cross section taken along line A-A'. FIG. 13 shows the electric field distribution at the cross section taken along line B-B'. FIG. 14 shows the electric field distribution at the cross section taken along line C-C'. FIG. 15 shows the electric field distribution at the cross section taken along line D-D'. FIG. 16 shows the electric field distribution at the cross section taken along line E-E'.

TE0 shows a main electric field component Ex, and TM0 shows a main electric field component Ey. TE0 #0 and TE0 #1 represent modes having the highest effective refractive index and the second highest effective refractive index, respectively, among TE polarized waves at a cross section in which the core 13 and the core 14 are provided adjacent to each other. Similarly, TM0 #0 and TM0 #1 represent modes having the highest effective refractive index and the second highest effective refractive index, respectively, among TM polarized waves at the cross section in which the core 13 and the core 14 are provided adjacent to each other.

In the case of TM0, since an adiabatic conversion occurs, either one of TM #0 and TM #1 hardly shifts to the other waveguide mode. For example, referring to FIG. 12, TM0 having entered into the core 13 at X=−100 follows an electric field distribution of TM0 #0 and as a result, exits from the core 14 at X=100. TM0 transfers from the core 13 over to the core 14 when X is around 0 (X=0 or X≈0). It can be seen from FIG. 12 that when X is around 0, an interaction between TM0 of the core 13 and TM0 of the core 14 is the strongest in the electric field distribution, and TM0 is present in both of the cores (13 and 14).

Similarly, TM0 having entered into the core 14 follows an electric field distribution of TM0 #1, and as a result, exits from the core 13 at X=100.

On the other hand, an adiabatic conversion of TE0 hardly occurs. Accordingly, TE0 is guided through the parallel-core section while the electric field of TE0 is still locally present in one core (13 or 14) into which TE0 have entered, and TE0 exits from the one core (13 or 14) while the electric field of TE0 is still locally present in the one core (13 or 14). For example, referring to FIGS. 12 and 13, TE0 having entered into the core 13 at X=−100 excites an electric field distribution of TE0 #0. However, TE0 hardly transfers over to the core 14 until X becomes −10 (X=−10). It can be seen from FIG. 14 that at X=0, TE0 excites both of the electric field distribution of TE0 #0 and an electric field distribution of TE0 #1 since no adiabatic conversion occurs. Referring to FIG. 14, TE0 #0 and TE0 #1 are modes called an even mode and an odd mode, respectively. The electric field distribution of TE0 #1 is antisymmetric with respect to a core width direction. Accordingly, when these two waveguide modes excited are superposed each other, the two waveguide modes form an electric field distribution in which most of an electric field is locally present in the core 13. Subsequently, as shown in FIGS. 15 and 16, when X=10 and X=100, respectively, TE0 follows the core 13. Therefore, TE0 does not transfer over to an adjacent waveguide, and exits directly from the core 13. Similarly, TE0 having entered into the core 14 at X=−100 exits from the core 14.

The above description is applied to Example 1, but not limited thereto. The above description is similarly applied to all embodiments of the present invention involving TEi and TMj.

Embodiment 2

The following description discusses a PBC 1A in accordance with Embodiment 2, with reference to FIG. 18. FIG. 18 is a top view illustrating a configuration of the PBC 1A. The PBC 1A is a substrate-type optical waveguide element in which curved waveguide sections 2 and 3 are connected respectively to a preceding stage and a subsequent stage of the PBC 1 in accordance with Embodiment 1.

The curved waveguide section 2 provided at the preceding stage of the PBC 1 includes a third core 23 and a fourth core 24, as illustrated in FIG. 18. The third core 23 is a core which includes a main part 23m and a protruding part 23p and communicates with a first core 13 via a start position of a parallel-core section of the PBC 1. Meanwhile, the fourth core 24 is a core which includes a main part 24m and a protruding part 24p and communicates with a second core 14 via the start position. Both of the third core 23 and the fourth core 24 are made of silicon, as well as the first core 13 and the second core 14. Accordingly, a refractive index of the third core and a refractive index of the fourth core are the same as a refractive index of the first core 13 and a refractive index of the first core 14. A distance between the third core 23 and the fourth core 24 increases as a distance from the start position increases.

A width Wm3 of the main part 23m and a width Wp3 of the protruding part 23p in the third core 23 are equal to a width Wm1 of the main part 13m and a width Wp1 of the protruding part 13p in the first core 13 at the start position. The widths Wm3 and Wp3 of the third core are preferably constant from a third input port 23a, which is one end of the third core 23, to a third output port 23b, which is the other end of the third core 23.

A width Wm4 of the main part 24m and a width Wp4 of the protruding part 24p in the fourth core 24 are equal to a width Wm2 of the main part 14m and a width Wp4 of the protruding part 14p in the second core 14 at the start position. The widths Wm4 and Wp4 of the fourth core are preferably constant from a fourth input port 24a, which is one end of the fourth core 24, to a fourth output port 24b, which is the other end of the fourth core 24.

The curved waveguide section 3 provided to the subsequent stage of the PBC 1 includes a fifth core 33 and a sixth core 34. The curved waveguide section 3 is configured to correspond to the curved waveguide section 2. More specifically, the fifth core 33 corresponds to the third core 23, and the sixth core 34 corresponds to the fourth core 24.

The fifth core 33 is a core which includes a main part 33m and a protruding part 33p and communicates with the first core 13 via the end position of the parallel-core section of the PBC 1. The sixth core 34 is a core which includes a main part 34m and a protruding part 34p and communicates with the second core 14 via the end position. Both the fifth core 33 and the sixth core 34 are made of silicon, as well as the first core 13 and the second core 14. Accordingly, a refractive index of the fifth core and a refractive index of the sixth core are the same as the refractive index of the first core 13 and the refractive index of the second core 14. A distance between the fifth core 33 and the sixth core 34 increases as a distance from the end position increases.

A width Wm5 of the main part 33m and a width Wp5 of the protruding part 33p in the fifth core 33 are equal to a width Wm1 of the main part 13m and a width Wp1 of the protruding part 13p in the first core 13 at the end position. The widths Wm5 and Wp5 of the fifth core are preferably constant from a fifth input port 33a, which is one end of the fifth core 33, to a fifth output port 33b, which is the other end of the fifth core 33.

A width Wm6 of the main part 34m and a width Wp6 of the protruding part 34p in the sixth core 34 are equal to the width Wm2 of the main part 14m and the width Wp2 of the protruding part 14*p* in the second core 14 at the end position. The widths Wm6 and Wp6 of the sixth core are preferably constant from a sixth input port 34*a*, which is one end of the sixth core 34, to a sixth output port 34*b*, which is the other end of the sixth core 34.

Connecting the curved waveguide section 2 makes it possible to increase a distance between the cores 23 and 24 while a distance between the cores 13 and 14 is not increased. Further, connecting the curved waveguide section 3 makes it possible to increase a distance between the cores 33 and 34 while a distance between the cores 13 and 14 is not increased. This allows the PBC 1A to prevent the occurrence of undesired light reflection at the input port 23*a*, the input port 24*a*, the output port 33*b*, and the output port 34*b*.

The curved waveguide can be connected to each of the cores 13 and 14 as in the PBC 1A in accordance with Embodiment 2, or alternatively to either one of the cores 13 and 14. In FIG. 18, a straight waveguide is connected to an edge surface of a waveguide having a large core width, while a curved waveguide is connected to an edge surface of a waveguide having a small core width. In such a case as illustrated in FIG. 18, TM0 is introduced through an upper-left input port 23*a* in FIG. 18 and TE0 is introduced through a lower-left input port 24*a*, while outputs of TE0 and TM0 are arranged to be obtained through a lower-right output port 34*b*. Then, when the PBC 1A is used as a PBC, light passes through the curved waveguide the lowest number of times. Accordingly, the PBC 1A arranged as described above is preferable. Particularly in this case, it is assumed that TE0 passes through the curved waveguide since light confinement for TE0 is stronger than that for TM0.

Note that a method for making the cores 13 and 14 come closer to each other/separate farther away from each other is not limited to use of the above curved waveguide, and a waveguide having any curved-line shape can be used.

In addition, a low-loss connection is made between an optical waveguide serving as an optical wiring and at least either one of the preceding stage in which the cores 13 and 14 come closer to each other and the subsequent stage in which the cores 13 and 14 separate farther away from each other. Accordingly, it is possible to connect a tapered waveguide continuously changing in core width toward a core width of the optical wiring.

Further, as illustrated in FIG. 17, at least either one of the preceding stage in which the cores 13 and 14 come closer to each other and the subsequent stage in which the cores 13 and 14 separate farther away from each other may be connected to an optical wiring connecting part 15 for allowing the core width of the protruding part (13*p* and 14*p*) to be decreased in a tapered manner so that the protruding part (13*p* and 14*p*) is converted into a rectangular waveguide. Similar to the core (13 and 14), the optical wiring connecting section 15 includes a main part 15*m* and a protruding part 15*p*. This configuration is preferable because it enables a low-loss connection with an optical waveguide that forms an optical wiring.

Example 2

Example of the PBC 1A illustrated in FIG. 18 will be discussed in terms of the curved waveguide section 2. In the curved waveguide section 2, the third core 23 (straight waveguide part) is extended while keeping the width W1 of the first core 13. On the other hand, the fourth core 24 (curved waveguide section part) is curved in a form of an arc having a given radius, while keeping the core width of the second core 14. The curved waveguide section 3 is configured similarly to the curved waveguide section 2.

In the PBC 1A, dimensions of the PBC 1 (hereinafter referred to as a tapered section) are the same as those in Example 1. Further, the PBC 1A including the curved waveguide sections 2 and 3 can be produced by a process similar to the production process for the PBC 1 in accordance with Example 1.

The following demonstrates, by simulation, that the PBC 1A functions as a PBC.

First, calculation was carried out by a finite-difference time-domain method (FDTD), for a loss of TM0 to be outputted through the output port 34*b* in a case where TM0 was introduced through the input port 23*a*. FIG. 19 shows a result of the calculation. The wavelength of light guided through the PBC 1A was set to 1550 nm. It is clear from the result of the calculation that when the taper length is not less than 80 μm, the loss of TM0 is not more than 0.01 dB and therefore, an adiabatic conversion occurs sufficiently. FIG. 20 shows a state of propagation of an electric field in that case (taper length=80 μm). (a) of FIG. 20 shows an electric field distribution of an Ey component in a case where TM0 is introduced through the input port 23*a*, and (b) of FIG. 20 shows an electric field distribution of an Ex component in a case where TE0 is introduced through the input port 23*a*. It is clear from (a) of FIG. 20 that TM0 gradually transfers over to the core 14 in the vicinity of the middle of the core 13. On the other hand, it is clear that TE0 is locally present and propagates through the core 13 while hardly transferring over to the core 14. Therefore, it is found that the PBC 1A can carry out polarization separation.

Next, on the assumption that the PBC 1A is used as a PBC, a loss of TE0, a loss of TM0, and polarization extinction ratio (PER) with respect to the wavelength were calculated by FDTD. FIG. 21 shows a result of the calculation. Here, the taper length was set to 80 μm. (a) of FIG. 21 shows a loss (corresponding to Formula (1)) in a case where TM0 is introduced through the input port 23*a* and outputted through the output port 34*b*. (b) of FIG. 21 shows a PER (corresponding to Formula (3)) that is a ratio of respective losses of polarized waves of TE0 and TM0 which are outputted through the output port 34*b* in a case where both TE0 and TM0 are introduced through the input port 23*a*.

Further, FIG. 21 shows results for a conventional technique for comparison which will be described later. From the results shown in FIG. 21, the loss of TM0 is not more than 0.02 dB, which is very low, in a very wide wavelength range extending over 120 nm including C band and L band. It is also found that it is possible to suppress undesirable polarized wave components to 16% or less since the PER is not less than 8 dB.

Further, calculations were carried out for a loss (corresponding to Formula (2)) in a case where TM0 is introduced through the input port 24*a* and outputted through the output port 34*b* at a wavelength of 1520 nm and for a ratio of losses of respective losses of polarized waves of TE0 and TM0 which are outputted through the output port 34*b* in a case where both TE0 and TM0 are introduced through the input port 24*a*. It is found that the loss of TE0 is 0.18 dB, which is sufficiently low, and the PER is 20 dB, which is sufficiently high.

Next, the influence of a production error was calculated by the FDTD. Calculation was carried out on the assumption that a production error occurs such that both of the heights of the cores (13 and 14) are larger only by approximately 5% than a designed value. FIG. 22 shows the result of the calculation. FIG. 22 shows a result of calculation of a loss (corresponding to Formula (1)) of TM0 which is introduced through the input port 23a and outputted through the output port 34b in a case where the production error is present and in a case where the production error is absent. A plot indicated by "WITHOUT PRODUCTION ERROR" in FIG. 22 corresponds to a plot for the present invention in (a) of FIG. 21. It is clear from the result that even under the influence of a production error, losses in the PBC 1A are not greatly varied, and the PBC 1A still has a low loss of not more than 0.02 dB in a wide wavelength range extending over 120 nm.

(Comparison with Conventional Techniques)

A structure of the PBC 1A in accordance with Example 2 and a structure disclosed in Non-Patent Literature 2 were compared in a simulation. FIG. 38 shows a configuration of a PBC 201 used for comparison. For comparison with Example 2, heights of the cores (213 and 214), a distance between waveguides, and a material of the waveguides in the PBC 201 were arranged to be the same as those in the PBC 1A. The length of the parallel-core section was decided such that the maximum value of a loss of TM0 having entered through an input port 213a is minimum in a wavelength range of 1520 nm to 1640 nm. Further, under this condition, the core width was decided such that a PER at the input port 213a is on the same level as that of the PBC 1A in accordance with Example 2. FIG. 21 shows results of a case thus arranged. It was found from FIG. 21 that the PBC 1A is superior to the PBC 201 in all characteristics. In particular, the maximum loss of TM0 was 0.27 dB in the case of the conventional technique, whereas the maximum loss of TM0 was 0.02 dB in the case of the PBC 1A. Therefore, it is clear that, as compared to the PBC 201, the PBC 1A provides a higher performance in a wide wavelength range.

Further, the performance of the PBC 201 in view of a production error was calculated, as in the calculation for FIG. 22. FIG. 23 shows a result of the calculation. The core size changes due to the influence of the production error and consequently, a degree of confinement of TM0 changes, so that a coupling length in a directional coupler changes. Accordingly, as shown in FIG. 23, a center wavelength at which the loss is the minimum in a case with the production error is shifted from that in a case without the production error, so that the maximum loss increases from 0.27 dB of the case without the production error to 0.38 dB of the case with the error in the wavelength range of 1520 nm to 1640 nm. On the other hand, as described earlier, the PBC 1A is not significantly deteriorated and keeps a low loss of not more than 0.02 dB even under the influence of the production error similar in level to that of the PBC 201 described above.

(Confirmation of Effect of Protruding Part)

In order to show the effect of a protruding part of the present invention, the following description will make performance comparison between the PBC 1A in accordance with Example 2 and the PBC 101A (tapered directional coupler; tapered directional coupler including a rectangular core) without a protruding part in accordance with Comparative Example 1.

FIG. 24 shows a configuration of the PBC 101A in accordance with Comparative Example 1. A core distance between the core 113 and the core 114, the length of the curved waveguide section, and the length (taper length) of the parallel-core section in the PBC 101A were the same as those in the PBC 1A. Since the PBC 1A and PBC 101A are identical in length of the curved waveguide section and in taper length, the PBC 1A and the PBC 101A are compared on the assumption that they have the same device size. Respective core widths of the core 113 and the core 114 were so set that the PBC 101A suffers a loss on the same level as the loss of TM0 (see (a) of FIG. 21) in the PBC 1A. A loss is changed with change in core width for the following reason. As the core width is increased (decreased), light is confined in the core more strongly (weakly) accordingly. The lower a loss in the tapered directional coupler is, the stronger optical coupling to an adjacent waveguide is. That is why a loss can be changed with change in core width.

FIG. 25 shows a result of calculation of a loss of TM0 (corresponding to Formula (1)) in a case where TM0 is introduced through the input port (23a and 123a) and outputted through the output port (34b and 134b) in each of the PBC 1A and the PBC 101A and a result of calculation of a PER (corresponding to Formula (3)) that is a loss ratio of polarized waves of TE0 and TM0 outputted through the output port (34b and 134b) in a case where TE0 and TM0 are introduced through the input port (23a and 123a). It is clear from (a) of FIG. 25 that the loss of TM0 in the PBC 1A is on the same level as the loss of TM0 in the PBC 101A. This result is the one as designed. In this case, it is clear that a PER of the PBC 1A is higher by 1 dB than that of the PBC 101A.

This occurs for the following reason. The core 13 and the core 14 in the PBC 1A include the protruding part 13p and the protruding part 14p, respectively, which protrude in directions away from each other. As described earlier, TEi tends to be distributed more in the protruding part 13p and the protruding part 14p than TMj. Thus, it is possible to greatly suppress leakage of light of TEi alone into an adjacent core. Therefore, in a situation where the amount of light of TMj leaked into an adjacent core is the same in the PBC 1A and in the PBC 101A (that is, in a situation where the amount of loss is the same in the PBC 1A and in the PBC 101A), the amount of light of TEi leaked into the adjacent core is smaller in the PBC 1A than in the PBC 101A. In other words, TEi is transferred over to the adjacent core at a higher loss in the PBC 101A. As a result, a higher PER is obtained in the PBC 1A than in the PBC 101A. This is found to be the effect yielded by the PBC 1A including the PBC 1 configured such that the core (13 and 14) includes the protruding part (13p and 14p).

Embodiment 3

A PBC 1B in accordance with Embodiment 3 is obtained by adding a terminal section 4 to the PBC 1A in accordance with Embodiment 2. The terminal section 4 is a structure for removing an undesired polarized wave component. For example, when TEi is introduced through the port 1-1, most of the power of TEi is outputted through the port 2-1. In a case where this TEi is an undesired component, it is necessary to optically terminate the port 2-1. When the terminal section is absent, TEi may be reflected and become return light. Consequently, such TEi may adversely affect performance of an optical circuit to which the PBC is attached. Further, in a case where TMj is introduced through the port 1-1, most of the power of TMj is outputted through the port 2-2, but small part of the power of TMj (residual TMj) which has not transferred over to an adjacent waveguide is outputted through the port 2-1. For a reason similar to that in the case of TEi, it is preferable to remove such residual TMj.

(a) of FIG. 26 is a top view illustrating a configuration of the PBC 1B. In (a) of FIG. 26, only a core of the PBC 1B is illustrated. As illustrated in (a) of FIG. 26, the PBC 1B includes a seventh core 43 as a core of the terminal section 4, at the port 2-1 through which undesired light may be outputted. The core 43 communicates with a first core 13 via a fifth core 33. The width of the core 43 decreases along a light traveling direction as a distance from the core 13 increases. In other words, the terminal section 4 employs, as an optical terminal, the core 43 that is an inverse-tapered waveguide whose core width gradually decreases.

When the core width becomes narrower, confinement of light in the core becomes weaker, so that most of an electric field leaks out into a cladding. On this account, an electric field of undesired light can be gradually transferred into the cladding. This makes it possible to discharge undesired light while preventing reflection of such light.

Note that in the PBC 1B, the core 43 is provided at the port 2-1 of the fifth core 33, on the assumption that TMj outputted through the port 2-2 of a sixth core 34 is to be used. However, in a case where TEi outputted through the port 2-1 is to be used, the core 43 can be provided at the port 2-2 of the sixth core 34.

[Modification]

The following description will discuss a PBC 1C in accordance with a modification of Embodiment 3, with reference to (b) of FIG. 26. (b) of FIG. 26 is a top view illustrating a configuration of the PBC 1C. (b) of FIG. 26 here illustrates only a core of the PBC 1C. The PBC 1C includes a terminal section 4'. The terminal section 4' includes an optical absorber 43' that is connected to a first core 13 via a fifth core 33.

The optical absorber 43' can employ, for example, a core made of a P-type semiconductor or N-type semiconductor into which a dopant is implanted. This is because free carriers generated by the dopant implanted in the P-type semiconductor or N-type semiconductor function as an optical absorber that absorbs light. Further, the optical absorber 43' can be an optical absorber made of metal or a metal compound. The material of the optical absorber 43' is not specifically limited, but can be any material that absorbs light in a wide wavelength range including C band and L band.

Embodiment 4

The following description will discuss a polarizer 1D in accordance with Embodiment 4, with reference to FIG. 27. FIG. 27 is a top view illustrating a configuration of the polarizer 1D. FIG. 27 illustrates only a core of the polarizer 1D. The polarizer 1D has a structure in which two PBCs 1A illustrated in FIG. 16 are connected in series. The polarizer 1D can be expressed as a substrate-type optical waveguide element which includes n sets of a first core 13 and a second core 14. In Embodiment 4, a PBC 1A of a preceding stage is referred to as a PBC 1Aa, while a PBC 1A of a subsequent stage is referred to as a PBC 1Ab. In other words, when the sets of the first core 13 and the second core 14 are counted from one end of the polarizer, the PBC including a first set of the first core 13 and the second core 14 is the PBC 1Aa, and the PBC including a second set of the first core 13 and the second core 14 is the PBC 1Ab.

The second core 14 of the PBC 1Aa communicates with the first core 13 of the PBC 1Ab via a sixth core 34 of the PBC 1Aa and a third core 23 of the PBC 1Ab. The polarizer 1D functions as a polarizer as below.

When a TE polarized wave and a TM polarized wave is introduced through a port 1-1 of the PBC 1Aa, (1) most of the TM polarized wave transfers over to the second core 14 in a parallel-core section of the PBC 1Aa, and reaches a port 2-2 of the PBC 1Aa, (2) most of the TE polarized wave directly reaches a port 2-1 of the PBC 1Aa, and (3) part of the TE polarized wave transfers over to the second core 14 in the parallel-core section of the PBC 1Aa, and reaches the port 2-2 of the PBC 1Aa.

Then, (1) the most of the TM polarized wave and (3) the part of the TE polarized wave which have reached the port 2-2 of the PBC 1Aa are introduced into the PBC 1Ab through a port 1-1 of the PBC 1Ab. In this case, (4) the most of the TM polarized wave having been introduced transfers over to the second core 14 in a parallel-core section of the PBC 1Ab and is then outputted through a port 2-2 of the PBC 1Ab, (5) the part of the TE polarized wave having been introduced is directly outputted through a port 2-1 of the PBC 1Ab, and (6) part of the part of the TE polarized wave having been introduced transfers over to the second core 14 in the parallel-core section of the PBC 1Ab and is then outputted through the port 2-2 of the PBC 1Ab.

Connection of two PBCs 1A in series as described above allows, as an effect, the polarizer 1D to have an improved PER as compared to a PER in a case where a single PBC 1A is used. Embodiment 4 has described, as an example, a case where two PBCs 1A (two sets of the first core 13 and the second core 14) are connected in series. The polarizer 1D can be configured alternatively by connecting three or more PBCs 1A (three or more sets of the first core 13 and the second core 14) in series. In a case where the polarizer 1D is configured to include n sets (n is a positive integer) of the first core 13 and the second core 14, the second core 14 in the i-th set is configured to communicate with the first core 13 in the (i+1)th set. In this case, i is an integer of $1 \le i \le n-1$. Note that between the core 14 in the i-th set and the core 13 in the (i+1)th set, another core that is neither the core 13 nor the core 14 can be present.

It is possible to further improve the PER by increasing the number of PBCs 1A constituting the polarizer 1D.

Embodiment 5

The PBCs in accordance with the above Embodiments 1 to 4 can be used as a polarization beam combiner which is provided in a Dual Polarization-Quadrature Phase Shift Keying (DP-QPSK) modulator disclosed in Non-Patent Literature 1. The DP-QPSK modulator utilizes the following phenomenon: two modes including TE0 and TM0 can coexist in an optical waveguide. Accordingly, the DP-QPSK modulator carries out DP-QPSK modulation as follows: first, light having been introduced as TE0 is branched, and branched parts of light are modulated into QPSK signals, respectively; then, one of the branched parts of TE0 is converted into TM0 (polarization rotator); and thereafter, two modes (TE0 and TM0) are multiplexed on one optical waveguide by use of a PBC, such that an independent QPSK signal is present in each of the two modes. As a PBC for polarization multiplexing of TE0 and TM0, any of the PBC 1 and the PBCs 1A to 1C in accordance with the above-described Embodiments can be used.

In Embodiment 5, the following will discuss an optical modulator 5 which includes the PBC 1 in accordance with Embodiment 1 as a polarization beam combiner, with reference to FIG. 28. FIG. 28 is a block diagram illustrating a configuration of such an optical modulator 5.

The optical modulator 5 that is a DP-QPSK modulator includes, as illustrated in FIG. 28, (1) a first QPSK modulator 51 for carrying out QPSK modulation of TE0, (2) a second QPSK modulator 52 for carrying out QPSK modulation of TE0, (3) a polarization rotator 53 for converting, into TM0, TE0 having been modulated by the second QPSK modulator 52, and (4) a PBC 54 for carrying out polarization multiplexing of TE0 modulated by the first QPSK modulator 51 and TM0 obtained by the polarization rotator 53.

The PBC 54 is configured in the same manner as the PBC 1 illustrated in FIG. 6. The above TM0 is introduced through an input port 13a of a first core 13 of the PBC 54, while the above TE0 is introduced through an input port 14a of a second core 14 of the PBC 54. The PBC 54 carries out polarization multiplexing of the TM0 and the TE0, and then outputs polarization-multiplexed TM0 and TE0 through an output port 14b of the second core 14.

The optical modulator 5 including the PBC 54 as a polarization beam combiner has a low loss in a wide wavelength range including C band and L band. Accordingly, it is possible to provide a DP-QPSK modulator by use of a substrate-type optical waveguide having a low loss in such a wide wavelength range. Further, the PBC 54 can be fabricated by using a rectangular waveguide which is typically used in many instances. This makes it possible to fabricate the PBC 54 together with an optical waveguide serving as an optical wiring, so that no additional process is necessary.

Note that a method for modulating TE0 and TM0 is not limited to QPSK, and a modulator having a complex structure can also carry out polarization multiplexing by use of the PBC 54.

Embodiment 6

The following description will discuss a substrate-type optical waveguide element 6 in accordance with Embodiment 6, with reference to FIG. 29. FIG. 29 is a block diagram illustrating a configuration of the substrate-type optical waveguide element 6. As illustrated in FIG. 26, the substrate-type optical waveguide element 6 includes a spot-size converter 61 and an optical device 63, in addition to a polarizer 62. In Embodiment 6, it is assumed that the polarizer 62 is configured in the same manner as the PBC 1 illustrated in FIG. 6. Note that the polarizer 62 can be any of the PBCs 1A to 1C and the polarizer 1D described above, instead of the PBC 1.

The spot-size converter 61 reduces a spot size of light externally introduced via an optical fiber, lens, and the like, and then introduces the light into the polarizer 62 through an input port 13a of a first core 13 of the polarizer 62. The spot-size converter 61 can be, for example, an inverse-tapered waveguide having a core width that increases from a light-input end toward a polarizer-62-side end.

The optical device 63 is, for example, a modulator for modulating input light, or a wavelength filter for extracting only light having a specific wavelength. Therefore, it is preferable that either one of a TE polarized wave and a TM polarized wave is introduced into the optical device 63. However, light having passed through an external optical fiber and lens, and the spot-size converter 61 may contain an undesired polarized wave component, due to misalignment of polarization axes in the optical fiber and lens, and the spot-size converter 61.

As illustrated in FIG. 29, the polarizer 62 is provided between the spot-size converter 61 (light-input structure) and the optical device 63. The polarizer 62 outputs, to the optical device 63, a polarized wave component (TE polarized wave component or TM polarized wave component) preferable for the optical device 63 among TE polarized wave components and TM polarized wave components which may be contained in light introduced by the spot-size converter 61.

More specifically, output light of the spot-size converter 61 is introduced into the first core 13 through the input port 13a of the PBC 1. The polarizer 62 outputs a TE polarized wave component through an output port 13b of the first core 13 and a TM polarized wave component through an output port 14b of a second core 14.

In a case where a TE polarized wave component is preferable as a polarized wave component of input light to the optical device 63, the optical device 63 should be connected to a subsequent stage of the first core 13 of the polarizer 62. Then, a TE polarized wave component outputted from the first core 13 is introduced into the optical device 63.

On the other hand, in a case where a TM polarized wave component is preferable as a polarized wave component of input light to the optical device 63, the optical device 63 should be connected to a subsequent stage of the second core 14 of the polarizer 62. Then, a TM polarized wave component outputted from the second core 14 is introduced into the optical device 63.

As described above, provision of the polarizer 62 between the spot-size converter 61 and the optical device 63 that are formed on one substrate makes it possible to introduce, into the optical device 63, only a polarized wave component preferable for the optical device 63. The polarizer 62 can be fabricated by a process for fabricating the spot-size converter 61 and the optical device 63. In other words, fabrication of the substrate-type optical waveguide element 6 does not require addition of any special process for adding the polarizer 62 to the spot-size converter 61 and the optical device 63. Further, since the substrate-type optical waveguide element 6 includes the polarizer 62 configured in the same manner as the PBC 1, the optical device 63 can be prevented from being adversely affected by an undesirable polarized wave component, and at the same time, maintains a low loss in a wide wavelength range.

Embodiment 7

The following description will discuss a PBC 100 in accordance with Embodiment 7 with reference to FIG. 30. In Embodiment 7, the PBC 100 is intended to carry out polarization multiplexing or polarization separation of TE0 and TM0, as in Embodiment 1. (a) of FIG. 30 is a top view illustrating a configuration of the PBC 100, (b) of FIG. 30 is a cross-sectional view of the PBC 100 taken along line A-A' shown in (a) of FIG. 30, (c) of FIG. 30 is a cross-sectional view of the PBC 100 taken along line B-B' shown in (a) of FIG. 30, and (d) of FIG. 30 is a cross-sectional view of the PBC 100 taken along line C-C' in (a) of FIG. 30.

The above description has taken an example case where the core is shaped in two steps. That is, the core includes a main part and a protruding part which is lower than the main part. This allows TEi to be locally present in the protruding part more than TMj, and leads to an effect of making the degree of confinement of TEi in the core larger than the degree of confinement of TMj in the core. However, this effect is not limited by the configuration in which the core has two steps and the configuration in which the core is shaped in steps. For example, the above effect is obtained even when the steps of the core are n steps (n≥3). In Embodiment 7, the PBC 100 in which n=3 will be described below.

(Configuration of PBC 100)

As illustrated in (b) of FIG. 30, the PBC 100, similarly to the PBC 1, includes a first core 130 and a second core 140 which are arranged on a lower cladding 110, which is equivalent to the lower cladding 11, so as to be in parallel to each other at a certain distance. On the lower cladding 110, the first core 130, and the second core 140, an upper cladding 120 is provided so as to bury the first core 130 and the second core 140.

The first core 130 is shaped in three steps and includes an upper step part 130m, a middle step part 130p1, and a lower step part 130p2. Similarly, the second core 140 is shaped in three steps and includes an upper step part 140m, a middle step part 140p1, and a lower step part 140p2.

The upper step part 130m has a given width $W_{1-3}$, and the upper step part 140m has a given width $W_{2-3}$. The middle step part 130p1 has a width $W_{1-2}$ that continuously decreases with distance from the start position to the end position in the parallel-core section illustrated in (a) of FIG. 30. The middle step part 140p1 has a width $W_{2-2}$ that continuously increases with distance from the start position to the end position. The lower step part 130p2, which corresponds to the protruding part 13p of the PBC 1 illustrated in FIG. 7, has a width $W_{1-1}$ that continuously increases with distance from the start position to the end position. The lower step part 140p2, which corresponds to the protruding part 14p of the PBC 1 illustrated in FIG. 7, has a width $W_{2-1}$ that continuously decreases with distance from the start position to the end position.

The PBC 100 may be fabricated by etching the main part 13m of the PBC 1 in such a manner that the upper step part 130m having the given width $W_{1-3}$ is left in the main part 13m of the PBC 1 or by providing the upper step part 130m on the main part 13m.

(Features of PBC 100)

In the PBC 1, the aforementioned Features 1 to 6 are necessary and sufficient conditions for attaining the object of the present invention. However, allowing the core to have n steps (n≥3) requires the modifications below (a prime (') additionally given after a Feature number indicates a modification). Note that the Features 2 and 5 apply directly to the PBC 100, without the need for any modifications.

Feature 1': The first core 130 and the second core 140 are equal to each other in height of each corresponding step.

Feature 3': When $W_{i-j}$ is a core width of a j-th step (1≤j≤n) of WGi (i=1, 2), i.e., the first core (WG1) or the second core 140 (WG2), a relation of $W_{1-j} \geq W_{2-j}$ (this inequality holds for all js, but $W_{1-j} \neq W_{2-j}$ for at least one j) is satisfied at the cross sections including the port 1-1 and the port 1-2, while a relation of $W_{1-j} \leq W_{2-j}$ (this inequality holds for all js, but $W_{1-j} \neq W_{2-j}$ for at least one j) is satisfied at the cross sections including the port 2-1 and the port 2-2.

Feature 4': $W_{1-j}$ and $W_{2-j}$ are each continuous as a function of distance from the start position in the parallel-core section.

Feature 6': At any coordinates in the light traveling direction in the parallel-core section, at least one of the first core 130 (WG1) and the second core 140 (WG2) has a combination of j and k which always satisfy $W_{i-j} \neq W_{i-k}$ (j>k), at each cross section orthogonal to the light traveling direction. In other words, at least one of the cores always has a protruding part (step part). Further, a protruding part (step part) of one of the cores protrudes in a direction away from a protruding part (step part) of the other one of the cores.

The following description will provide a supplementary explanation about the above-described Features. Feature 1' as applied to the PBC 100 will be concretely explained below. A height of the upper step part 130m is equal to that of the upper step part 140m, a height of the middle step part 130p1 is equal to that of the middle step part 140p1, and a height of the lower step part 130p2 is equal to that of the lower step part 140p2.

Feature 3' as applied to the PBC 100 will be concretely explained below. A relation between a width of each step of the first core 130 and a width of each step of the second core 140 at the cross sections including the port 1-1 and the port 1-2 is the one as illustrated in (a) of FIG. 30. That is, the upper step parts have a relation of width $W_{1-3}$=width $W_{2-3}$, the middle step parts have a relation of width $W_{1-2}$>width $W_{2-2}$, and the lower step parts have a relation of width $W_{1-1}$=width $W_{2-1}$. Further, at the cross sections including the port 2-1 and the port 2-2, the upper step parts have a relation of width $W_{1-3}$=width $W_{2-3}$, the middle step parts have a relation of width $W_{1-2}$<width $W_{2-2}$, and the lower step parts have a relation of width $W_{1-1}$=width $W_{2-1}$.

When the above width relations of the PBC 100 are compared with the width relations of the PBC 1 as defined in the above Feature 3, it is clear that the width $W_{1-2}$ of the middle step part 130p1 and the width $W_{2-2}$ of the middle step part 140p1 satisfy the relation defined in Feature 3, and the width $W_{1-1}$ of the lower step part 130p2 and the width $W_{2-1}$ of the lower step part 140p2 satisfy the relation defined in Feature 3. That is, the width relation of the PBC 100 corresponds to the relation in Feature 3 that "the cross section including the port 1-1 and the cross section including the port 1-2 satisfy Wm1>Wm2 and W1≥W2, while the cross section including the port 2-1 and the cross section including the port 2-2 satisfy Wm1<Wm2 and W1≤W2". This leads to the conclusion that the middle step part 130p1 and the middle step part 140p1 correspond to the main part 13m and the main part 14m, respectively, and the lower step part 130p2 and the lower step part 140p2 correspond to the protruding part 13p and the protruding part 14p, respectively.

Feature 4' means that in the case of the PBC 100, none of the upper step parts 130m and 140m, the middle step parts 130p1 and 140p1, and the lower step parts 130p2 and 140p2 have portions in which the cross sections discontinuously change in shape with respect to the light traveling direction.

(Effect Unique to PBC 100)

The PBC 100 can obtain the aforementioned effects yielded by the PBC 1, just as in the case of the PBC 1. Moreover, the PBC 100 can reduce an adverse effect caused by line-edge roughness that occurs in the core side walls due to production errors. This makes it possible to further suppress a loss of a TM polarized wave. This is yielded for the following reason. The steps of the stepped core are formed by performing etching for each of the steps. In so doing, discontinuous portions are generated in each of the steps with respect to the light traveling direction. Consequently, line-edge roughness, which is a cause of a loss of light, occurs in each of the steps. It can be said that the line-edge roughness translates to a state in which the cross sectional area of the core discontinuously changes with respect to the light traveling direction. As the number of steps increases, production errors caused by etching of the steps are evened out, and a change in cross sectional area due to production errors thus becomes small. As discussed above, an increase in number of steps of a stepped core enables reduction of the influence of the line-edge roughness and thus achieves a low loss.

Embodiment 8

The following description will discuss a PBC 100A including a rib waveguide in accordance with Embodiment 8, with reference to FIGS. 31 and 32. For convenience of explanation, members of Embodiment 8 that are identical in function to their respective corresponding members described in Embodiment 7 are each assigned equivalent symbols. Detailed explanations of such members will be omitted. In Embodiment 8, the PBC 100A is intended to carry out polarization multiplexing or polarization separation of TE0 and TM0, as in Embodiment 1. FIG. 31 is a cross-sectional view illustrating a configuration of a rib waveguide. (a) of FIG. 32 is a top view illustrating a configuration of the PBC 100A, (b) of FIG. 32 is a cross-sectional view of the PBC 100A taken along line A-A' shown in (a) of FIG. 32, (c) of FIG. 32 is a cross-sectional view of the PBC 100A taken along line B-B' shown in (a) of FIG. 32, and (d) of FIG. 32 is a cross-sectional view of the PBC 100A taken along line C-C' in (a) of FIG. 32.

(Rib Waveguide)

As illustrated in FIG. 31, the rib waveguide has a core integrally including a rib and a thin plate-like slab (thin layer) which is lower than the rib. The rib protrudes upwards from the top surface of the thin plate-like slab, and the rib has a cross section shaped in n steps, as in the first core 130 or the second core 140. The rib waveguide further has a lower cladding 110 and an upper cladding 120A between which the core is provided. There is no intrinsic difference between the upper cladding 120A and the upper cladding 120, except that the upper cladding 120A is provided on the slab as well.

The rib waveguide is fabricated, for example, by using, as the lower cladding 110, a BOX layer made of $SiO_2$ of an SOI wafer, and forming a core by etching an Si layer that is a topmost layer of the SOI wafer in such a manner that a stepped rib and a slab are left. Thereafter, an upper cladding 120A made of $SiO_2$ is formed so as to cover the core. Note that the upper cladding 120A can be air. The rib waveguide is different from a rectangular waveguide illustrated in FIG. 6, etc. in that in the rib waveguide, a slab that is thinner than a rib is formed by leaving a core on both sides of the rib when the core is etched.

(Structure of PBC Constituted with Rib Waveguide)

Next, the following description will discuss, with reference to FIG. 32, a structure of the PBC 100A in accordance with one aspect of the present invention which is configured with a rib waveguide. As illustrated in (a) and (b) of FIG. 32, the PBC 100A includes a first rib 130A and a second rib 140A between the lower cladding 110 and the upper cladding 120. As compared with the configuration of the PBC 100, the configuration of the PBC 100A is equivalent to the configuration in which a slab 151 is provided under the step-shaped first core 130 and the step-shaped second core 140 each having n steps. Thus, an upper step part 130*m*, a middle step part 130*p*1, and a lower step part 130*p*2 which are provided in the first rib 130A and an upper step part 140*m*, a middle step part 140*p*1, and a lower step part 140*p*2 which are provided in the second rib 140A are the ones as described for the first core 130 and the second core 140. Explanations of these parts will be therefore omitted.

Note that the width of the slab 151 increases at both widthwise ends of the slab 151 to such an extent that light guided through the rib 130A and the rib 140A becomes sufficiently small. Here, "becomes sufficiently small" means that the influence of the line-edge roughness at both ends of the slab 151 is negligible.

This supports the contention that the PBC 100A has features similar to the features of the PBC 100. As a result, the PBC 100A can obtain effects similar to the effects obtained by the PBC 100.

(Effect Unique to PBC 100A)

A unique effect yielded by the PBC 100A including the rib waveguide is as follows. In the case of a rectangular waveguide, a core is formed by etching sides of the core. In this process, a phenomenon called "line-edge roughness" occurs due to a processing accuracy problem. In this phenomenon, a core width irregularly changes along a light traveling direction. In other words, an irregular microstructure occurs on a side wall of a core. As a result, guided light is scattered by the microstructure, so that loss is produced. On the other hand, in the case of a rib waveguide, a slab having a predetermined thickness is formed. The slab has side walls that are formed at a position sufficiently distant from a rib(s) which is a region where light is guided. Therefore, line-edge roughness of the slab does not scatter light being guided. In other words, as compared to the rectangular waveguide, the rib waveguide has a smaller ratio of the side wall portion which scatters light being guided. This makes it possible to decrease the loss. Further, the rib waveguide leads to achieving higher accuracy of continuity of the waveguide width (core width) required in the above Feature 4'. In light of this, the rib waveguide makes it possible to decrease loss. As described above, use of the rib waveguide makes it possible to reduce light loss caused by the influence of a processing accuracy problem.

Embodiment 9

The following description will discuss a PBC 100B in accordance with Embodiment 9, with reference to FIGS. 33 and 34. In Embodiment 9, the PBC 100B is intended to carry out polarization multiplexing or polarization separation of TE0 and TM0 as in Embodiment 1. (a) and (b) of FIG. 33 are cross-sectional views illustrating a method for fabricating a ridge waveguide in accordance with Embodiment 9. (c) of FIG. 33 is a cross-sectional view illustrating a basic form of the ridge waveguide. (a) of FIG. 34 is a top view illustrating a configuration of the PBC 100B, and (b) of FIG. 34 is a cross-sectional view of the PBC 100B taken along line A-A' shown in (a) of FIG. 34, (c) of FIG. 34 is a cross-sectional view of the PBC 100B taken along line B-B' shown in (a) of FIG. 34, and (d) of FIG. 34 is a cross-sectional view of the PBC 100B taken along line C-C' in (a) of FIG. 34.

(Basic Structure of Ridge Waveguide)

As illustrated in (c) of FIG. 33, the ridge waveguide includes a lower cladding, a lower cladding rib, and a core. The lower cladding rib is a protrusion of a part of a top surface of the lower cladding so as to have a rectangular cross section. The core is provided on the lower cladding rib and is configured such that a cross section orthogonal to the light traveling direction is shaped in steps, the steps being n steps (n≥2) whose widths, which are parallel to the top surface of the lower cladding, decrease as a distance from the top surface of the lower cladding increases in a perpendicular direction. That is, the core provided on the lower cladding rib has a structure in which a core 1-1 and a core 1-2 are provided stepwise in this order. Note that a whole of the structure in which a plurality of cores are provided stepwise on the lower cladding rib is referred to as a ridge, and a waveguide having a ridge structure is referred to as a ridge waveguide. FIG. 34 illustrates the configuration of the PBC 100B including the ridge waveguide. The PBC 100B includes a first ridge waveguide 130B and a second ridge waveguide 140B. The first ridge waveguide 130B and the second ridge waveguide 140B are provided on a top surface of a lower cladding 110B so as to be in parallel to each other in a light traveling direction. The lower cladding 110B is shared by the ridge 130B and the ridge 140B. A certain distance is provided between the ridge 130B and the ridge 140B. In other words, respective side walls of the ridge 130B and the ridge 140B which side walls face the ridge 130B and the ridge 140B are provided in parallel to each other at a certain distance. As illustrated in (b) and (c) of FIG. 34, a first core of the first ridge waveguide 130B is configured such that a width Wm1 of a core 1-2 130B2 is smaller than a width W1 of a core 1-1 130B1, and the core 1-2 130B2 is provided stepwise on the core 1-1 130B1. Similarly, a second core of the second ridge waveguide 140B is configured such that a width Wm2 of a core 2-2 140B2 is smaller than a width W2 of a core 2-1 140B1, and the core 2-2 140B2 is provided stepwise on the core 2-1 140B1. Note that an upper cladding is surrounded by the first ridge waveguide 130B and the second ridge waveguide 140B, and a material of the upper cladding can be selected from materials (e.g., air, resin, and semiconductor) having a refractive index smaller than that of the lower cladding.

Further, the discussion made in Embodiment 1 applies directly to the width W1 of the core 1-1 130B1, the width W2 of the core 2-1 140B1, the width Wm1 of the core 1-2 130B2, the width Wm2 of the core 2-2 140B2, a height hp1 of the core 1-1 130B1, a height hp2 of the core 2-1 140B1, a height hm1, which is a combination of the height of the core 1-1 130B1 and the core 1-2 130B2, and a height hm2, which is a combination of the height of the core 2-1 140B1 and the height of the core 2-2 140B2. Particularly, the relation defined in the above-described Feature 3 applies directly to the width W1 of the core 1-1 130B1, the width W2 of the core 2-1 140B1, the width Wm1 of the core 1-2 130B2, and the width Wm2 of the core 2-2 140B2.

The ridge waveguide is fabricated as illustrated in (a) of FIG. 33. For example, the ridge waveguide is fabricated as follows. The lower cladding made of InP, the core 1-1 made of InGaAsP, and the upper cladding made of InP are formed in this order in the form of layers. Thereafter, the core 1-1, the core 1-2, and the lower cladding are etched such that a part of the core 1-1 having a desired core width and a part of the core 1-2 having a desired core width are left, and the lower cladding rib is formed on the top surface of the lower cladding. Finally, the core 1-2 is etched such that the core 1-2 forms a step with respect to the core 1-1. As a result, the first core including the core 1-1 and the core 1-2 is formed. Similarly, the second core including the core 2-1 and the core 2-2 is formed.

Formation of a waveguide as the ridge waveguide in the way described above makes it possible to increase a relative refractive index difference in a width direction, even in a case where a relative refractive index difference between the lower cladding and the core 1-1 and a relative refractive index difference between the core 1-1 and the core 1-2 are small. For example, in a case where the core 1-2 and the lower cladding are formed by using InP (refractive index: 3.17), and the core 1-1 is formed by using InGaAsP (refractive index: 3.47), the relative refractive index difference between the lower cladding and the core 1-1 and the relative refractive index difference between the core 1-1 and the core 1-2 are each 0.08 (8%). However, in a case where the region having been subjected to etching, i.e., the upper cladding, is formed by air (refractive index: 1), the relative refractive index difference of the core 1-1 in the width direction and the relative refractive index difference of the core 1-2 in the width direction can be significantly increased to 0.46 (46%) and 0.45 (45%), respectively.

Use of the ridge waveguide in place of a rectangular waveguide or a rib waveguide makes it possible to increase the strength of confinement of light in the width direction, even when an employed combination of a core and a cladding results in a small relative refractive index difference of the core with respect to the cladding, for example, in a case where a core made of InGaAsP and a claddings made of InP are employed in combination.

(Feature of PBC 100B)

A relative refractive index difference for the PBC 1 described in (More preferable condition 1) above needs to be changed for the PBC 100B. In Formula (10) defining the relative refractive index difference of the PBC 1, refractive indexes of the lower cladding 11 and the upper cladding 12 are defined as $N_{c11}$ and $N_{c12}$, respectively, and a refractive index of a material having the largest refractive index is defined as $N_{c1}$. On the other hand, in regard to the PBC 100B, the definition of $N_{c1}$ is redefined as follows: "$N_{c1}$ is Nb when Nb is a refractive index of a material filling a space (region having been subjected to etching) between a core of the ridge 130B (WG1) and a core of the ridge 140B (WG2)."

The reason for this redefinition is as follows. The PBC 100B utilizes the following phenomenon: optical coupling of TE0 to an adjacent waveguide occurs less than that of TM0. A level of optical coupling depends on an amount of light that leaks out from one waveguide over to the other waveguide. Accordingly, light confinement can be made stronger in a direction from one of two waveguides to the other one of the two waveguides, by increasing a relative refractive index difference of a region between the two waveguides and each core. This makes it possible to obtain an effect of an embodiment of the present invention. In this case, it is appropriate to take the value of $N_{c1}$ as Nb since a material of the region between the two waveguides plays an essential role associated with $N_{c1}$.

Use of a ridge waveguide has the following significant advantages. That is, in a case where (i) a relative refractive index difference between a core and each of an upper cladding and a lower cladding is small, the effect of the present invention cannot be sufficiently obtained by a rectangular waveguide. On the other hand, a ridge waveguide makes it possible to sufficiently obtain the effect of the present invention by only adding an etching step to a fabrication process of a rectangular waveguide.

[Modification (1)]

The following description will discuss a PBC 100C in accordance with Modification (1) of Embodiment 9, with reference to (a) of FIG. 35. (a) of FIG. 35 is a cross-sectional view of the PBC 100C in a case where the PBC 100C is cut at a position corresponding to the position of line B-B' illustrated in (a) of FIG. 30.

The PBC 100C is different from the PBC 100 including stepped cores illustrated in (a) and (c) of FIG. 30 in that in the PBC 100C, a groove is formed along a height direction of the PBC 100C through a space between a first core 130C and a second core 140C provided in parallel to each other on a lower cladding 110C. The groove 180 formed in the PBC 100C reaches, from a top surface of an upper cladding 120C, a position in the lower cladding 110C but not a bottom surface of the lower cladding 110C along the height direction, passing through the space between the first core 130C and the second core 140C adjacent to each other.

A material filling at least the groove 180 is identical to "the material, having a refractive index Nb, to fill at least a space (region having been subjected to etching) between a core of the ridge 130B (WG1) and a core of the ridge 140A (WG2)", which has been described earlier.

The PBC 100C is fabricated by forming the PBC 100 illustrated in (a) to (d) of FIG. 30 and then etching the upper cladding 120C and the lower cladding 110C so that the groove 180 is formed passing through the space between the first core 130C and the second core 140C along the height direction of the PBC 100. Therefore, it is possible to fabricate the PBC 100C by only adding an etching step to the fabrication process of the PBC 100.

[Modification (2)]

The following description will discuss a PBC 100D in accordance with Modification (2) of Embodiment 9, with reference to (b) of FIG. 35. (b) of FIG. 35 is a cross-sectional view of the PBC 100D in a case where the PBC 100D is cut at a position corresponding to the position of line B-B' illustrated in (a) of FIG. 32.

The PBC 100D is different from the PBC 100A including stepped cores illustrated in (a) and (c) of FIG. 32 in that in the PBC 100D, a groove is formed along a height direction of the PBC 100D through a space between a first rib 130A and a second rib 140A provided in parallel to each other on a lower cladding 110D. The groove 181 formed in the PBC 100D reaches, from a top surface of an upper cladding 120D, a position in the lower cladding 110D but not a bottom surface of the lower cladding 110D along the height direction, passing through the space between the first rib 130A and the second rib 140A adjacent to each other.

A material filling at least the groove 181 is identical to "the material, having a refractive index Nb, to fill at least a space (region having been subjected to etching) between a core of the ridge 130B (WG1) and a core of the ridge 140A (WG2)", which has been described earlier.

The PBC 100D is fabricated by forming the PBC 100A illustrated in (a) to (d) of FIG. 32 and then etching the upper cladding 120D and the lower cladding 110D so that the groove 181 is formed passing through the space between the first rib 130A and the second rib 140A along the height direction of the PBC 100A. Therefore, it is possible to fabricate the PBC 100D, which yields an effect equivalent to the effect yielded by the PBC 100C, by only adding an etching step to the fabrication process of the PBC 100.

[Additional Matters]

In order to solve the above problems, a substrate-type optical waveguide element in accordance with an aspect of the present invention includes: a lower cladding whose refractive index is $N_{c11}$; a first core and a second core, refractive indexes of which are $N_{co}$ ($N_{co}>N_{c11}$), the first core and the second core each being formed on the lower cladding; and an upper cladding whose refractive index is $N_{c12}$ ($N_{co}>N_{c12}$), the upper cladding being provided on the lower cladding so as to bury the first core and the second core, wherein: when (i) effective refractive indexes of a TE polarized wave and a TM polarized wave in the first core are $N_{TE}$@WG1 and $N_{TM}$@WG1, respectively, in a case where the second core is absent, and (ii) effective refractive indexes of a TE polarized wave and a TM polarized wave in the second core are $N_{TE}$@WG2 and $N_{TM}$@WG2, respectively, in a case where the first core is absent, (A) each of the effective refractive indexes $N_{TE}$@WG1, $N_{TM}$@WG1, $N_{TE}$@WG2, and $N_{TM}$@WG2 is continuous as a function of distance from a start position of a parallel-core section in which the first core and the second core extend in parallel to each other, (B) the effective refractive indexes $N_{TE}$@WG1 and $N_{TM}$@WG1 satisfy a relation of $N_{TE}$@WG1>$N_{TM}$@WG1 all along the parallel-core section, (C) the effective refractive indexes $N_{TE}$@WG2 and $N_{TM}$@WG2 satisfy a relation of $N_{TE}$@WG2>$N_{TM}$@WG2 all along the parallel-core section, (D) a magnitude relation of the effective refractive indexes $N_{TM}$@WG1 and $N_{TM}$@WG2 at the start position of the parallel-core section is opposite to a magnitude relation of the effective refractive indexes $N_{TM}$@WG1 and $N_{TM}$@WG2 at an end position of the parallel-core section, and (E) at least one of the first core and the second core includes (a) a main part having a quadrilateral cross section orthogonal to a light traveling direction and (b) a protruding part protruding from one of side surfaces of the main part in a direction parallel to a boundary surface between the lower cladding and the upper cladding, the protruding part having a quadrilateral cross section orthogonal to the light traveling direction.

Since the substrate-type optical waveguide element in accordance with the aspect of the present invention satisfies the conditions (A) and (D), the TM polarized wave introduced into a first-side end of the first core adiabatically transfers over to the second core in the parallel-core section, and then outputted from a second-side end of the second core.

Further, since the substrate-type optical waveguide element in accordance with the aspect of the present invention satisfies the conditions (B) and (C), strength of optical coupling of the TM polarized wave differs from strength of optical coupling of the TE polarized wave. Further, since the condition (E) is satisfied, such difference in strength of optical coupling is sufficiently large. Therefore, most of the TE polarized wave having been introduced into a first-side end of the second core does not transfer over to the first core, and is outputted from the second-side end of the second core.

In other words, according to the above aspect of the present invention, it is possible to provide a substrate-type optical waveguide element having a small loss of a TM polarized wave and a high polarization extinction ratio. Besides, according to the above aspect of the present invention, satisfying the condition (E) increases a difference between the strength of optical coupling of a TM polarized wave and the strength of optical coupling of a TE polarized wave. This eliminates the need to increase or decrease the height of the first core or the second core in order to obtain the above effect. Therefore, the need for an increase or decrease in thickness is eliminated.

Further, a substrate-type optical waveguide element in accordance with an aspect of the present invention, the protruding part plays a supporting role with respect to the main part. In other words, a main electric field of light guided through the substrate-type optical waveguide element is distributed in the main part. Thus, even in a case where an error has occurred during the production process in which the main part and the protruding part are formed, a loss caused by the error is small. Further, even when the main part and the protruding part are affected by independent production errors, an impact of the production errors is small because the protruding part is used only to weaken optical coupling of a TE polarized wave between the first core and the second core. Therefore, a substrate-type optical waveguide element in accordance with an aspect of the present invention has a low susceptibility to production errors and can suppress loss of a TM polarized wave to a low level in a wide wavelength range without the need for an increase in required accuracy of a production process.

The substrate-type optical waveguide element having the above functions serves as (a) a polarization beam combiner for carrying out polarization multiplexing of the TE polarized wave and the TM polarized wave, (b) a polarization beam splitter for carrying out polarization separation of the TE polarized wave and the TM polarized wave, and (c) a polarizer extracting only one polarized wave component from light in which the TE polarized wave and the TM polarized wave are mixedly present. Further, the substrate-type optical waveguide element can suppress loss of the TM polarized wave to a low level in a wide wavelength range.

Moreover, the substrate-type optical waveguide element in accordance with an aspect of the present invention is preferably arranged such that: when Wm1 is a width of the main part of the first core, Wp1 is a width of the protruding part of the first core, W1 is a sum of Wm1 and Wp1, Wm2 is a width of the main part of the second core, Wp2 is a width of the protruding part of the second core, and W2 is a sum of Wm2 and Wp2, the widths Wm1, W1, Wm2, and W2 are each continuous as a function of distance from the start position of the parallel-core section, the widths Wm1, W1, Wm2, and W2 satisfy Wm1≥Wm2 and W1>W2 or satisfy Wm1>Wm2 and W1≥W2, at the start position of the parallel-core section, and the widths Wm1, W1, Wm2, and W2 satisfy Wm1≤Wm2 and W1<W2 or satisfy Wm1<Wm2 and W1≤W2, at the end position of the parallel-core section.

According to the above configuration, since the widths Wm1, W1, Wm2, and W2 are each continuous as a function of distance from the start position of the parallel-core section, the condition (A) is satisfied. Further, since Wm1≥Wm2 and W1>W2 are satisfied or Wm1>Wm2 and W1≥W2 are satisfied at the start position of the parallel-core section, and Wm1≤Wm2 and W1<W2 are satisfied or Wm1<Wm2 and W1≤W2 are satisfied at the end position of the parallel-core section, the condition (D) is satisfied. Therefore, it is possible to realize, with a simple configuration, the substrate-type optical waveguide element which satisfies the conditions (A) and (D).

Moreover, the substrate-type optical waveguide element in accordance with an aspect of the present invention is preferably arranged such that: a height of the main part of the first core is equal to or substantially equal to a height of the main part of the second core, and a height of the protruding part of the first core is equal to or substantially equal to a height of the protruding part of the second core.

According to the above configuration, it is possible to form the first core and the second core by two times of etching. Thus, the above configuration makes it easy to produce a substrate-type optical waveguide element and makes it possible to reduce production the cost of producing the substrate-type optical waveguide element.

Note that the configuration in which the height of the main part of the first core is substantially equal to the height of the main part of the second core means that the heights of these two main parts are equal to such an extent that top surfaces of these two main parts can be formed by one time of etching. Further, the configuration in which the height of the protruding part of the first core is substantially equal to a height of the protruding part of the second core means that the heights of these two protruding parts are equal to such an extent that top surfaces of these two protruding parts can be formed by one time of etching.

Moreover, the substrate-type optical waveguide element in accordance with an aspect of the present invention is preferably arranged such that: the protruding part of the first core protrudes in a direction away from the second core, and the protruding part of the second core protrudes in a direction away from the first core.

The above configuration makes it possible to further increase a difference between the strength of optical coupling of a TE polarized wave and the strength of optical coupling of a TM polarized wave. Therefore, it is possible to further increase a polarization extinction ratio of the substrate-type waveguide element when it serves as a polarization beam splitter or a polarization beam combiner.

Moreover, the substrate-type optical waveguide element in accordance with an aspect of the present invention is preferably arranged such that: the widths Wm1 and Wp1 are larger than the height of the main part of the first core, and the widths Wm2 and Wp2 are larger than the height of the main part of the second core.

According to the above configuration, in a case where the TE polarized wave is TE0 while the TM polarized wave is TM0, the following effect is yielded. That is, since the widths Wm1 and Wp1 are larger than the height of the main part of the first core, the effective refractive indexes $N_{TE}@WG1$ and $N_{TM}@WG1$ satisfy the condition (B). Further, since the widths Wm2 and Wp2 are larger than the height of the main part of the second core, the effective refractive indexes $N_{TE}@WG2$ and $N_{TM}@WG2$ satisfy the conditions (B) and (C). Therefore, it is possible to realize, with a simple configuration, the substrate-type optical waveguide element which satisfies the conditions (B) and (C).

Moreover, the substrate-type optical waveguide element in accordance with an aspect of the present invention is preferably arranged such that: when $N_{c1}$ is a larger one of the refractive index $N_{c11}$ of the lower cladding and the refractive index $N_{c12}$ of the upper cladding, a relative refractive index difference defined by the following Formula (a) is 0.25 or higher:

[Math. 5]

$$\text{RELATIVE REFRACTIVE INDEX DIFFERENCE} = \frac{1}{2}\left[1 - \left(\frac{N_{cl}}{N_{co}}\right)^2\right]. \quad (a)$$

The above configuration makes it possible to further increase a difference between the strength of optical coupling of a TE polarized wave and the strength of optical coupling of a TM polarized wave. Therefore, it is possible to further increase a polarization extinction ratio of the substrate-type waveguide element when it serves as a polarization beam splitter or a polarization beam combiner.

Moreover, the substrate-type optical waveguide element in accordance with an aspect of the present invention is preferably arranged such that: the first core and the second core are each made of silicon; and the lower cladding and the upper cladding are each made of silica.

With the above configuration, the substrate-type optical waveguide element can use, as a substrate, an SOI (Silicon-On-Insulator) wafer and accordingly, can be produced by using an existing CMOS process. Therefore, the substrate-type optical waveguide element can be easily produced. Further, the substrate-type optical waveguide element can achieve a large relative refractive index difference.

Moreover, the substrate-type optical waveguide element in accordance with an aspect of the present invention is preferably arranged such that: when $W_{upper}$ is a value defined by the following Formula (b):

[Math. 6]

$$W_{upper} = \{0.868224 \times [\log_e(h)]^4 - 21.265613 \times [\log_e(h)]^3 + 195.780964 \times [\log_e(h)]^2 - 802.242303 \times \log_e(h) + 1236.45521\} \times h, \quad (b)$$

where h is an equal height of the main part of the first core and the main part of the second core, and e is Napier's constant, and when Wm1 is a width of the main part of the first core, Wp1 is a width of the protruding part of the first core, W1 is a sum of Wm1 and Wp1, Wm2 is a width of the main part of the second core, Wp2 is a width of the protruding part of the second core, and W2 is a sum of Wm2 and Wp2, the widths Wm1, W1, Wm2, and W2 each are larger than h and smaller than $W_{upper}$.

In a case where the width W1 or the width W2 is gradually increased, the effective refractive index of TE0 significantly increases. This increases a difference between the effective refractive index of TE0 and the effective refractive index of TM0. However, in a case where the width W1 or width W2 becomes not less than $W_{upper}$, a magnitude relation of the effective refractive index of TM0 and the effective refractive index of TE1 is reversed. Such reversal of the magnitude relation results in increased possibility of the occurrence of interaction between TM0 and TE1. In other words, the reversal of the above magnitude relation leads to a conversion of part of TM0 to TE1 polarized wave, so that the conversion results in increased possibility of the occurrence of excess loss of TM0.

On the other hand, in the above configuration, the magnitude relation of the effective refractive index of TM0 and the effective refractive index of TE1 is not reversed. This suppresses the possibility of the occurrence of interaction between TM0 and TE1. Therefore, it is possible to suppress excess loss of TM0.

Moreover, the substrate-type optical waveguide element in accordance with an aspect of the present invention may be arranged to further includes: a third core whose refractive index is $N_{co}$, the third core communicating with the first core via the start position or the end position of the parallel-core section; and a fourth core whose refractive index is $N_{co}$, (1) the fourth core communicating with the second core via the start position of the parallel-core section in a case where the third core communicates with the first core via the start position of the parallel-core section, and (2) the fourth core communicating with the second core via the end position of the parallel-core section in a case where the third core communicates with the first core via the end position of the parallel-core section, wherein (1) in a case where the third core communicates with the first core via the start position of the parallel-core section, a distance between the third core and the fourth core increases as a distance from the start position of the parallel-core section increases, and (2) in a case where the third core communicates with the first core via the end position of the parallel-core section, a distance between the third core and the fourth core increases as a distance from the end position of the parallel-core section increases.

With the above configuration, in a case where another waveguide is connected to the first core, the presence of the third core between the first core and the another waveguide makes it possible to smoothly connect the first core and the another waveguide. Similarly, in a case where another waveguide is connected to the second core, the presence of the fourth core between the second core and the another waveguide makes it possible to smoothly connect the second core and the another core. Thus, it is possible to suppress possibility of undesired reflection caused by connection of another waveguide to the first core or the second core.

Further, since a distance between cores adjacent to each other can be gradually increased, it is possible to continuously increase (on an input side)/decrease (on an output side) the strength of optical coupling of the TM polarized light. This makes it possible to decrease the strength of optical coupling of the TM polarized wave to an adjacent waveguide as a distance from an input/output section increases. Accordingly, the TM polarized wave can have an electric field distribution that is localized more in one of waveguides. As a result, it is possible to reduce loss which is caused by the TM polarized wave remaining in the other one of the waveguides.

Moreover, the substrate-type optical waveguide element in accordance with an aspect of the present invention may be arranged to further include: a fifth core whose refractive index is $N_{co}$, the fifth core communicating with the first core or the second core, the fifth core having a width that decreases as a distance from the first core increases.

In the above configuration, light having been introduced into the fifth core from the first core or the second core leaks into the lower cladding or the upper cladding in a propagation process through the fifth core. Therefore, it is possible to prevent light having been introduced into the fifth core from the first core or the second core from returning back into the parallel-core section.

Moreover, the substrate-type optical waveguide element in accordance with an aspect of the present invention can further include: an optical absorber connected to the first core or the second core.

In the above configuration, light having been introduced into the optical absorber from the first core or the second core is absorbed by the optical absorber. Therefore, it is possible to prevent light having been introduced into the optical absorber from the first core or the second core from returning back into the parallel-core section.

Moreover, a substrate-type optical waveguide element in accordance with an aspect of the present invention may be arranged to be the substrate-type optical waveguide element recited in any one of claims 1 to 11 including: n sets of the first core and the second core, the second core in an i-th set (where i is an integer in a range of 1≤i≤n−1) as counted from one end of the substrate-type optical waveguide element communicating with the first core in an (i+1)th set as counted from the one end.

The above configuration makes it possible to provide a polarizer having a high polarization extinction ratio.

Moreover, the substrate-type optical waveguide element in accordance with an aspect of the present invention may be arranged to further include: a first optical modulator for modulating part of a TE polarized wave; a second optical modulator for modulating part of the TE polarized wave; and a polarization rotator for converting, into a TM polarized wave, an TE polarized wave output from the second optical modulator, the TM polarized wave outputted from the polarization rotator being introduced into the first core, and the TE polarized wave outputted from the first optical modulator being introduced into the second core.

The above configuration makes it possible to provide an optical modulator having a low loss in a wide wavelength range.

Moreover, the substrate-type optical waveguide element in accordance with an aspect of the present invention may be arranged to further include: a light-input structure; and an optical device, the light-input structure allowing externally introduced light to enter into the first core, after reducing a spot size of the externally introduced light, the first core outputting a TE polarized wave component of the light having entered into the first core, the second core outputting a TM polarized wave component of the light having entered into the first core, and the TE polarized wave component outputted from the first core or the TM polarized wave component outputted from the second core being introduced into the optical device.

In the above configuration, even in a case where a polarized wave component unfavorable to the optical device occurs in the light-input structure, it is possible to introduce, into the optical device, the TE polarized wave component outputted from the first core, or the TM polarized wave component outputted from the second core. Since the light-input structure and the optical device can be produced on the same substrate device as the substrate-type optical waveguide element, the light-input structure and the optical can be easily produced.

In the substrate-type optical waveguide element in accordance with an aspect of the present invention, the condition (E) may be replaced by the following condition:

"at least one of the first core and the second core is configured such that a cross section orthogonal to a light traveling direction is shaped in steps, the steps being n steps (n≥3) whose widths, which are parallel to a top surface of the lower cladding, decrease as a distance from the top surface of the lower cladding increases toward a top surface of the upper cladding."

This configuration can also obtain the effect yielded by the substrate-type optical waveguide element including the conditions (A) to (E).

Moreover, the substrate-type optical waveguide element in accordance with an aspect of the present invention may be arranged such that: when $W_{1-j}$ is a width of a j-th step (1≤j≤n) of the first core, and $W_{2-j}$ is a width of a j-th step (1≤j≤n) of the second core, $W_{1-j}$ and $W_{2-j}$ satisfy a relation of $W_{1-j} \geq W_{2-j}$ (for at least one j, $W_{1-j} \neq W_{2-j}$) at the start position of the parallel-core section, and $W_{1-j}$ and $W_{2-j}$ satisfy a relation of $W_{1-j} \leq W_{2-j}$ (for at least one j, $W_{1-j} \neq W_{2-j}$) at the end position of the parallel-core section.

In the above configuration, a j-th core for which the equality does not hold at the start position and the end position in the parallel-core section yields an effect equivalent to that of the main part.

Moreover, the substrate-type optical waveguide element in accordance with an aspect of the present invention may be arranged such that: the first core and the second core are each formed on a thin layer, which is formed on the top surface of the lower cladding, the thin layer having a width equal to a width of the lower cladding.

In the above configuration, a ratio of a side wall portion that scatters guided light is lower than that in a rectangular waveguide. This makes it possible to suppress "line-edge roughness", which is an irregular microstructure extending along the light traveling direction, and makes it possible to reduce loss caused by the "line-edge roughness". Further, the above configuration leads to achieving higher accuracy of continuity of the waveguide width (core width). In light of this, the above configuration makes it possible to decrease loss. As described above, use of the above configuration makes it possible to reduce light loss caused by the influence of a processing accuracy problem.

Moreover, the substrate-type optical waveguide element in accordance with an aspect of the present invention is preferably arranged such that: a groove is provided so as to pass through a space between the first core and the second core, which are provided in parallel to each other on the lower cladding, and reach, from the top surface of the upper cladding, a position in the lower cladding along a height of the lower cladding but not a bottom surface of the lower cladding, and a refractive index of a material filling at least the groove is smaller than the refractive index of the lower cladding.

The above configuration achieves stronger light confinement in a width direction of the substrate-type optical waveguide element, i.e., in a direction from one of the cores to the other one of the cores. This makes it possible to sufficiently obtain an effect of an embodiment of the present invention even in a case where a relative refractive index difference between a core and each of an upper cladding and a lower cladding is small.

In the substrate-type optical waveguide element in accordance with an aspect of the present invention, the condition (E) may be replaced by the following condition:

"the first core and the second core are provided on a first lower cladding rib and a second lower cladding rib, respectively, both of which protrude from the lower cladding so as to extend in parallel to each other and in alignment with the first core and the second core, respectively, which extend in parallel to each other on the lower cladding, the first core and the second core each are configured such that a cross section orthogonal to a light traveling direction is shaped in steps, the steps being n steps (n≥2) whose widths, which are parallel to a top surface of the lower cladding, decrease as a distance from the top surface of the lower cladding increases in a perpendicular direction, and at least a space provided between (i) a laminate structure of the first lower cladding rib and the first core and (ii) a laminate structure of the second lower cladding rib and the second core is filled with a material having a refractive index smaller than the refractive index of the lower cladding."

The above configuration achieves stronger light confinement in a width direction of the substrate-type optical waveguide element, i.e., in a direction from one of the cores to the other one of the cores. This makes it possible to sufficiently obtain an effect of an embodiment of the present invention even in a case where a relative refractive index difference between a core and each of an upper cladding and a lower cladding is small.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a substrate-type optical waveguide element in which two cores are provided between a lower cladding and an upper cladding.

REFERENCE SIGNS LIST 1, 1A, 1B, 1C, 100, 100A, 100B, 100C, 100D
   PBC (polarization beam combiner, substrate-type optical waveguide element)
11, 110, 110B, 110C, 110D
   Lower cladding
12, 120, 120A, 120C, 120D
   Upper cladding 13, 130 First core
13m Main part
13p Protruding part
14, 140 Second core
14m Main part
14p Protruding part
23 Third core
24 Fourth core
33 Fifth core (third core)
34 Sixth core (fourth core)
43 Seventh core (fifth core)
43' Optical absorber
1D Polarizer (substrate-type optical waveguide element)
5 Optical modulator (substrate-type optical waveguide element)
51 First QPSK modulator (first optical modulator)
52 Second QPSK modulator (second optical modulator)
53 Polarization rotator
54 PBC (polarization beam combiner)
6 Substrate-type optical waveguide element
61 Spot-size converter (light-input structure)
62 Polarizer
63 Optical device
110Ba Lower cladding rib
180, 181 Groove
130A First rib
130B1 Core 1-1 (first core)
130B2 Core 1-2 (first core)
140A Second rib
140B1 Core 2-1 (second core)
140B2 Core 2-2 (second core)
151 Slab (thin layer)

The invention claimed is:

1. A substrate-type optical waveguide element comprising:
   a lower cladding whose refractive index is $N_{c11}$;
   a first core and a second core, refractive indexes of which are $N_{co}$ ($N_{co} > N_{c11}$), the first core and the second core each being formed on the lower cladding; and
   an upper cladding whose refractive index is $N_{c12}$ ($N_{co} > N_{c12}$), the upper cladding being provided on the lower cladding so as to bury the first core and the second core, wherein:
   when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent,
   (A) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other,
   (B) the effective refractive indexes $N_{TE}@WG1$ and $N_{TM}@WG1$ satisfy a relation of $N_{TE}@WG1 > N_{TM}@WG1$ all along the parallel-core section, while the effective refractive indexes $N_{TE}@WG2$ and $N_{TM}@WG2$ satisfy a relation of $N_{TE}@WG2 > N_{TM}@WG2$ all along the parallel-core section,
   (C) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section, and
   (D) at least one of the first core and the second core includes (a) a main part having a quadrilateral cross section orthogonal to a light traveling direction and (b) a protruding part protruding from one of side surfaces of the main part in a direction parallel to a boundary surface between the lower cladding and the upper cladding, the protruding part having a quadrilateral cross section orthogonal to the light traveling direction.

2. The substrate-type optical waveguide element as set forth in claim 1, wherein:
   when Wm1 is a width of the main part of the first core, Wp1 is a width of the protruding part of the first core, W1 is a sum of Wm1 and Wp1, Wm2 is a width of the main part of the second core, Wp2 is a width of the protruding part of the second core, and W2 is a sum of Wm2 and Wp2, the widths Wm1, W1, Wm2, and W2 are each continuous as a function of distance from the start position of the parallel-core section,
   the widths Wm1, W1, Wm2, and W2 satisfy Wm1≥Wm2 and W1>W2 or satisfy Wm1>Wm2 and W1≥W2, at the start position of the parallel-core section, and
   the widths Wm1, W1, Wm2, and W2 satisfy Wm1≤Wm2 and W1<W2 or satisfy Wm1<Wm2 and W1≤W2, at the end position of the parallel-core section.

3. The substrate-type optical waveguide element as set forth in claim 2, wherein:
   a height of the main part of the first core is equal to or substantially equal to a height of the main part of the second core, and
   a height of the protruding part of the first core is equal to or substantially equal to a height of the protruding part of the second core.

4. The substrate-type optical waveguide element as set forth in claim 2, wherein:
   the protruding part of the first core protrudes in a direction away from the second core, and
   the protruding part of the second core protrudes in a direction away from the first core.

5. The substrate-type optical waveguide element as set forth in claim 2, wherein:
   the widths Wm1 and Wp1 are larger than the height of the main part of the first core, and
   the widths Wm2 and Wp2 are larger than the height of the main part of the second core.

6. The substrate-type optical waveguide element as set forth in claim 1, wherein:
   when $N_{c1}$ is a larger one of the refractive index $N_{c11}$ of the lower cladding and the refractive index $N_{c12}$ of the upper cladding, a relative refractive index difference defined by the following Formula (a) is 0.25 or higher:

[Math. 1]

$$\text{RELATIVE REFRACTIVE INDEX DIFFERENCE} = \frac{1}{2}\left[1 - \left(\frac{N_{cl}}{N_{co}}\right)^2\right]. \quad (a)$$

7. The substrate-type optical waveguide element as set forth in claim 6, wherein:
   the first core and the second core are each made of silicon; and the lower cladding and the upper cladding are each made of silica.

8. The substrate-type optical waveguide element as set forth in claim 2, wherein:
when $W_{upper}$ is a value defined by the following Formula (b):

[Math. 6]

$$W_{upper} = \{0.868224 \times [\log_e(h)]^4 - 21.265613 \times [\log_e(h)]^3 + 195.780964 \times [\log_e(h)]^2 \cdot 802.242303 \times \log_e(h) + 1236.45521\} \times h, \quad (b)$$

where h is an equal height of the main part of the first core and the main part of the second core, and e is Napier's constant, and
when Wm1 is a width of the main part of the first core, Wp1 is a width of the protruding part of the first core, W1 is a sum of Wm1 and Wp1, Wm2 is a width of the main part of the second core, Wp2 is a width of the protruding part of the second core, and W2 is a sum of Wm2 and Wp2,
the widths Wm1, W1, Wm2, and W2 each are larger than h and smaller than $W_{upper}$.

9. The substrate-type optical waveguide element as set forth in claim 1, further comprising:
a third core whose refractive index is $N_{co}$, the third core communicating with the first core via the start position or the end position of the parallel-core section; and
a fourth core whose refractive index is $N_{co}$,
(1) the fourth core communicating with the second core via the start position of the parallel-core section in a case where the third core communicates with the first core via the start position of the parallel-core section, and (2) the fourth core communicating with the second core via the end position of the parallel-core section in a case where the third core communicates with the first core via the end position of the parallel-core section,
wherein (1) in a case where the third core communicates with the first core via the start position of the parallel-core section, a distance between the third core and the fourth core increases as a distance from the start position of the parallel-core section increases, and (2) in a case where the third core communicates with the first core via the end position of the parallel-core section, a distance between the third core and the fourth core increases as a distance from the end position of the parallel-core section increases.

10. The substrate-type optical waveguide element as set forth in claim 1, further comprising:
a fifth core whose refractive index is $N_{co}$, the fifth core communicating with the first core or the second core, the fifth core having a width that decreases as a distance from the first core increases.

11. The substrate-type optical waveguide element as set forth in claim 1, further comprising:
an optical absorber connected to the first core or the second core.

12. A substrate-type optical waveguide element comprising:
n sets of a first core and a second core as set forth in claim 1,
the second core in an i-th set (where i is an integer in a range of 1≤i≤n−1) as counted from one end of the substrate-type optical waveguide element communicating with the first core in an (i+1)th set as counted from the one end.

13. The substrate-type optical waveguide element as set forth in claim 1, further comprising:
a first optical modulator for modulating part of a TE polarized wave;
a second optical modulator for modulating part of the TE polarized wave; and
a polarization rotator for converting, into a TM polarized wave, an TE polarized wave output from the second optical modulator,
the TM polarized wave outputted from the polarization rotator being introduced into the first core, and the TE polarized wave outputted from the first optical modulator being introduced into the second core.

14. The substrate-type optical waveguide element as set forth in claim 1, further comprising:
a light-input structure; and
an optical device,
the light-input structure allowing externally introduced light to enter into the first core, after reducing a spot size of the externally introduced light,
the first core outputting a TE polarized wave component of the light having entered into the first core,
the second core outputting a TM polarized wave component of the light having entered into the first core, and
the TE polarized wave component outputted from the first core or the TM polarized wave component outputted from the second core being introduced into the optical device.

15. A substrate-type optical waveguide element comprising:
a lower cladding whose refractive index is $N_{c11}$;
a first core and a second core, refractive indexes of which are $N_{co}$ ($N_{co}>N_{c11}$), the first core and the second core each being formed on the lower cladding; and
an upper cladding whose refractive index is $N_{c12}$ ($N_{co}>N_{c12}$), the upper cladding being provided on the lower cladding so as to bury the first core and the second core, wherein:
when (i) effective refractive indexes of a TE polarized wave and a TM polarized wave in the first core are $N_{TE}$@WG1 and $N_{TM}$@WG1, respectively, in a case where the second core is absent, and (ii) effective refractive indexes of a TE polarized wave and a TM polarized wave in the second core are $N_{TE}$@WG2 and $N_{TM}$@WG2, respectively, in a case where the first core is absent,
(A) each of the effective refractive indexes $N_{TE}$@WG1, $N_{TM}$@WG1, $N_{TE}$@WG2, and $N_{TM}$@WG2 is continuous as a function of distance from a start position of a parallel-core section in which the first core and the second core extend in parallel to each other,
(B) the effective refractive indexes $N_{TE}$@WG1 and $N_{TM}$@WG1 satisfy a relation of $N_{TE}$@WG1>$N_{TM}$@WG1 all along the parallel-core section, while the effective refractive indexes $N_{TE}$@WG2 and $N_{TM}$@WG2 satisfy a relation of $N_{TE}$@WG2>$N_{TM}$@WG2 all along the parallel-core section,
(C) a magnitude relation of the effective refractive indexes $N_{TM}$@WG1 and $N_{TM}$@WG2 at the start position of the parallel-core section is opposite to a magnitude relation of the effective refractive indexes $N_{TM}$@WG1 and $N_{TM}$@WG2 at an end position of the parallel-core section, and (D) at least one of the first core and the second core being configured such that a cross section orthogonal to a light traveling direction is shaped in steps, the steps being n steps (n≥3) whose widths, which are parallel to a top surface of the lower cladding, decrease as a distance from the top surface of the lower cladding increases toward a top surface of the upper cladding.

16. The substrate-type optical waveguide element as set forth in claim 15, wherein:

when $W_{1-j}$ is a width of a j-th step (1≤j≤n) of the first core, and $W_{2-j}$ is a width of a j-th step (1≤j≤n) of the second core, $W_{1-j}$ and $W_{2-j}$ satisfy a relation of $W_{1-j} \geq W_{2-j}$ (for at least one j, $W_{1-j} \neq W_{2-j}$) at the start position of the parallel-core section, and $W_{1-j}$ and $W_{2-j}$ satisfy a relation of $W_{1-j} \leq W_{2-j}$ (for at least one j, $W_{1-j} \neq W_{2-j}$) at the end position of the parallel-core section.

17. The substrate-type optical waveguide element as set forth in claim 16, wherein:

the first core and the second core are each formed on a thin layer, which is formed on the top surface of the lower cladding, the thin layer having a width equal to a width of the lower cladding.

18. The substrate-type optical waveguide element as set forth in claim 15, wherein:

a groove is provided so as to pass through a space between the first core and the second core, which are provided in parallel to each other on the lower cladding, and reach, from the top surface of the upper cladding, a position in the lower cladding along a height of the lower cladding but not a bottom surface of the lower cladding, and a refractive index of a material filling at least the groove is smaller than the refractive index of the lower cladding.

19. A substrate-type optical waveguide element comprising:

a lower cladding whose refractive index is $N_{c11}$;

a first core and a second core, refractive indexes of which are $N_{co}$ ($N_{co} > N_{c11}$), the first core and the second core each being formed on the lower cladding; and an upper cladding whose refractive index is $N_{c12}$ ($N_{co} > N_{c12}$), the upper cladding being provided on the lower cladding so as to bury the first core and the second core, wherein:

when (i) effective refractive indexes of a TE polarized wave and a TM polarized wave in the first core are $N_{TE}@WG1$ and $N_{TM}@WG1$, respectively, in a case where the second core is absent, and (ii) effective refractive indexes of a TE polarized wave and a TM polarized wave in the second core are $N_{TE}@WG2$ and $N_{TM}@WG2$, respectively, in a case where the first core is absent, (A) each of the effective refractive indexes $N_{TE}@WG1$, $N_{TM}@WG1$, $N_{TE}@WG2$, and $N_{TM}@WG2$ is continuous as a function of distance from a start position of a parallel-core section in which the first core and the second core extend in parallel to each other, (B) the effective refractive indexes $N_{TE}@WG1$ and $N_{TM}@WG1$ satisfy a relation of $N_{TE}@WG1 > N_{TM}@WG1$ all along the parallel-core section, while the effective refractive indexes $N_{TE}@WG2$ and $N_{TM}@WG2$ satisfy a relation of $N_{TE}@WG2 > N_{TM}@WG2$ all along the parallel-core section, (C) a magnitude relation of the effective refractive indexes $N_{TM}@WG1$ and $N_{TM}@WG2$ at the start position of the parallel-core section is opposite to a magnitude relation of the effective refractive indexes $N_{TM}@WG1$ and $N_{TM}@WG2$ at an end position of the parallel-core section, and (D) the first core and the second core are provided on a first lower cladding rib and a second lower cladding rib, respectively, both of which protrude from the lower cladding so as to extend in parallel to each other and in alignment with the first core and the second core, respectively, which extend in parallel to each other on the lower cladding, wherein the first core and the second core each are configured such that a cross section orthogonal to a light traveling direction is shaped in steps, the steps being n steps (n≥2) whose widths, which are parallel to a top surface of the lower cladding, decrease as a distance from the top surface of the lower cladding increases in a perpendicular direction, and at least a space provided between (i) a laminate structure of the first lower cladding rib and the first core and (ii) a laminate structure of the second lower cladding rib and the second core is filled with a material having a refractive index smaller than the refractive index of the lower cladding.

\* \* \* \* \*